US012613781B2

(12) United States Patent
Mitkar et al.

(10) Patent No.: US 12,613,781 B2
(45) Date of Patent: Apr. 28, 2026

(54) KUBERNETES DATA PROTECTION USING A CONTAINERIZED FILE SYSTEM DATA AGENT

(71) Applicant: Commvault Systems, Inc., Tinton Falls, NJ (US)

(72) Inventors: Amit Mitkar, Manalapan, NJ (US); Chandrakant Agarkar, Pune (IN); Jun H. Ahn, Manalapan, NJ (US); Henry Wallace Dornemann, Eatontown, NJ (US); Andrei Erofeev, Marlboro, NJ (US); Lawrence Fisher, Aventura, FL (US); Parag Gokhale, Marlboro, NJ (US); Amey Vijaykumar Karandikar, Marlboro, NJ (US); Sanath Kumar, Woodbridge, NJ (US); Sanjay Kumar, Morganville, NJ (US); Manoj Kumar Pradhan, East Brunswick, NJ (US); Mahesh Prakash Rao, Houston, TX (US)

(73) Assignee: Commvault Systems, Inc., Tinton Falls, NJ (US)

( * ) Notice: Subject to any disclaimer, the term of this patent is extended or adjusted under 35 U.S.C. 154(b) by 28 days.

(21) Appl. No.: 18/934,285

(22) Filed: Nov. 1, 2024

(65) Prior Publication Data

US 2025/0165352 A1 May 22, 2025

Related U.S. Application Data

(60) Provisional application No. 63/600,902, filed on Nov. 20, 2023.

(51) Int. Cl.
*G06F 11/14* (2026.01)
*G06F 11/1446* (2026.01)
*G06F 21/64* (2013.01)

(52) U.S. Cl.
CPC ...... *G06F 11/1458* (2013.01); *G06F 11/1451* (2013.01); *G06F 11/1464* (2013.01); *G06F 21/64* (2013.01)

(58) Field of Classification Search
CPC ............ G06F 11/1458; G06F 11/1451; G06F 11/1464; G06F 21/64
See application file for complete search history.

(56) References Cited

U.S. PATENT DOCUMENTS

| 4,084,231 A | 4/1978 | Capozzi et al. |
| 4,267,568 A | 5/1981 | Dechant et al. |
| | (Continued) | |

FOREIGN PATENT DOCUMENTS

| EP | 0259912 A1 | 3/1988 |
| EP | 0405926 A2 | 1/1991 |
| | (Continued) | |

OTHER PUBLICATIONS

U.S. Appl. No. 18/934,284, Mitkar et al.
(Continued)

*Primary Examiner* — Prasith Thammavong
(74) *Attorney, Agent, or Firm* — Commvault Systems, Inc.

(57) ABSTRACT

Because Kubernetes clusters can be ephemeral, backing up in-cluster data to storage outside the cluster is important. Prior art solutions used the cluster's API server, which facilitates communications with the cluster control plane, to transfer backup data through the API server. However, the API server as a data transfer node has resiliency weaknesses and can slow down backup job performance. The present solution provides a more streamlined and scalable approach, which circumvents the API server and additionally includes more robust error checking, log capture, and realtime job monitoring to provide improved data protection resilience.

(Continued)

The disclosed approach employs a "sponsor" data agent outside the cluster and temporarily deploys a specialized backup resource within the cluster during a backup job, such as an enhanced File System Data Agent and/or a lightweight Kubernetes File Client, both of which present substantial performance and resiliency advantages over the API server.

20 Claims, 23 Drawing Sheets

(56)                    References Cited

U.S. PATENT DOCUMENTS

| | | | |
|---|---|---|---|
| 4,283,787 | A | 8/1981 | Chambers |
| 4,417,321 | A | 11/1983 | Chang et al. |
| 4,641,274 | A | 2/1987 | Swank |
| 4,654,819 | A | 3/1987 | Stiffler et al. |
| 4,686,620 | A | 8/1987 | Ng |
| 4,912,637 | A | 3/1990 | Sheedy et al. |
| 4,995,035 | A | 2/1991 | Cole |
| 5,005,122 | A | 4/1991 | Griffin |
| 5,093,912 | A | 3/1992 | Dong et al. |
| 5,123,107 | A | 6/1992 | Mensch, Jr. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,301,286 | A | 4/1994 | Rajani |
| 5,321,816 | A | 6/1994 | Rogan et al. |
| 5,333,315 | A | 7/1994 | Saether et al. |
| 5,347,653 | A | 9/1994 | Flynn et al. |
| 5,410,700 | A | 4/1995 | Fecteau et al. |
| 5,420,996 | A | 5/1995 | Aoyagi |
| 5,448,724 | A | 9/1995 | Hayashi et al. |
| 5,454,099 | A | 9/1995 | Myers et al. |
| 5,491,810 | A | 2/1996 | Allen |
| 5,495,607 | A | 2/1996 | Pisello et al. |
| 5,504,873 | A | 4/1996 | Martin et al. |
| 5,544,345 | A | 8/1996 | Carpenter et al. |
| 5,544,347 | A | 8/1996 | Yanai et al. |
| 5,559,957 | A | 9/1996 | Balk |
| 5,559,991 | A | 9/1996 | Kanfi |
| 5,619,644 | A | 4/1997 | Crockett et al. |
| 5,638,509 | A | 6/1997 | Dunphy et al. |
| 5,642,496 | A | 6/1997 | Kanfi |
| 5,664,204 | A | 9/1997 | Wang |
| 5,673,381 | A | 9/1997 | Huai et al. |
| 5,699,361 | A | 12/1997 | Ding et al. |
| 5,729,743 | A | 3/1998 | Squibb |
| 5,751,997 | A | 5/1998 | Kullick et al. |
| 5,758,359 | A | 5/1998 | Saxon |
| 5,761,677 | A | 6/1998 | Senator et al. |
| 5,764,972 | A | 6/1998 | Crouse et al. |
| 5,778,395 | A | 7/1998 | Whiting et al. |
| 5,812,398 | A | 9/1998 | Nielsen et al. |
| 5,813,009 | A | 9/1998 | Johnson et al. |
| 5,813,017 | A | 9/1998 | Morris |
| 5,875,478 | A | 2/1999 | Blumenau |
| 5,887,134 | A | 3/1999 | Ebrahim |
| 5,901,327 | A | 5/1999 | Ofek |
| 5,924,102 | A | 7/1999 | Perks |
| 5,950,205 | A | 9/1999 | Aviani, Jr. |
| 5,974,563 | A | 10/1999 | Beeler, Jr. |
| 6,021,415 | A | 2/2000 | Cannon et al. |
| 6,026,414 | A | 2/2000 | Anglin |
| 6,052,735 | A | 4/2000 | Ulrich et al. |
| 6,076,148 | A | 6/2000 | Kedem et al. |
| 6,094,416 | A | 7/2000 | Mng |
| 6,131,095 | A | 10/2000 | Low et al. |
| 6,131,190 | A | 10/2000 | Sidwell |
| 6,148,412 | A | 11/2000 | Cannon et al. |
| 6,154,787 | A | 11/2000 | Urevig et al. |
| 6,161,111 | A | 12/2000 | Mutalik et al. |
| 6,167,402 | A | 12/2000 | Yeager |
| 6,212,512 | B1 | 4/2001 | Barney et al. |
| 6,260,069 | B1 | 7/2001 | Anglin |
| 6,269,431 | B1 | 7/2001 | Dunham |
| 6,275,953 | B1 | 8/2001 | Vahalia et al. |
| 6,301,592 | B1 | 10/2001 | Aoyama et al. |
| 6,324,581 | B1 | 11/2001 | Xu et al. |
| 6,327,590 | B1 | 12/2001 | Chidlovskii et al. |
| 6,328,766 | B1 | 12/2001 | Long |
| 6,330,570 | B1 | 12/2001 | Crighton et al. |
| 6,330,642 | B1 | 12/2001 | Carteau |
| 6,343,324 | B1 | 1/2002 | Hubis et al. |
| RE37,601 | E | 3/2002 | Eastridge et al. |
| 6,356,801 | B1 | 3/2002 | Goodman et al. |
| 6,389,432 | B1 | 5/2002 | Pothapragada et al. |
| 6,418,478 | B1 | 7/2002 | Ignatius et al. |
| 6,421,711 | B1 | 7/2002 | Blumenau et al. |
| 6,487,561 | B1 | 11/2002 | Ofek et al. |
| 6,519,679 | B2 | 2/2003 | Devireddy et al. |
| 6,538,669 | B1 | 3/2003 | Lagueux, Jr. et al. |
| 6,542,972 | B2 | 4/2003 | Ignatius et al. |
| 6,564,228 | B1 | 5/2003 | O'Connor |
| 6,658,436 | B2 | 12/2003 | Oshinsky et al. |
| 6,658,526 | B2 | 12/2003 | Nguyen et al. |
| 6,721,767 | B2 | 4/2004 | DeMeno et al. |
| 6,760,723 | B2 | 7/2004 | Oshinsky et al. |
| 6,941,429 | B1 | 9/2005 | Kamvysselis et al. |
| 6,959,327 | B1 | 10/2005 | Vogl |
| 6,973,555 | B2 | 12/2005 | Fujiwara |
| 7,000,238 | B2 | 2/2006 | Nadler |
| 7,003,641 | B2 | 2/2006 | Prahlad |
| 7,035,880 | B1 | 4/2006 | Crescenti |
| 7,079,341 | B2 | 7/2006 | Kistler et al. |
| 7,096,418 | B1 | 8/2006 | Singhal |
| 7,107,298 | B2 | 9/2006 | Prahlad |
| 7,130,272 | B1 | 10/2006 | Gai et al. |
| 7,130,970 | B2 | 10/2006 | Devassy |
| 7,143,203 | B1 | 11/2006 | Altmejd |
| 7,162,496 | B2 | 1/2007 | Amarendran et al. |
| 7,174,433 | B2 | 2/2007 | Kottomtharayil et al. |
| 7,225,220 | B2 | 5/2007 | Gonzalez et al. |
| 7,246,207 | B2 | 7/2007 | Kottomtharayil |
| 7,260,633 | B2 | 8/2007 | Lette |
| 7,315,923 | B2 | 1/2008 | Retnamma |
| 7,334,144 | B1 | 2/2008 | Schlumberger |
| 7,340,616 | B2 | 3/2008 | Rothman et al. |
| 7,343,356 | B2 | 3/2008 | Prahlad |
| 7,343,453 | B2 | 3/2008 | Prahlad |
| 7,346,751 | B2 | 3/2008 | Prahlad |
| 7,366,846 | B2 | 4/2008 | Boyd et al. |
| 7,386,744 | B2 | 6/2008 | Barr |
| 7,389,311 | B1 | 6/2008 | Crescenti et al. |
| 7,395,282 | B1 | 7/2008 | Crescenti |
| 7,440,982 | B2 | 10/2008 | Lu |
| 7,448,079 | B2 | 11/2008 | Tremain |
| 7,454,569 | B2 | 11/2008 | Kavuri |
| 7,472,079 | B2 | 12/2008 | Fellenstein |
| 7,483,895 | B2 | 1/2009 | Hysom |
| 7,490,207 | B2 | 2/2009 | Amarendran et al. |
| 7,500,053 | B1 | 3/2009 | Kavuri |
| 7,502,820 | B2 | 3/2009 | Manders |
| 7,516,346 | B2 | 4/2009 | Pinheiro et al. |
| 7,516,348 | B1 | 4/2009 | Ofer |
| 7,526,798 | B2 | 4/2009 | Chao |
| 7,529,782 | B2 | 5/2009 | Prahlad |
| 7,536,291 | B1 | 5/2009 | Vijayan Retnamma et al. |
| 7,543,125 | B2 | 6/2009 | Gokhale |
| 7,546,324 | B2 | 6/2009 | Prahlad et al. |
| 7,546,475 | B2 | 6/2009 | Mayo et al. |
| 7,584,227 | B2 | 9/2009 | Gokhale |
| 7,587,570 | B2 | 9/2009 | Sarkar et al. |
| 7,603,386 | B2 | 10/2009 | Amarendran et al. |
| 7,606,844 | B2 | 10/2009 | Kottomtharayil |
| 7,613,752 | B2 | 11/2009 | Prahlad |
| 7,617,191 | B2 | 11/2009 | Wilbrink et al. |

(56) References Cited

U.S. PATENT DOCUMENTS

| | | |
|---|---|---|
| 7,617,253 B2 | 11/2009 | Prahlad et al. |
| 7,617,262 B2 | 11/2009 | Prahlad |
| 7,620,710 B2 | 11/2009 | Kottomtharayil |
| 7,627,827 B2 | 12/2009 | Taylor et al. |
| 7,631,351 B2 | 12/2009 | Erofeev |
| 7,636,743 B2 | 12/2009 | Erofeev |
| 7,651,593 B2 | 1/2010 | Prahlad |
| 7,653,668 B1 | 1/2010 | Shelat |
| 7,657,550 B2 | 2/2010 | Prahlad |
| 7,660,807 B2 | 2/2010 | Prahlad |
| 7,661,028 B2 | 2/2010 | Erofeev |
| 7,668,884 B2 | 2/2010 | Prahlad |
| 7,685,269 B1 | 3/2010 | Thrasher et al. |
| 7,694,070 B2 | 4/2010 | Mogi |
| 7,734,669 B2 | 6/2010 | Kottomtharayil |
| 7,739,548 B2 | 6/2010 | Goodrum et al. |
| 7,747,579 B2 | 6/2010 | Prahlad |
| 7,761,736 B2 | 7/2010 | Nguyen et al. |
| 7,765,167 B2 | 7/2010 | Prahlad |
| 7,769,616 B2 | 8/2010 | Ollivier |
| 7,778,984 B2 | 8/2010 | Zhang |
| 7,792,789 B2 | 9/2010 | Prahlad |
| 7,797,453 B2 | 9/2010 | Meijer et al. |
| 7,801,864 B2 | 9/2010 | Prahlad |
| 7,809,914 B2 | 10/2010 | Kottomtharayil |
| 7,814,149 B1 | 10/2010 | Stringham |
| 7,814,351 B2 | 10/2010 | Lubbers et al. |
| 7,818,082 B2 | 10/2010 | Roumeliotis et al. |
| 7,822,967 B2 | 10/2010 | Fung |
| 7,840,537 B2 | 11/2010 | Gokhale |
| 7,882,077 B2 | 2/2011 | Gokhale |
| 7,899,788 B2 | 3/2011 | Chandhok |
| 7,917,438 B2 | 3/2011 | Kenedy et al. |
| 7,975,061 B1 | 7/2011 | Gokhale |
| 7,996,270 B2 | 8/2011 | Sundaresan |
| 8,001,277 B2 | 8/2011 | Mega |
| 8,037,028 B2 | 10/2011 | Prahlad |
| 8,065,166 B2 | 11/2011 | Maresh |
| 8,108,427 B2 | 1/2012 | Prahlad |
| 8,112,605 B2 | 2/2012 | Kavuri |
| 8,134,727 B1 | 3/2012 | Shmunis |
| 8,140,786 B2 | 3/2012 | Bunte |
| 8,156,086 B2 | 4/2012 | Lu et al. |
| 8,170,995 B2 | 5/2012 | Prahlad |
| 8,219,524 B2 | 7/2012 | Gokhale |
| 8,229,954 B2 | 7/2012 | Kottomtharayil |
| 8,230,195 B2 | 7/2012 | Amarendran |
| 8,266,406 B2 | 9/2012 | Kavuri |
| 8,285,681 B2 | 10/2012 | Prahlad |
| 8,296,534 B1 | 10/2012 | Gupta et al. |
| 8,307,177 B2 | 11/2012 | Prahlad |
| 8,316,091 B2 | 11/2012 | Hirvela et al. |
| 8,321,688 B2 | 11/2012 | Auradkar |
| 8,352,608 B1 | 1/2013 | Keagy et al. |
| 8,364,652 B2 | 1/2013 | Vijayan |
| 8,364,802 B1 | 1/2013 | Keagy et al. |
| 8,370,307 B2 | 2/2013 | Wolfe |
| 8,370,542 B2 | 2/2013 | Lu et al. |
| 8,396,838 B2 | 3/2013 | Brockway |
| 8,407,190 B2 | 3/2013 | Prahlad |
| 8,417,697 B2 | 4/2013 | Ghemawat et al. |
| 8,429,630 B2 | 4/2013 | Nickolov |
| 8,434,131 B2 | 4/2013 | Varadharajan |
| 8,510,573 B2 | 8/2013 | Muller et al. |
| 8,527,549 B2 | 9/2013 | Cidon |
| 8,566,362 B2 | 10/2013 | Mason et al. |
| 8,578,120 B2 | 11/2013 | Attarde |
| 8,612,439 B2 | 12/2013 | Prahlad |
| 8,626,741 B2 | 1/2014 | Vijakumar et al. |
| 8,635,184 B2 | 1/2014 | Hsu et al. |
| 8,660,038 B1 | 2/2014 | Pascazio |
| 8,674,823 B1 | 3/2014 | Contrario et al. |
| 8,683,103 B2 | 3/2014 | Ripberger |
| 8,706,867 B2 | 4/2014 | Vijayan |
| 8,707,070 B2 | 4/2014 | Muller |
| 8,769,048 B2 | 7/2014 | Kottomtharayil |
| 8,780,400 B2 | 7/2014 | Shmunis |
| 8,799,242 B2 | 8/2014 | Leonard et al. |
| 8,849,761 B2 | 9/2014 | Prahlad |
| 8,849,955 B2 | 9/2014 | Prahlad |
| 8,924,511 B2 | 12/2014 | Brand |
| 8,950,009 B2 | 2/2015 | Vijayan et al. |
| 8,954,446 B2 | 2/2015 | Vijayan Retnamma et al. |
| 9,020,900 B2 | 4/2015 | Vijayan Retnamma |
| 9,021,282 B2 | 4/2015 | Muller |
| 9,021,307 B1 | 4/2015 | Parameswaran et al. |
| 9,098,495 B2 | 8/2015 | Gokhale |
| 9,116,633 B2 | 8/2015 | Sancheti |
| 9,171,008 B2 | 10/2015 | Prahlad |
| 9,189,170 B2 | 11/2015 | Kripalani et al. |
| 9,195,636 B2 | 11/2015 | Smith |
| 9,239,687 B2 | 1/2016 | Vijayan |
| 9,262,496 B2 | 2/2016 | Kumarasamy et al. |
| 9,286,110 B2 | 3/2016 | Mitkar |
| 9,311,121 B2 | 4/2016 | Deshpande et al. |
| 9,378,035 B2 | 6/2016 | Kripalani |
| 9,411,534 B2 | 8/2016 | Lakshman |
| 9,424,151 B2 | 8/2016 | Lakshman |
| 9,454,537 B2 | 9/2016 | Prahlad |
| 9,461,881 B2 | 10/2016 | Kumarasamy |
| 9,495,404 B2 | 11/2016 | Kumarasamy et al. |
| 9,575,673 B2 | 2/2017 | Mitkar |
| 9,633,033 B2 | 4/2017 | Kumar |
| 9,639,274 B2 | 5/2017 | Maranna |
| 9,641,388 B2 | 5/2017 | Kripalani |
| 9,710,465 B2 | 7/2017 | Dornemann et al. |
| 9,798,489 B2 | 10/2017 | Lakshman |
| 9,875,063 B2 | 1/2018 | Lakshman |
| 9,959,333 B2 | 5/2018 | Kumarasamy |
| 9,977,687 B2 | 5/2018 | Kottomtharayil et al. |
| 9,983,936 B2 | 5/2018 | Dornemann et al. |
| 10,067,722 B2 | 9/2018 | Lakshman |
| 10,084,873 B2 | 9/2018 | Dornemann |
| 10,162,528 B2 | 12/2018 | Sancheti |
| 10,210,048 B2 | 2/2019 | Sancheti |
| 10,228,962 B2 | 3/2019 | Dornemann et al. |
| 10,248,174 B2 | 4/2019 | Lakshman et al. |
| 10,248,657 B2 | 4/2019 | Prahlad et al. |
| 10,255,143 B2 | 4/2019 | Vijayan et al. |
| 10,264,074 B2 | 4/2019 | Vijayan et al. |
| 10,296,368 B2 | 5/2019 | Dormemann et al. |
| 10,310,953 B2 | 6/2019 | Vijayan et al. |
| 10,346,259 B2 | 7/2019 | Gokhale et al. |
| 10,379,598 B2 | 8/2019 | Muller |
| 10,387,266 B2 | 8/2019 | Kumarasamy et al. |
| 10,592,350 B2 | 3/2020 | Dornemann |
| 10,601,837 B1 | 3/2020 | Sharma |
| 10,613,939 B2 | 4/2020 | Mitkar et al. |
| 10,678,758 B2 | 6/2020 | Dornemann |
| 10,684,924 B2 | 6/2020 | Kilaru et al. |
| 10,747,630 B2 | 8/2020 | Sanakkayala |
| 10,768,971 B2 | 9/2020 | Dornemann |
| 10,776,209 B2 | 9/2020 | Pawar |
| 11,218,450 B2 | 1/2022 | Polimera et al. |
| 11,321,188 B2 | 5/2022 | Mitkar et al. |
| 11,422,900 B2 | 8/2022 | Bhavanarushi et al. |
| 11,477,165 B1 | 10/2022 | Mcdowall |
| 11,561,866 B2 | 1/2023 | Mitkar et al. |
| 11,822,949 B2 | 11/2023 | Shepherd |
| 2002/0035511 A1 | 3/2002 | Haji |
| 2002/0083079 A1 | 6/2002 | Meier et al. |
| 2002/0095609 A1 | 7/2002 | Tokunaga |
| 2002/0129047 A1 | 9/2002 | Cane |
| 2002/0129106 A1 | 9/2002 | Gutfreund |
| 2002/0194033 A1 | 12/2002 | Huff |
| 2002/0194511 A1 | 12/2002 | Swoboda |
| 2003/0140068 A1 | 7/2003 | Yeung |
| 2003/0200222 A1 | 10/2003 | Feinberg |
| 2004/0210724 A1 | 10/2004 | Koning et al. |
| 2005/0076251 A1 | 4/2005 | Barr |
| 2005/0268121 A1 | 12/2005 | Rothman et al. |
| 2005/0289414 A1 | 12/2005 | Adya |
| 2006/0058994 A1 | 3/2006 | Ravi |
| 2006/0101174 A1 | 5/2006 | Kanamaru |

(56) References Cited

U.S. PATENT DOCUMENTS

| | | |
|---|---|---|
| 2006/0190775 A1 | 8/2006 | Aggarwal et al. |
| 2006/0206507 A1 | 9/2006 | Dahbour |
| 2006/0224846 A1 | 10/2006 | Amarendran et al. |
| 2006/0236073 A1 | 10/2006 | Soules |
| 2006/0242356 A1 | 10/2006 | Mogi et al. |
| 2006/0245411 A1 | 11/2006 | Chen et al. |
| 2006/0251067 A1 | 11/2006 | Desanti |
| 2007/0073970 A1 | 3/2007 | Yamazaki |
| 2007/0079156 A1 | 4/2007 | Fujimoto |
| 2007/0101173 A1 | 5/2007 | Fung |
| 2007/0168606 A1 | 7/2007 | Takai |
| 2007/0192400 A1 | 8/2007 | Lee |
| 2007/0234302 A1 | 10/2007 | Suzuki |
| 2008/0005168 A1 | 1/2008 | Huff et al. |
| 2008/0010521 A1 | 1/2008 | Goodrum et al. |
| 2008/0147460 A1 | 6/2008 | Ollivier |
| 2008/0162592 A1 | 7/2008 | Huang |
| 2008/0183891 A1 | 7/2008 | Ni et al. |
| 2008/0228771 A1 | 9/2008 | Prahlad |
| 2008/0244032 A1 | 10/2008 | Gilson |
| 2008/0244177 A1 | 10/2008 | Crescenti |
| 2008/0256384 A1 | 10/2008 | Branson et al. |
| 2008/0270461 A1 | 10/2008 | Gordon |
| 2008/0301479 A1 | 12/2008 | Wood |
| 2009/0077443 A1 | 3/2009 | Nguyen et al. |
| 2009/0198677 A1 | 8/2009 | Sheehy |
| 2009/0198825 A1 | 8/2009 | Miller |
| 2009/0210464 A1 | 8/2009 | Chiang-Lin |
| 2009/0268903 A1 | 10/2009 | Bojinov et al. |
| 2009/0282020 A1 | 11/2009 | McSheffrey |
| 2009/0287665 A1 | 11/2009 | Prahlad |
| 2009/0319534 A1 | 12/2009 | Gokhale |
| 2009/0327477 A1 | 12/2009 | Madison, Jr. |
| 2010/0023722 A1 | 1/2010 | Tabbara |
| 2010/0064033 A1 | 3/2010 | Travostino |
| 2010/0070448 A1 | 3/2010 | Omoigui |
| 2010/0070466 A1 | 3/2010 | Prahlad |
| 2010/0070474 A1 | 3/2010 | Lad |
| 2010/0070725 A1 | 3/2010 | Prahlad |
| 2010/0082672 A1 | 4/2010 | Kottomtharayil |
| 2010/0082700 A1 | 4/2010 | Parab |
| 2010/0082713 A1 | 4/2010 | Frid-Nielsen et al. |
| 2010/0162002 A1 | 6/2010 | Dodgson et al. |
| 2010/0190478 A1 | 7/2010 | Brewer |
| 2010/0235333 A1 | 9/2010 | Bates |
| 2010/0257403 A1 | 10/2010 | Virk |
| 2010/0269164 A1 | 10/2010 | Sosnosky et al. |
| 2010/0274772 A1 | 10/2010 | Samuels |
| 2010/0318782 A1 | 12/2010 | Auradkar et al. |
| 2010/0325191 A1 | 12/2010 | Jung |
| 2010/0332401 A1 | 12/2010 | Prahlad |
| 2010/0333116 A1 | 12/2010 | Prahlad |
| 2011/0010518 A1 | 1/2011 | Kavuri et al. |
| 2011/0022642 A1 | 1/2011 | DeMilo et al. |
| 2011/0040824 A1 | 2/2011 | Harm |
| 2011/0055161 A1 | 3/2011 | Wolfe |
| 2011/0191544 A1 | 8/2011 | Naga et al. |
| 2011/0276713 A1 | 11/2011 | Brand |
| 2011/0277027 A1 | 11/2011 | Hayton et al. |
| 2012/0054626 A1 | 3/2012 | Odenheimer |
| 2012/0084262 A1 | 4/2012 | Dwarampudi et al. |
| 2012/0110186 A1 | 5/2012 | Kapur et al. |
| 2012/0131645 A1 | 5/2012 | Harm |
| 2012/0150818 A1 | 6/2012 | Vijayan Retnamma et al. |
| 2012/0240183 A1 | 9/2012 | Sinha |
| 2012/0304277 A1 | 11/2012 | Li et al. |
| 2013/0007245 A1 | 1/2013 | Malik et al. |
| 2013/0035795 A1 | 2/2013 | Pfeiffer et al. |
| 2013/0125198 A1 | 5/2013 | Ferguson et al. |
| 2013/0238969 A1 | 9/2013 | Smith |
| 2013/0262385 A1 | 10/2013 | Kumarasamy et al. |
| 2013/0297902 A1 | 11/2013 | Collins et al. |
| 2013/0326279 A1 | 12/2013 | Chavda et al. |
| 2014/0189432 A1 | 7/2014 | Gokhale |
| 2014/0196038 A1 | 7/2014 | Kottomtharavil et al. |
| 2014/0201140 A1 | 7/2014 | Vibhor |
| 2014/0201157 A1 | 7/2014 | Pawar et al. |
| 2014/0283010 A1 | 9/2014 | Rutkowski et al. |
| 2014/0380014 A1 | 12/2014 | Moyer |
| 2015/0074536 A1 | 3/2015 | Varadharajan et al. |
| 2015/0113055 A1 | 4/2015 | Vijayan et al. |
| 2015/0127967 A1 | 5/2015 | Dutton et al. |
| 2015/0154039 A1 | 6/2015 | Zada et al. |
| 2015/0172205 A1 | 6/2015 | Anderson |
| 2015/0198995 A1 | 7/2015 | Muller et al. |
| 2015/0378763 A1 | 12/2015 | Hassine et al. |
| 2016/0100013 A1 | 4/2016 | Vijayan et al. |
| 2016/0142485 A1 | 5/2016 | Mitkar et al. |
| 2016/0350391 A1 | 12/2016 | Vijayan et al. |
| 2016/0352588 A1 | 12/2016 | Subbarayan et al. |
| 2017/0102757 A1 | 4/2017 | Kang |
| 2017/0126807 A1 | 5/2017 | Vijayan et al. |
| 2017/0168903 A1 | 6/2017 | Dornemann et al. |
| 2017/0185488 A1 | 6/2017 | Kumarasamy et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2018/0115525 A1 | 4/2018 | Chou et al. |
| 2018/0137139 A1 | 5/2018 | Bangalore et al. |
| 2018/0253361 A1 | 9/2018 | Dhatrak |
| 2018/0276085 A1 | 9/2018 | Mitkar et al. |
| 2018/0285202 A1 | 10/2018 | Bhagi et al. |
| 2018/0285205 A1 | 10/2018 | Mehta et al. |
| 2018/0285383 A1 | 10/2018 | Nara et al. |
| 2018/0359255 A1 | 12/2018 | Stair et al. |
| 2018/0373597 A1 | 12/2018 | Rana |
| 2018/0375938 A1 | 12/2018 | Vijayan et al. |
| 2019/0095253 A1 | 3/2019 | Curtis |
| 2019/0179805 A1 | 6/2019 | Prahlad et al. |
| 2019/0182325 A1 | 6/2019 | Vijayan et al. |
| 2019/0303246 A1 | 10/2019 | Gokhale et al. |
| 2020/0034240 A1 | 1/2020 | Natanzon et al. |
| 2020/0034248 A1 | 1/2020 | Nara et al. |
| 2020/0045548 A1 | 2/2020 | Dowlatkhah |
| 2020/0073574 A1 | 3/2020 | Pradhan |
| 2020/0225926 A1 | 7/2020 | Kammath |
| 2020/0233845 A1 | 7/2020 | Dornemann et al. |
| 2020/0319694 A1 | 10/2020 | Mohanty et al. |
| 2020/0319978 A1 | 10/2020 | Smith-Uchida et al. |
| 2020/0351347 A1 | 11/2020 | Chang et al. |
| 2021/0011811 A1 | 1/2021 | Balcha |
| 2021/0011812 A1 | 1/2021 | Mitkar et al. |
| 2021/0011816 A1 | 1/2021 | Mitkar et al. |
| 2021/0075768 A1 | 3/2021 | Polimera et al. |
| 2021/0089359 A1 | 3/2021 | Culp |
| 2021/0103499 A1 | 4/2021 | Alluboyina et al. |
| 2021/0271499 A1* | 9/2021 | Fong .................. G06F 16/9027 |
| 2021/0311758 A1 | 10/2021 | Cao |
| 2021/0311760 A1 | 10/2021 | Oki |
| 2021/0311762 A1 | 10/2021 | Shepherd |
| 2021/0311763 A1 | 10/2021 | Beard |
| 2021/0311764 A1 | 10/2021 | Rosoff |
| 2021/0311792 A1 | 10/2021 | Rosoff |
| 2021/0314310 A1 | 10/2021 | Cao |
| 2022/0004417 A1 | 1/2022 | Sinha |
| 2022/0012373 A1 | 1/2022 | Kulkarni |
| 2022/0035662 A1 | 2/2022 | Wiggers |
| 2022/0107846 A1 | 4/2022 | Culp |
| 2022/0200965 A1 | 6/2022 | Polimera et al. |
| 2022/0415199 A1 | 12/2022 | Venkatasubramanyam |
| 2023/0043336 A1 | 2/2023 | Mitkar |
| 2023/0071714 A1 | 3/2023 | Feng |
| 2023/0115438 A1 | 4/2023 | Ethan |
| 2023/0142346 A1 | 5/2023 | Menezes |
| 2023/0214305 A1 | 7/2023 | Hockey |
| 2023/0281082 A1 | 9/2023 | Hoang |
| 2024/0012717 A1* | 1/2024 | Mitkar ................ G06F 11/1448 |
| 2024/0160750 A1* | 5/2024 | Pascual .................. G06F 21/53 |
| 2024/0244065 A1* | 7/2024 | Shemesh ............. G06F 21/6218 |

(56)                    References Cited

U.S. PATENT DOCUMENTS

| | | |
|---|---|---|
| 2024/0289059 A1 | 8/2024 | Mitkar |
| 2025/0004813 A1* | 1/2025 | Pattabhi .............. G06F 9/45558 |

FOREIGN PATENT DOCUMENTS

| | | |
|---|---|---|
| EP | 0467546 A2 | 1/1992 |
| EP | 0541281 A2 | 5/1993 |
| EP | 0774715 A1 | 5/1997 |
| EP | 0809184 A1 | 11/1997 |
| EP | 817040 A2 | 1/1998 |
| EP | 0899662 A1 | 3/1999 |
| EP | 0981090 A1 | 2/2000 |
| WO | 9513580 A1 | 5/1995 |
| WO | 9912098 A1 | 3/1999 |
| WO | 2006052872 A2 | 5/2006 |

OTHER PUBLICATIONS

Ardagna et al., "Scalability Patterns for Platform-as-a-Service", IEEE Fifth International Conference on Cloud Computing, 2012, pp. 718-725.

Armstead et al., "Implementation of a Campus-wide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988Nov. 3, 1988, pp. 45-50, Monterey, CA.

Backing Up etcd On Demand for Kubernetes, retrieved Jun. 17, 2022, in 2 pages. (https://documentation.commvault.com/2022e/essential/148983_backing_up_etcd_on_demand_for_kubernetes.html).

Bates, S. et al., "Sharepoint 2007 User's Guide," pp. 1-88, 2007, Springer-Verlag New York, Inc., 104 pages.

Brandon, J., "Virtualization Shakes Up Backup Strategy," <http://www.computerworld.com>, internet accessed on Mar. 6, 2008, 3 pages.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Chiappetta, Marco, "ESA Enthusiast System Architecture," <http://hothardware.com/Articles/NVIDIA_ESA_Enthusiast_System_Architecture/>, Nov. 5, 2007, 2 pages.

Communication between Nodes and the Control Plane, Kubernetes Documentation, accessed on kubernetes.io/docs/concepts/architecture/control-plane-node-communication/, Nov. 15, 2023, available on https://web.archive.org/web/20231020172640/kubernetes.io/docs/concepts/architecture/control-plane-node-communication/, Oct. 3, 2024, 3 pages.

CommVault Systems, Inc., "A CommVault White Paper: VMware Consolidated Backup (VCB) Certification Information Kit," 2007, 23 pages.

CommVault Systems, Inc., "CommVault Solutions—VMware," <http://www.commvault.com/solutions/vmware/>, internet accessed Mar. 24, 2008, 1 page.

CommVault Systems, Inc., "Enhanced Protection and Manageability of Virtual Servers," Partner Solution Brief, 2008, 6 pages.

Configuration for Kubernetes etcd SSL Certificates, retrieved Jun. 17, 2022, in 3 pages. (https://documentation.commvault.com/2022e/essential/150065_configuration_for_kubernetes_etcd_ssl_certificates.html).

Eitel, "Backup and Storage Management in Distributed Heterogeneous Environments," IEEE, Jun. 12-16, 1994, pp. 124-126.

Enabling Kubernetes etcd Key Value Store Backups, retrieved Jun. 17, 2022, in 3 pages. (https://documentation.commvault.com/2022e/essential/148980_enabling_kubernetes_etcd_key_value_store_backups.html).

Etcd, "What is etcd?", accessed on https://web.archive.org/web/20220705152438/https://etcd.io/, Jul. 2022, available on http://etcd.io, Jul. 26, 2024, 2 pages.

Google Cloud Regions and Zones, accessed on https://cloud.google.com/compute/docs/regions-zones/, Apr. 26, 2019, available on https://web.archive.org/web/20190415102759/cloud.google.com/compute/docs/regions-zones/, Dec. 4, 2023, 30 pages.

Kubernetes Cluster Architecture, accessed on https://kubernetes.io/docs/concepts/architecture/_print/, Oct. 20, 2024, 37 Pages.

Kubernetes Components accessed at https://kubernetes.io/docs/concepts/overview/components/, Jan. 3, 2024, 4 pages.

Kubernetes Documentation | Tasks | Administer a Cluster | Operating etcd clusters for Kubernetes, accessed at kubernetes.io/docs/tasks/administer-cluster/configure-upgrade-etcd/ on May 13, 2024, 9 pages.

Kubernetes Documentation, "Volumes", accessed on https://web.archive.org/web/20220715093537/https://kubernetes.io/docs/concepts/storage/volumes/, Jul. 2022, available onhttps://kubernetes.io/docs/concepts/storage/volumes/, Jul. 26, 2024, 19 pages.

Kubernetes kubelet, Kubernetes Documentation, accessed on https://kubernetes.io/docs/reference/command-line-tools-reference/kubelet/, May 2020, available on https://web.archive.org/web/20200510051539mp_/https://kubernetes.io/docs/reference/command-line-tools-reference/kubelet/, Mar. 29, 2024, 13 pages.

Kubernetes Persistent Volumes accessed on https://kubernetes.io/docs/concepts/storage/persistent-volumes/, Oct. 20, 2024, 28 Pages.

Kubernetes Volumes Snapshots, accessed on https://kubernetes.io/docs/concepts/storage/volume-snapshots/, Oct. 20, 2024, 06 Pages.

Margaret Rouse, "application containerization (app containerization)", TechTarget, accessed on https://www.techtarget.com/searchitoperations/definition/application-containerization-app-containerization, Jul. 2019, available on https://web.archive.org/web/20190703014111/http://searchitoperations.techtarget.com/definition/application-containerization-app-containerization, Mar. 29, 2024, 7 pages.

Margaret Rouse, "Definition of Availability Zones", TechTarget, accessed on searchaws.techtarget.com/definition/availability-zones, Apr. 26, 2019, available on https://web.archive.org/web/20180911194556/https://searchaws.techtarget.com/definition/availability-zones, Dec. 4, 2023, 5 pages.

Mell et al., The NIST Definition of Cloud Computing, 800-145, Sep. 2011, 7 pages.

Nodes, Kubernetes Documentation, accessed on https://kubernetes.io/docs/concepts/architecture/nodes/, Jul. 20, 2021, available on https://web.archive.org/web/20210720150000/https://kubernetes.io/docs/concepts/architecture/nodes/, Mar. 29, 2024, 7 pages.

Nodes, Kubernetes Documentation, accessed on kubernetes.io/docs/concepts/architecture/nodes/, Nov. 15, 2023, available on https://web.archive.org/web/20231022072837/kubernetes.io/docs/concepts/architecture/nodes/, Oct. 3, 2024, 12 pages.

Persistent Volumes, Kubernetes Documentation accessed on kubernetes.io/docs/concepts/storage/persistent-volumes/ Nov. 15, 2023, available on https://web.archive.org/web/20231106194609/kubernetes.io/docs/concepts/storage/persistent-volumes/, Oct. 3, 2024, 27 pages.

Pods, Kubernetes Documentation accessed on kubernetes.io/docs/concepts/workloads/pods/, Nov. 15, 2023, available on https://web.archive.org/web/20231115053846/kubernetes.io/docs/concepts/workloads/pods/, Oct. 3, 2024, 9 pages.

Restoring a Kubernetes etcd Snapshot to a File System, retrieved Jun. 17, 2022, in 2 pages. (https://documentation.commvault.com/2022e/essential/148992_restoring_kubernetes_etcd_snapshot_to_file_system.html).

Rosenblum et al., "The Design and Implementation of a Log-Structure File System," Operating Systems Review SIGOPS, vol. 25, No. 5, May 1991, New York, US, pp. 1-14.

The Kubernetes API, Kubernetes Documentation, accessed on kubernetes.io/docs/concepts/overview/kubernetes-api/, Nov. 15, 2023, available on https://web.archive.org/web/20231104151900/https://kubernetes.io/docs/concepts/overview/kubernetes-api/, Oct. 3, 2024, 5 pages.

Velero. "Documentation." Nov. 2019. https://velero.io/docs/v1 .2.0. Sections: "How Velero Works", "Backup Storage Locations and

(56)          References Cited

OTHER PUBLICATIONS

Volume Snapshot Locations", "Restic Integration", "Disaster recovery", "Cluster migration", and "Restore Reference", 22 Pages.
Viewing Pods and Nodes, Kubernetes Documentation, accessed on https://kubernetes.io/docs/tutorials/kubernetes-basics/explore/explore-intro/, 2021, available on https://web.archive.org/web/20210622203553/http://kubernetes.io/docs/tutorials/kubernetes-basics/explore/explore-intro/, Mar. 29, 2024, 3 pages.
Viewing Pods and Nodes, Kubernetes Documentation, accessed on kubernetes.io/docs/tutorials/kubernetes-basics/explore/explore-intro/, Nov. 17, 2023, available on https://web.archive.org/web/20231022072847/kubernetes.io/docs/tutorials/kubernetes-basics/explore/explore-intro/, Oct. 3, 2024, 5 pages.
Watts et al. "SaaS vs PaaS vs IaaS: What's the Difference & How to Choose", BMC Blogs, BMC Software, Inc., accessed on https://www.bmc.com/blogs/saas-vs-paas-vs-iaas-whats-the-difference-and-how-to-choose/, Jun. 15, 2019, 18 Pages.
What is Kubernetes?, Kubernetes Documentation, accessed on https://kubernetes.io/docs/concepts/architecture/nodes/, Jul. 2021, available on https://web.archive.org/web/20210724121336/https://kubernetes.io/docs/concepts/overview/what-is-kubernetes/, Mar. 29, 2024, 4 pages.
Wikipedia, "Cloud computing," <http://en.wikipedia.org/wiki/Cloud-computing>, 2009, 11 pages.
Wikipedia, "Cluster (file system)," <http://en.wikipedia.org/wiki/Cluster.sub.--%,28file.sub.--system%29>-;, internet accessed Jul. 25, 2008, 1 page.
Wikipedia, "Docker", accessed on https://en.wikipedia.org/wiki/Docker, 2021, available on https://web.archive.org/web/20210501184126/http://en.wikipedia.org/wiki/Docker, Mar. 29, 2024, 2 pages.
Wikipedia, "Kubernetes—Volumes", accessed on https://en.wikipedia.org/wiki/Kubernetes#Volumes, Jul. 2021, available on https://web.archive.org/web/20210723152834/http://en.wikipedia.org/wiki/Kubernetes#Volumes, Mar. 29, 2024, 16 pages.
Wikipedia, "Logical Volume Management," <http://en.wikipedia.org/wiki/Logical_volume_management>, internet accessed on Mar. 26, 2008, 5 pages.
Wikipedia, Cloud Computing, en.wikipedia.org/wiki/Cloud_computing, accessed on Apr. 26, 2019, 13 Pages.
Wikipedia, Container Linux | Cluster infrastructure accessed athttps://en.wikipedia.org/wiki/Container_Linux#ETCD on May 13, 2024, 13 Pages.
Wikipedia, "Docker (software)", accessed on https://en.wikipedia.org/wiki/Docker_(software), 2019 , available on https://web.archive.org/web/20190403180753/https://en.wikipedia.org/wiki/Docker_(software), May 27, 2024, 9 pages.

* cited by examiner

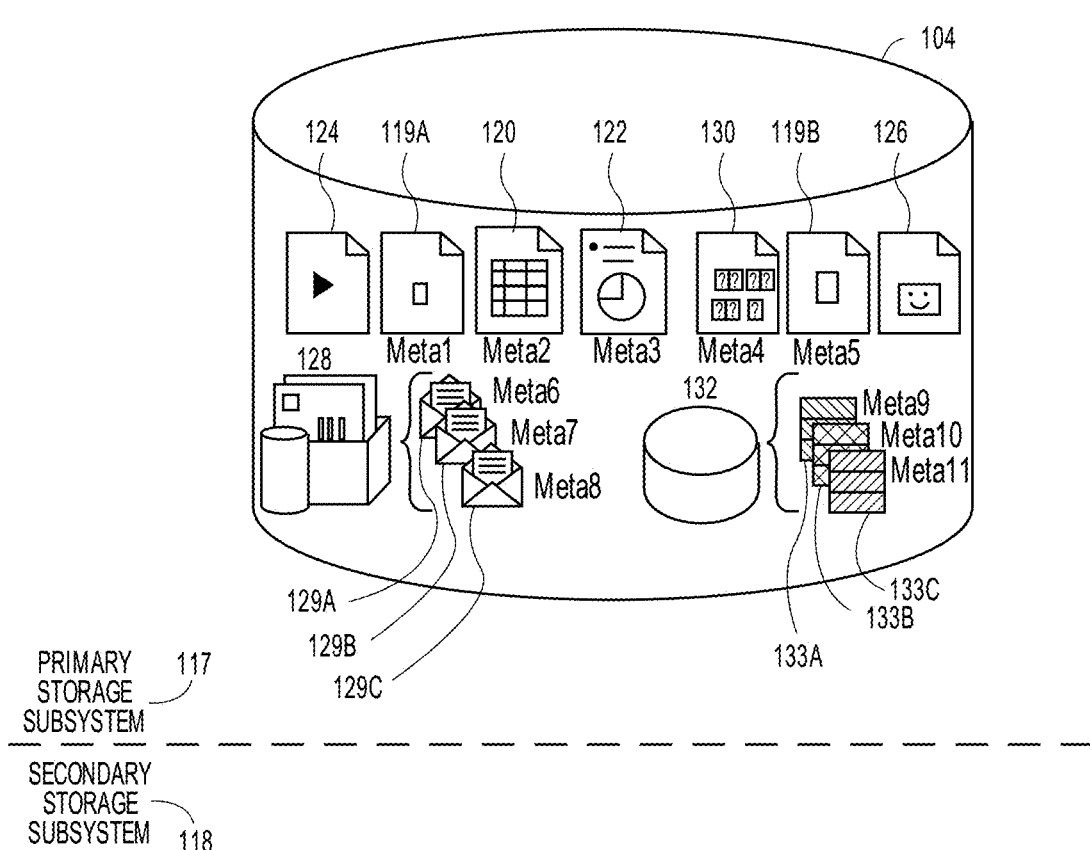
PRIMARY STORAGE SUBSYSTEM 117
SECONDARY STORAGE SUBSYSTEM 118
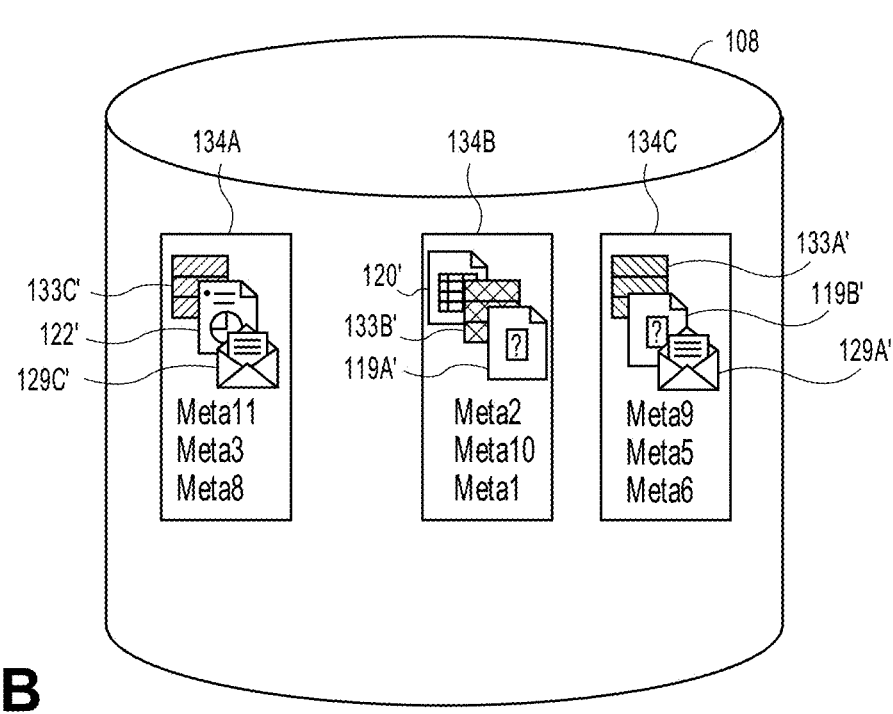
FIG. 1B

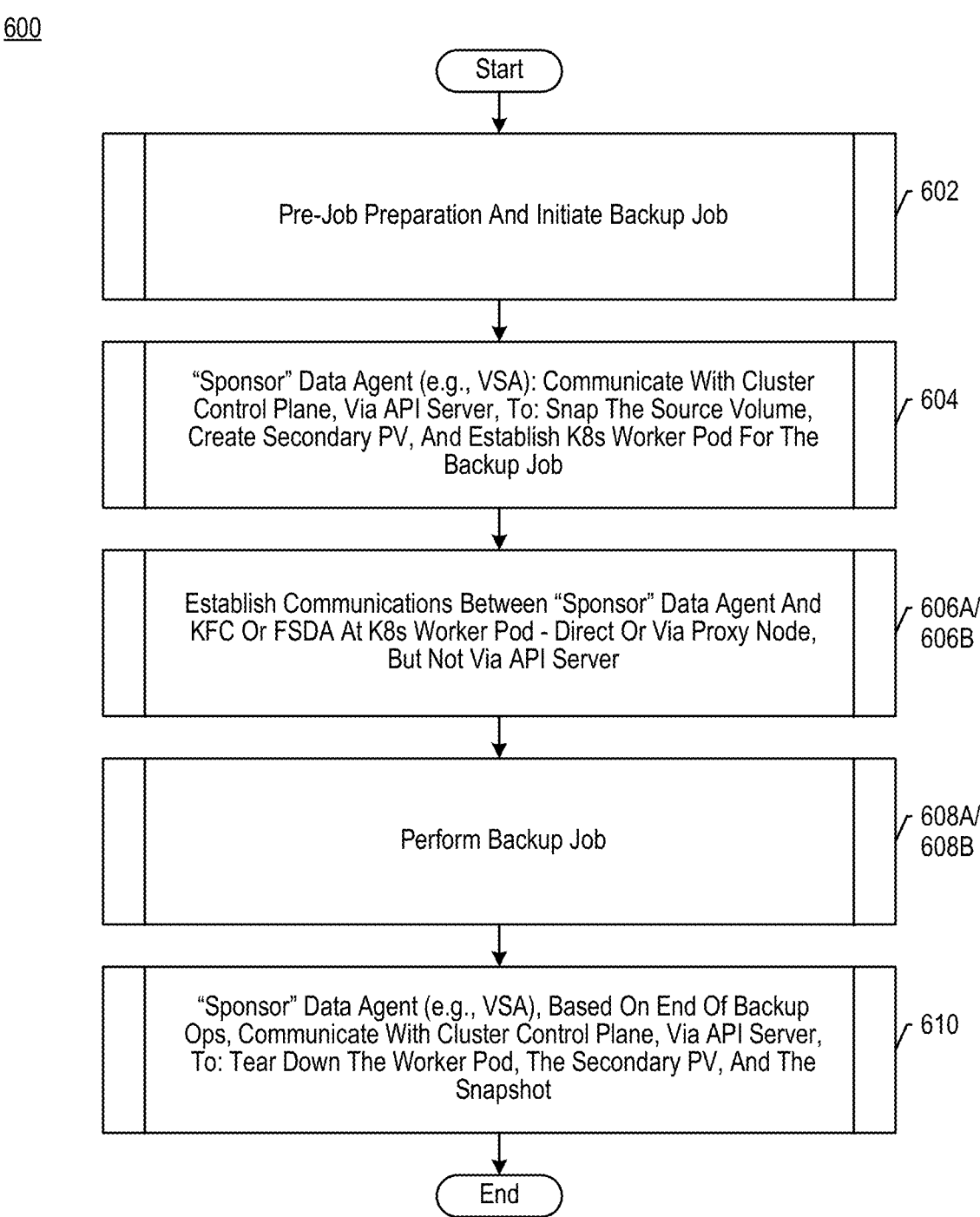

600

Start

Pre-Job Preparation And Initiate Backup Job                                          602

"Sponsor" Data Agent (e.g., VSA): Communicate With Cluster
Control Plane, Via API Server, To: Snap The Source Volume,
Create Secondary PV, And Establish K8s Worker Pod For The
Backup Job                                                                           604

Establish Communications Between "Sponsor" Data Agent And
KFC Or FSDA At K8s Worker Pod - Direct Or Via Proxy Node,           606A/
But Not Via API Server                                             606B Perform Backup Job                                                 608A/
                                                                   608B "Sponsor" Data Agent (e.g., VSA), Based On End Of Backup
Ops, Communicate With Cluster Control Plane, Via API Server,                        610
To: Tear Down The Worker Pod, The Secondary PV, And The
Snapshot End

FIG. 6

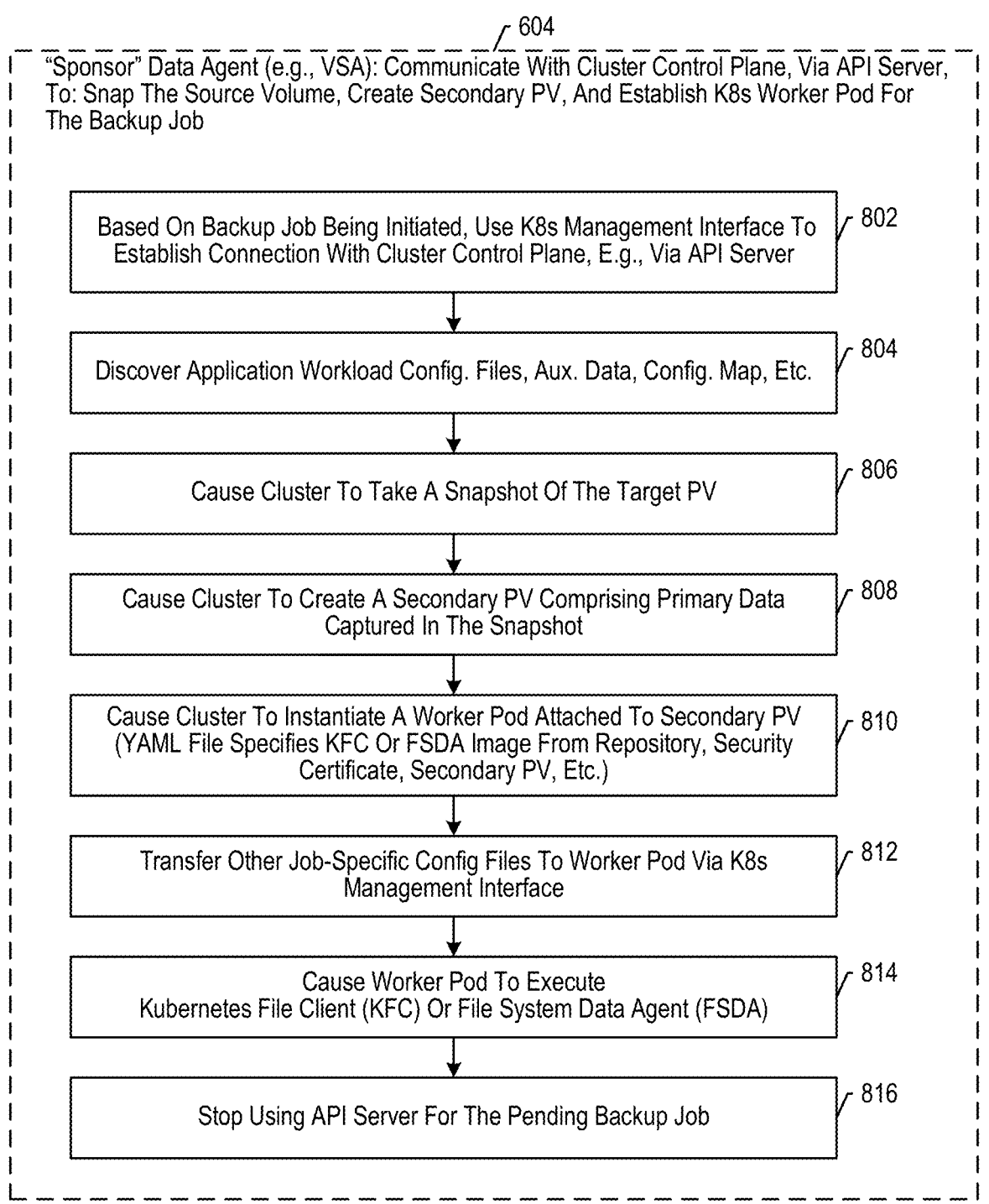

604

"Sponsor" Data Agent (e.g., VSA): Communicate With Cluster Control Plane, Via API Server, To: Snap The Source Volume, Create Secondary PV, And Establish K8s Worker Pod For The Backup Job Based On Backup Job Being Initiated, Use K8s Management Interface To Establish Connection With Cluster Control Plane, E.g., Via API Server  / 802

Discover Application Workload Config. Files, Aux. Data, Config. Map, Etc.  / 804

Cause Cluster To Take A Snapshot Of The Target PV  / 806

Cause Cluster To Create A Secondary PV Comprising Primary Data Captured In The Snapshot  / 808

Cause Cluster To Instantiate A Worker Pod Attached To Secondary PV (YAML File Specifies KFC Or FSDA Image From Repository, Security Certificate, Secondary PV, Etc.)  / 810

Transfer Other Job-Specific Config Files To Worker Pod Via K8s Management Interface  / 812

Cause Worker Pod To Execute Kubernetes File Client (KFC) Or File System Data Agent (FSDA)  / 814

Stop Using API Server For The Pending Backup Job  / 816

FIG. 8

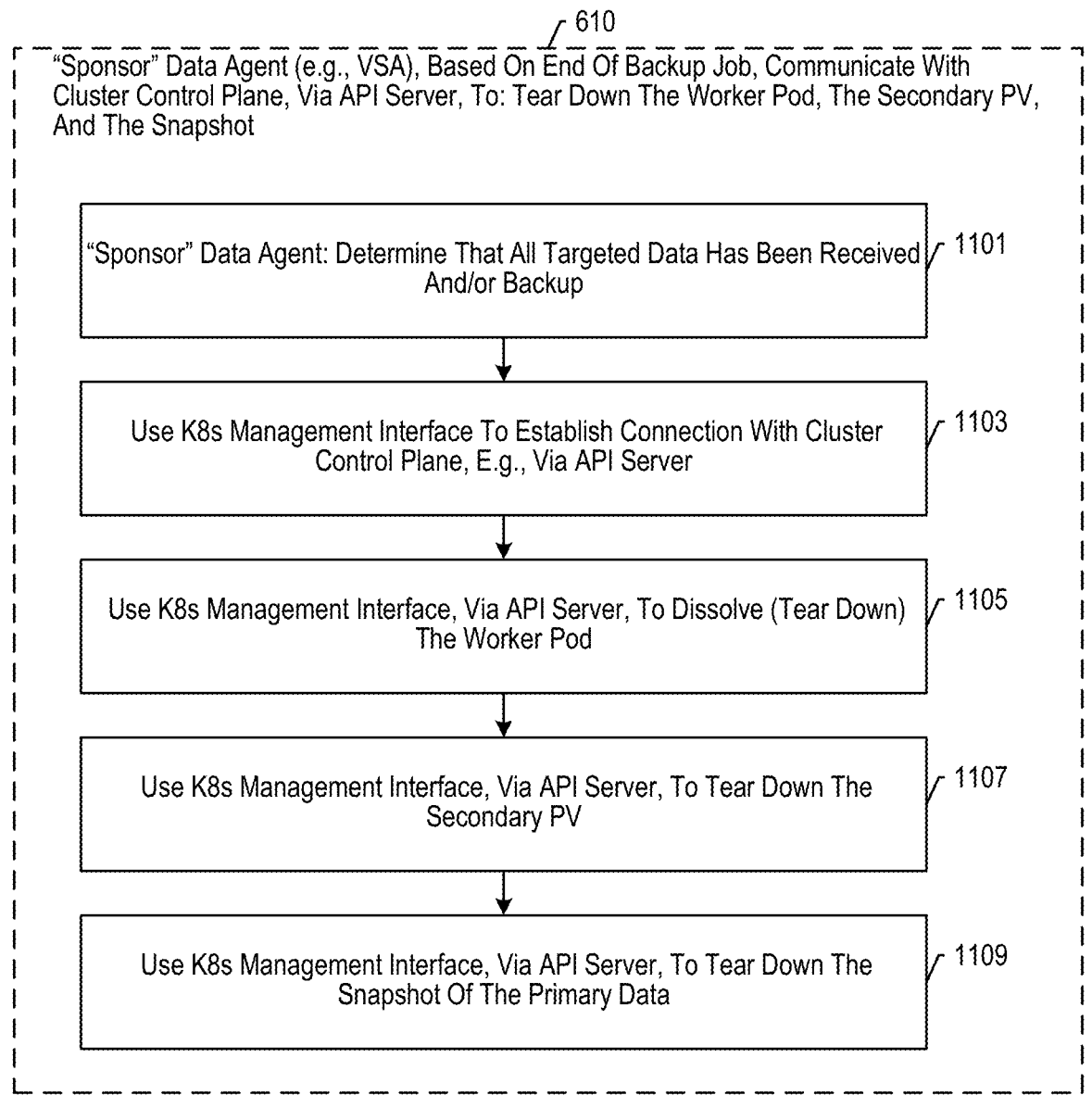

┌─ 610

"Sponsor" Data Agent (e.g., VSA), Based On End Of Backup Job, Communicate With Cluster Control Plane, Via API Server, To: Tear Down The Worker Pod, The Secondary PV, And The Snapshot "Sponsor" Data Agent: Determine That All Targeted Data Has Been Received And/or Backup — 1101

Use K8s Management Interface To Establish Connection With Cluster Control Plane, E.g., Via API Server — 1103

Use K8s Management Interface, Via API Server, To Dissolve (Tear Down) The Worker Pod — 1105

Use K8s Management Interface, Via API Server, To Tear Down The Secondary PV — 1107

Use K8s Management Interface, Via API Server, To Tear Down The Snapshot Of The Primary Data — 1109

FIG. 11

KUBERNETES DATA PROTECTION USING A CONTAINERIZED FILE SYSTEM DATA AGENT

INCORPORATION BY REFERENCE TO ANY PRIORITY APPLICATIONS

This application claims the benefit of priority to Provisional U.S. Pat. App. 63/600,902 filed on 20 Nov. 2023, which is hereby incorporated by reference in its entirety herein. Any and all applications for which a foreign or domestic priority claim is identified in the Application Data Sheet of the present application are hereby incorporated by reference in their entireties under 37 CFR 1.57. This application is related to co-filed U.S. patent application Ser. No. 18/934,284 having the title of "Kubernetes Data Protection Using A Containerized File System Data Agent."

COPYRIGHT NOTICE

BACKGROUND

Businesses recognize the commercial value of their data and seek reliable ways to protect the information stored on their computer networks while minimizing impact on productivity. A streamlined approach is needed for protecting data generated in application orchestrator computing environments, such as data generated in a Kubernetes cluster, whether the cluster operates in a cloud computing environment or non-cloud.

SUMMARY

To have an efficient and sustainable framework to back up persistent volumes for Kubernetes, the present inventors devised technological solutions that overcome drawbacks presented by the prior art. Because Kubernetes clusters can be ephemeral, it is important to back up in-cluster data to someplace outside the cluster. To that end, some prior art solutions used the cluster's API server, which facilitates communications with the cluster control plane, to transfer backup data through the API server to external storage. The ready availability of the API server in every cluster presents an attractive resource. However, large data transfers can overwhelm the API server and its data connections, which are not designed for this purpose in the Kubernetes architecture. Moreover, in some Kubernetes deployments, the API server is configured behind a load balancer, and when the load balancer switches resources, it may interrupt the data transfer of a backup job, causing the backup job to start afresh. Thus, the API server as a data transfer node presents drawbacks.

To overcome these technological obstacles, the present inventors devised a more scalable and resilient approach that circumvents the API server, is customized to each job, and additionally includes more robust error checking, log capture, and realtime job monitoring. Accordingly, to back up data from a Kubernetes cluster, the API server is used for a limited time and for a limited purpose before the backup data transfer begins and again after the data transfer ends, and the backup data is routed over more robust dedicated communication pathways. For example, the API server is used for in-cluster preparation tasks, such as implementing snapshotting of the source data to be backed up and for establishing a worker pod within the Kubernetes cluster, the worker pod configured to host a temporary resource needed for the backup job. After the data transfer completes, the API server is used again for tearing down the worker pod and the snapshot-related data storage. The data being transferred in the backup job does not travel via the API server. This approach advantageously frees up the API server and ensures that data protection jobs are supplied with adequate and secure data transport on demand.

An illustrative data storage management system that operates outside the Kubernetes cluster provides a "sponsor" data agent that communicates with the API server for the setup and tear-down of temporary in-cluster resources needed for the backup job. However, the backup job does not use the API server as a transport node for backup data. The sponsor data agent operates off-cluster and participates actively in the backup job.

In-Cluster Kubernetes File Client. In one embodiment, when a backup job is, or is about to be, initiated, the sponsor data agent is responsible for deployment of a lightweight Kubernetes File Client on an in-cluster pod. The Kubernetes File Client transfers in-cluster data targeted by the backup job to the sponsor data agent, which then relays the data to an off-cluster media agent that generates and safely stores backup copies off-cluster. The in-cluster pod, the Kubernetes File Client, and all the other in-cluster resources deployed for the backup job are taken down after the data has been transferred off-cluster, thus freeing up cluster resources.

In-Cluster File System Data Agent. In a different embodiment, the sponsor data agent is responsible for deployment of a containerized File System Data Agent at the in-cluster pod. This approach further increases network optimization as compared to the preceding embodiment. In a backup job, the File System Data Agent transfers in-cluster data to an off-cluster media agent that generates and safely stores backup copies off-cluster. Unlike the Kubernetes File Client, the File System Data Agent communicates directly with the media agent. Consequently, the payload data and its associated metadata originating in-cluster are not routed via the sponsor data agent, and instead, the data transfer skips a hop by traveling directly from the File System Data Agent to the off-cluster media agent. The sponsor data agent plays other key roles by orchestrating the backup job and collecting logs and error messages from the in-cluster worker pod. Although it receives no payload data to back up, the sponsor data agent receives configuration files and workload-related metadata from the File System Data Agent and backs them up by way of the media agent. Thus, in this embodiment, the sponsor data agent does not process payload data and payload-related metadata being backed up from the cluster. The in-cluster pod, the File System Data Agent, and all the other in-cluster resources deployed for the backup job are taken down after the data has been transferred off-cluster, thus freeing up cluster resources.

More details on these and other embodiments are given below and in the accompanying figures.

BRIEF DESCRIPTION OF THE DRAWINGS

FIG. 1B is a detailed view of a primary storage device, a secondary storage device, and some examples of primary data and secondary copy data.

FIG. 6 depicts some salient operations of a method 600 according to some illustrative embodiments.

FIG. 8 depicts some salient operations of block 604 of method 600 according to an illustrative embodiment.

FIG. 11 depicts some salient operations of block 610 of method 600 according to an illustrative embodiment.

DETAILED DESCRIPTION

Detailed descriptions and examples of systems and methods according to one or more illustrative embodiments of the present invention may be found in the section entitled STREAMLINED DATA BACKUP FROM A KUBERNETES CLUSTER, as well as in FIGS. 3-11 herein. Furthermore, components and functionality for streamlined data backup from an application orchestrator computing environment such as a kubernetes cluster may be configured and/or incorporated into information management systems such as those described herein in FIGS. 1A-1H and 2A-2C. Various embodiments described herein are intimately tied to, enabled by, and would not exist except for, computer technology. For example, conducting backup operations of in-cluster data as described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
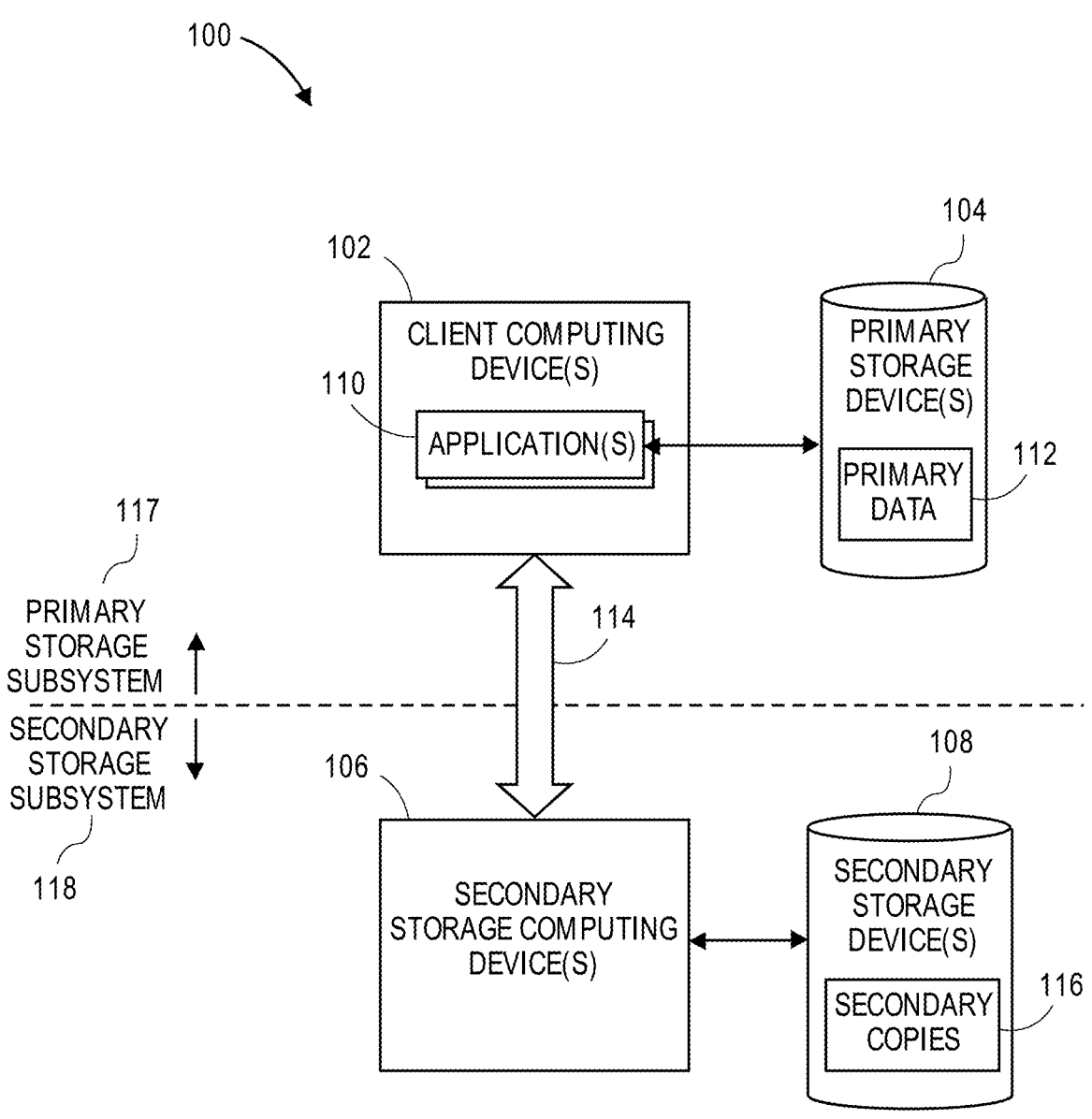
FIG. 1A is a block diagram illustrating an example information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like. Generally, the systems and associated components described herein may be compatible with and/or provide some or all of the functionality of the systems and corresponding components described in one or more of the following U.S. patents/ publications and patent applications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. No. 9,444,811, entitled "Using An Enhanced Data Agent To Restore Backed Up Data Across Autonomous Storage Management Systems";

U.S. Pat. No. 9,633,033 entitled "High Availability Distributed Deduplicated Storage System";

U.S. Pat. No. 10,228,962 entitled "Live Synchronization and Management of Virtual Machines across Computing and Virtualization Platforms and Using Live Synchronization to Support Disaster Recovery";

U.S. Pat. No. 10,255,143 entitled "Deduplication Replication In A Distributed Deduplication Data Storage System".

U.S. Pat. No. 10,592,145, entitled "Machine Learning-Based Data Object Storage";

U.S. Pat. No. 10,684,924 entitled "Data Restoration Operations Based on Network Path Information";

U.S. Pat. No. 11,561,866 entitled "Preparing Containerized Applications For Backup Using A Backup Services Container And A Backup Services Container-Orchestration Pod";

U.S. Pat. No. 12,032,855 entitled "Using An Application Orchestrator Computing Environment For Automatically Scaled Deployment Of Data Protection Resources Needed For Data In A Production Cluster Distinct From The Application Orchestrator Or In Another Application Orchestrator Computing Environment";

U.S. Pat. No. 12,135,618 entitled "Protecting Configuration Data In A Clustered Container System";

U.S. Patent Pub. No. 2006/0224846, entitled "System and Method to Support Single Instance Storage Operations" now abandoned;

U.S. Patent Pub. No. 2016/0350391 entitled "Replication Using Deduplicated Secondary Copy Data" now abandoned;

U.S. Patent Pub. No. 2017/0235647 entitled "Data Protection Operations Based on Network Path Information" now abandoned;

U.S. Pat. Pub. No. 2021/0011816 entitled "Preparing Containerized Applications For Backup Using A Backup Services Container In A Container-Orchestration Pod" now abandoned.

System 100 includes computers, computing devices, and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, California; Microsoft Virtual Server and Microsoft Windows Server Hyper-V, both by Microsoft Corporation of Redmond, Washington; Sun xVM by Oracle America Inc. of Santa Clara, California; and Xen by Citrix Systems, Santa Clara, California. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
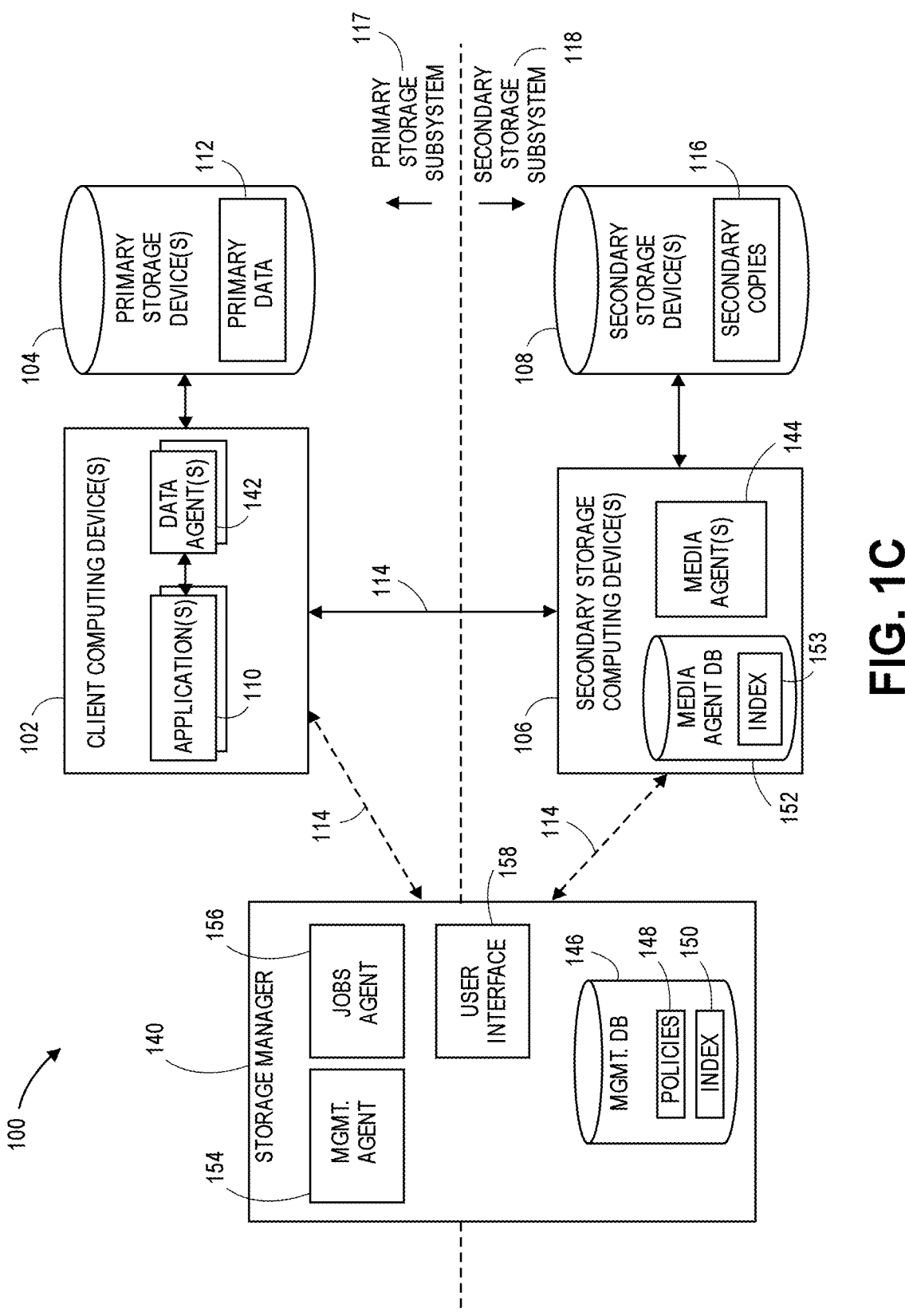
FIG. 1C is a block diagram of an example information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Example Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Example Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as inter- mediaries between client computing devices 102 (that gen- erate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary stor- age computing devices 106 and media agents 144 for interfacing with secondary storage devices 108 and/or for performing certain data processing operations can greatly improve the speed with which system 100 performs infor- mation management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capa- bility for writing to, reading from, instructing, communicat- ing with, or otherwise interacting with secondary storage devices 108.

Secondary storage computing device(s) 106 can comprise any of the computing devices described above, without limitation. In some cases, secondary storage computing device(s) 106 also include specialized hardware componen- try and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage comput- ing device 106 in turn may further process and convey the data or a processed version thereof to secondary storage device 108. One or more secondary copies 116 may be created from existing secondary copies 116, such as in the case of an auxiliary copy operation, described further below. Example Primary Data and an Example Secondary Copy FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation docu- ments 122, video files 124, image files 126, email mailboxes 128 (and corresponding email messages 129A-C), HTML/ XML or other types of markup language files 130, databases 132 and corresponding tables or other data structures 133A-

133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respec- tively). Moreover, as indicated by the prime mark ('), secondary storage computing devices 106 or other compo- nents in secondary storage subsystem 118 may process the data received from primary storage subsystem 117 and store a secondary copy including a transformed and/or supple- mented representation of a primary data object and/or meta- data that is different from the original format, e.g., in a compressed, encrypted, deduplicated, or other modified for- mat. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respec- tively. Also, secondary copy data object 134C represents primary data objects 133A, 119B, and 129A as 133A', 119B', and 129A', respectively, accompanied by corresponding metadata Meta9, Meta5, and Meta6, respectively.

Example Information Management System Architecture

System 100 can incorporate a variety of different hard- ware and software components, which can in turn be orga- nized with respect to one another in many different configu- rations, depending on the embodiment. There are critical design choices involved in specifying the functional respon- sibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary stor- age devices 108.

Storage Manager

Storage manager 140 is a centralized storage and/or information manager that is configured to perform certain control functions and also to store certain critical informa- tion about system 100—hence storage manager 140 is said to manage system 100. As noted, the number of components in system 100 and the amount of data under management can be large. Managing the components and data is therefore a significant task, which can grow unpredictably as the num- ber of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circum- stances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

- communicating with data agents 142 and media agents 144, including transmitting instructions, messages, and/or queries, as well as receiving status reports, index information, messages, and/or queries, and responding to same;
- initiating execution of information management operations;
- initiating restore and recovery operations;
- managing secondary storage devices 108 and inventory/capacity of the same;
- allocating secondary storage devices 108 for secondary copy operations;
- reporting, searching, and/or classification of data in system 100;
- monitoring completion of and status reporting related to information management operations and jobs;
- tracking movement of data within system 100;
- tracking age information relating to secondary copies 116, secondary storage devices 108, comparing the age information against retention guidelines, and initiating data pruning when appropriate;

- tracking logical associations between components in system 100;
- protecting metadata associated with system 100, e.g., in management database 146;
- implementing job management, schedule management, event management, alert management, reporting, job history maintenance, user security management, disaster recovery management, and/or user interfacing for system administrators and/or end users of system 100;
- sending, searching, and/or viewing of log files; and
- implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural consider-ations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineer-ing, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applica-tions, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differ-ences among applications 110 and/or the operating system of client computing device 102. Each data agent 142 is there-fore advantageously configured in some embodiments to assist in the performance of information management opera-tions based on the type of data that is being protected at a client-specific and/or application-specific level.

Data agent 142 is a component of information system 100 and is generally directed by storage manager 140 to partici-pate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information man-agement operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instruc-tions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client com-puting device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommo-date multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other inter-mediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and correspond-ing media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
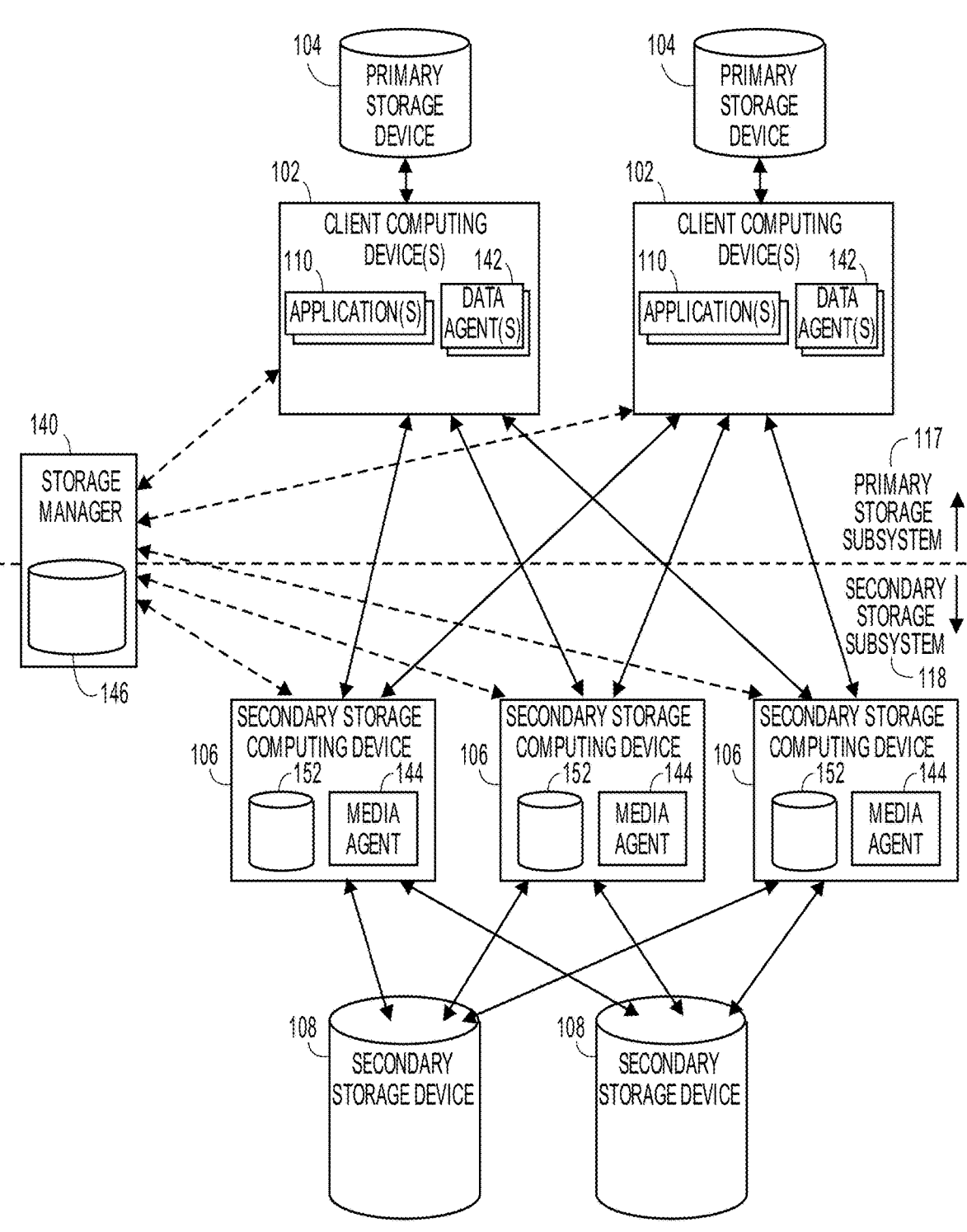
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Example Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., data block signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Patent Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and can make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Example auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to mitigate recognized risks dynamically and automatically, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Example information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one example scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Example Storage Policy and Secondary Copy Operations

Figure 1E:
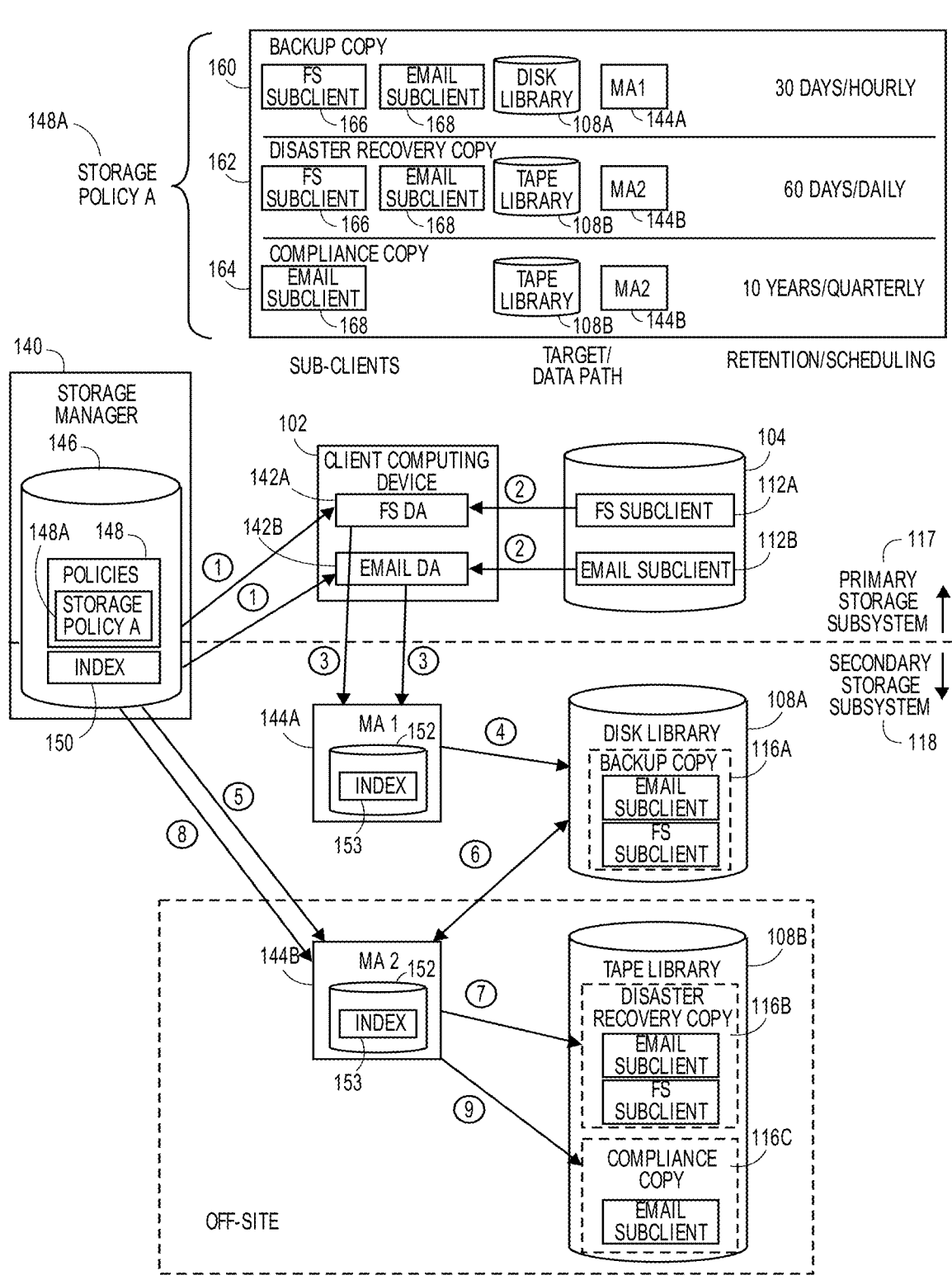
FIG. 1E illustrates certain secondary copy operations according to an example storage policy.

FIG. 1E includes a data flow diagram depicting performance of secondary copy operations by an embodiment of information management system 100, according to an example storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The example storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Example Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Example Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578, 120.

Figures 1F, 1G:
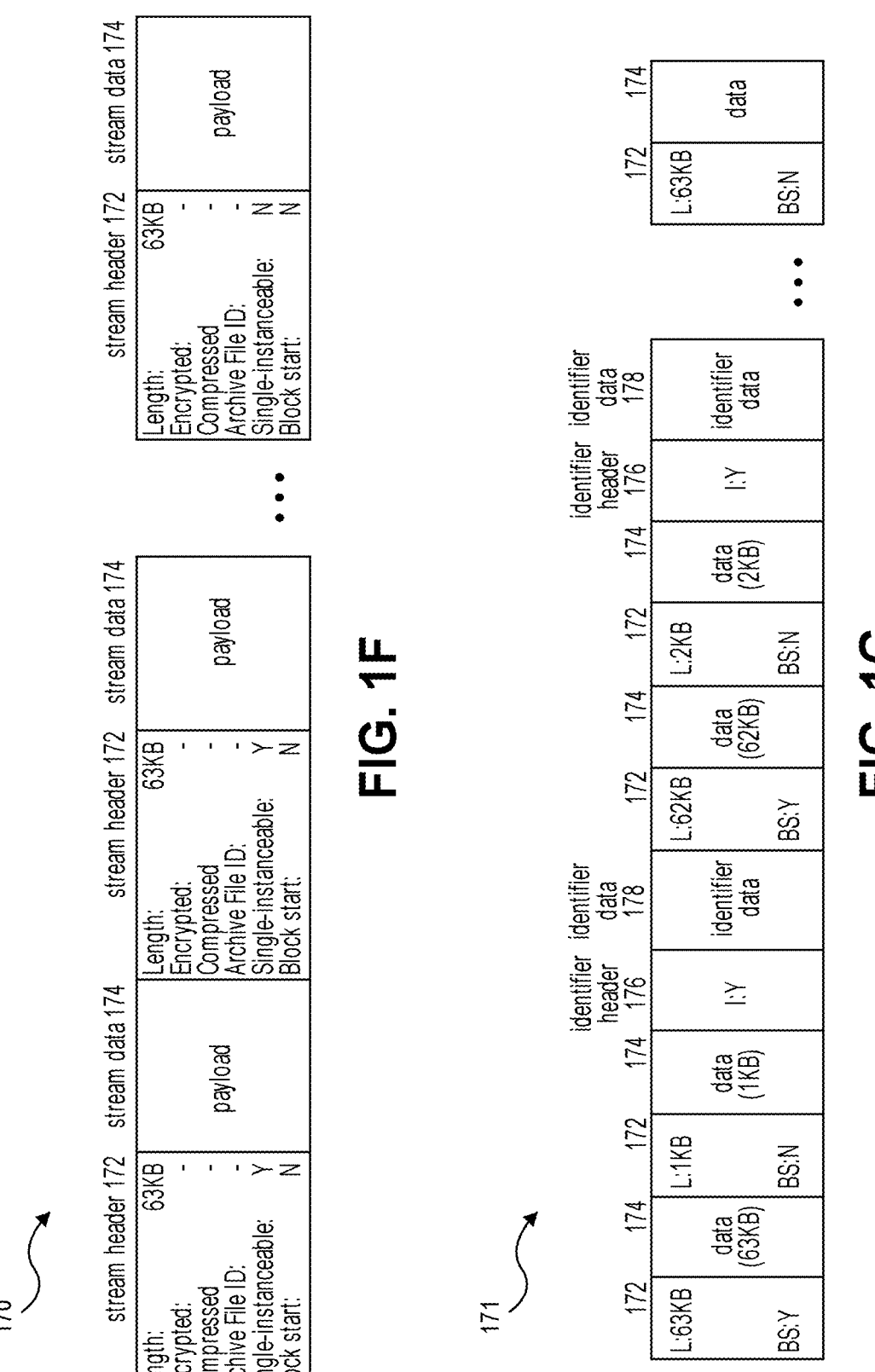
FIGS. 1F-1H are block diagrams illustrating suitable data structures that may be employed by the information management system.

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
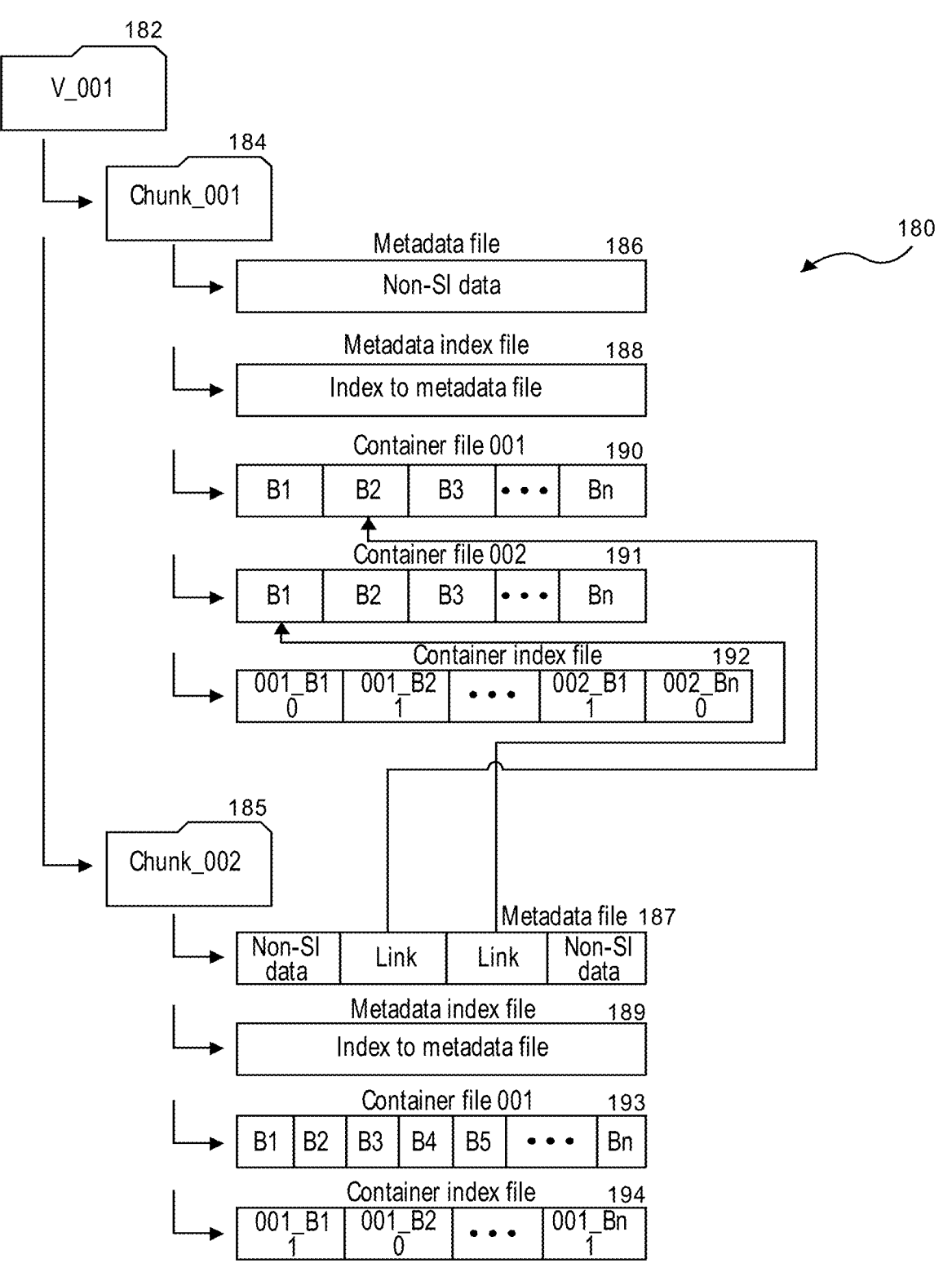

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
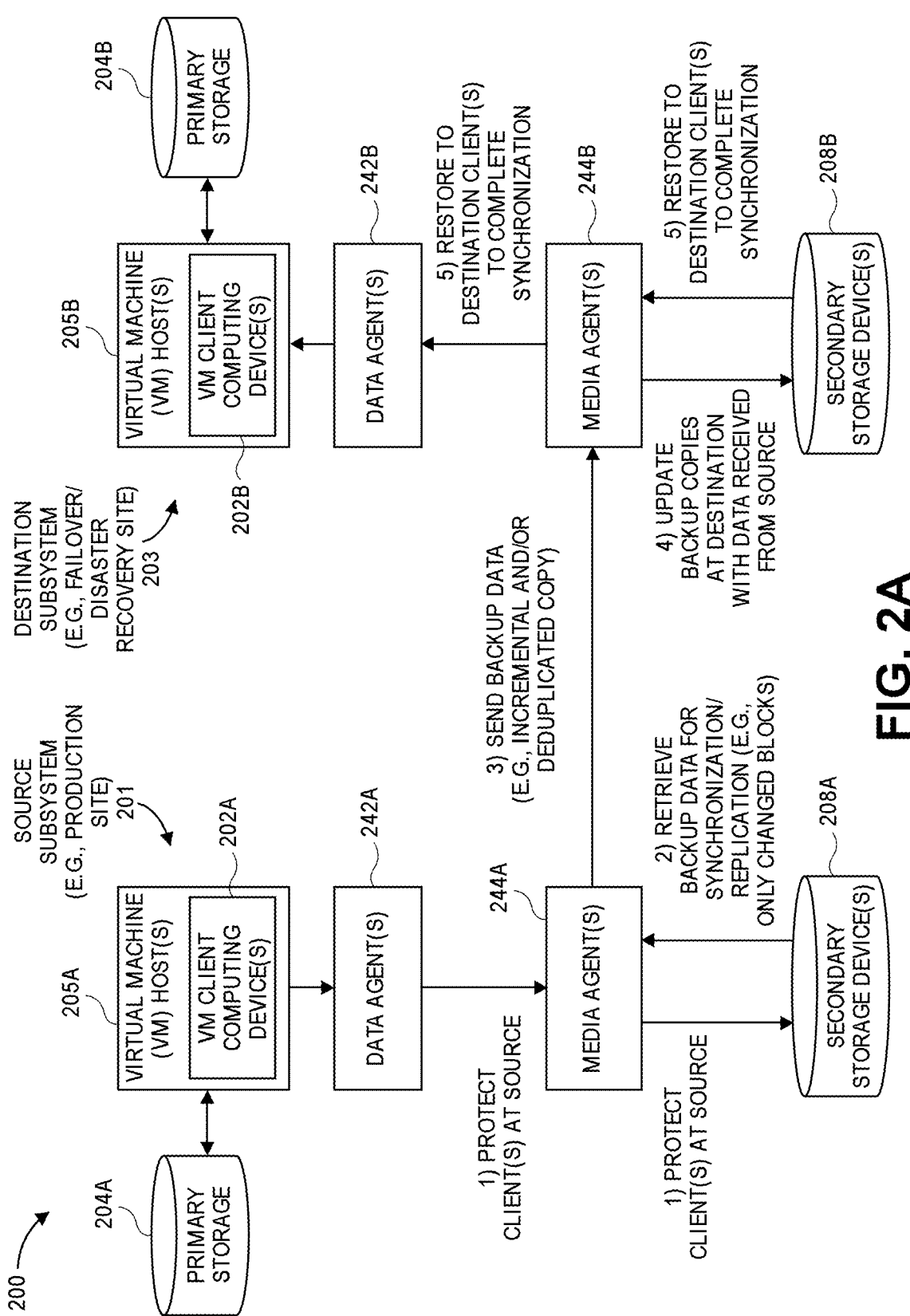
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Pat. No. 10,228,962 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. Patent Pub. No. 2016/0350391 entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating With the Cloud Using File System Protocols

Figure 2B:
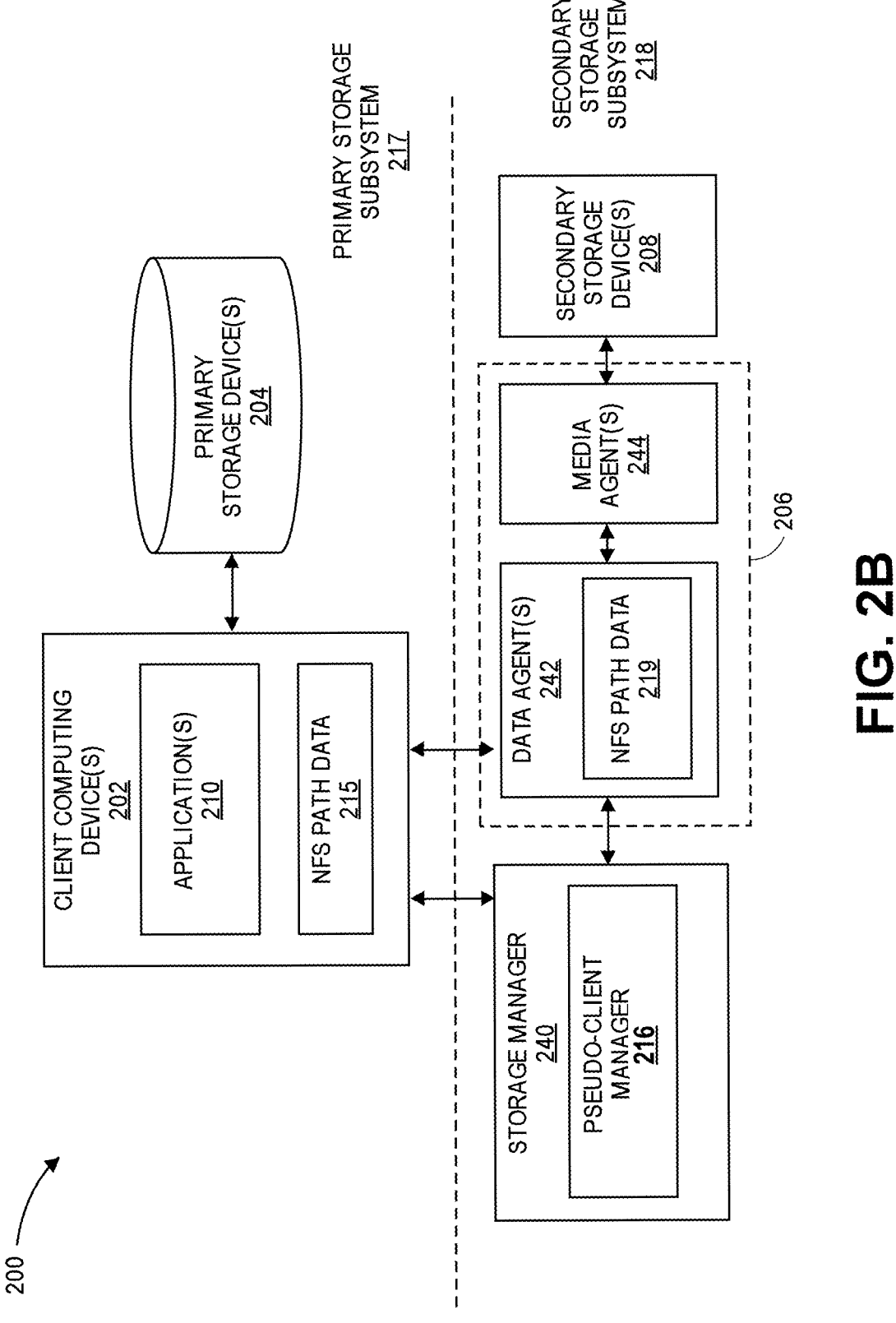
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Pub. No. 2017/0235647 entitled "Data Protection Operations Based on Network Path Information." Examples of improved data restoration scenarios based on network-path information, including using stored backups effectively as primary data sources, may be found in U.S. Pat. No. 10,684,924 entitled "Data Restoration Operations Based on Network Path Information."

Highly Scalable Managed Data Pool Architecture

Figure 2C:
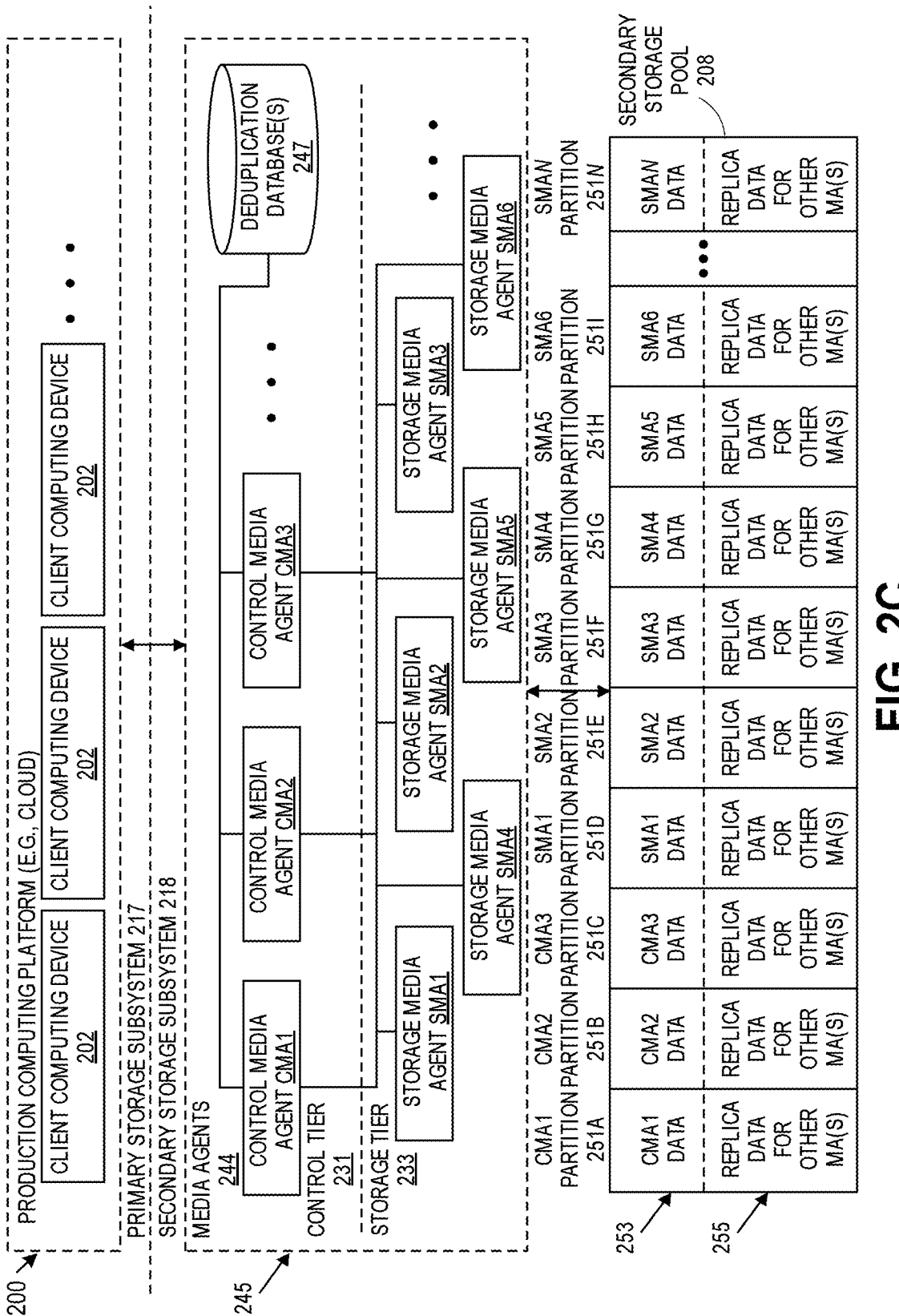
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. No. 9,633,033 entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Pat. No. 10,255,143 entitled "Deduplication Replication In A Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Cloud Computing. The National Institute of Standards and Technology (NIST) provides the following definition of Cloud Computing characteristics, service models, and deployment models:

Cloud Computing

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Essential Characteristics:

On-demand self-service. A consumer can unilaterally provision computing capabilities, such as server time and network storage, as needed automatically without requiring human interaction with each service provider.

Broad network access. Capabilities are available over the network and accessed through standard mechanisms that promote use by heterogeneous thin or thick client platforms (e.g., mobile phones, tablets, laptops, and workstations).

Resource pooling. The provider's computing resources are pooled to serve multiple consumers using a multitenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, and network bandwidth.

Rapid elasticity. Capabilities can be elastically provisioned and released, in some cases automatically, to scale rapidly outward and inward commensurate with demand. To the consumer, the capabilities available for provisioning often appear to be unlimited and can be appropriated in any quantity at any time.

Measured service. Cloud systems automatically control and optimize resource use by leveraging a metering capability[1] at some level of abstraction appropriate to the type of service (e.g., storage, processing, bandwidth, and active user accounts). Resource usage can be monitored, controlled, and reported, providing transparency for both the provider and consumer of the utilized service.

[1] Typically this is done on a pay-per-use or charge-per-use basis.

Service Models:

Software as a Service (SaaS). The capability provided to the consumer is to use the provider's applications running on a cloud infrastructure[2]. The applications are accessible from various client devices through either a thin client interface, such as a web browser (e.g., web-based email), or a program interface. The consumer does not manage or control the underlying cloud infrastructure including network, servers, operating systems, storage, or even individual application capabilities, with the possible exception of limited user-specific application configuration settings.

[2] A cloud infrastructure is the collection of hardware and software that enables the five essential characteristics of cloud computing. The cloud infrastructure can be viewed as containing both a physical layer and an abstraction layer. The physical layer consists of the hardware resources that are necessary to support the cloud services being provided, and typically includes server, storage and network components. The abstraction layer consists of the software deployed across the physical layer, which manifests the essential cloud characteristics. Conceptually the abstraction layer sits above the physical layer.

Platform as a Service (PaaS). The capability provided to the consumer is to deploy onto the cloud infrastructure consumer-created or acquired applications created using programming languages, libraries, services, and tools supported by the provider.[3] The consumer does not manage or control the underlying cloud infrastructure including network, servers, operating systems, or storage, but has control over the deployed applications and possibly configuration settings for the application-hosting environment.

[3] This capability does not necessarily preclude the use of compatible programming languages, libraries, services, and tools from other sources.

Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, and deployed applications; and possibly limited control of select networking components (e.g., host firewalls).

Deployment Models:

Private cloud. The cloud infrastructure is provisioned for exclusive use by a single organization comprising multiple consumers (e.g., business units). It may be owned, managed, and operated by the organization, a third party, or some combination of them, and it may exist on or off premises.

Community cloud. The cloud infrastructure is provisioned for exclusive use by a specific community of consumers from organizations that have shared concerns (e.g., mission, security requirements, policy, and compliance considerations). It may be owned, managed, and operated by one or more of the organizations in the community, a third party, or some combination of them, and it may exist on or off premises.

Public cloud. The cloud infrastructure is provisioned for open use by the general public. It may be owned, managed, and operated by a business, academic, or government organization, or some combination of them. It exists on the premises of the cloud provider.

Hybrid cloud. The cloud infrastructure is a composition of two or more distinct cloud infrastructures (private, community, or public) that remain unique entities, but are bound together by standardized or proprietary technology that enables data and application portability (e.g., cloud bursting for load balancing between clouds).

Source: Peter Mell, Timothy Grance (September 2011). *The NIST Definition of Cloud Computing, National Institute of Standards and Technology: U.S. Department of Commerce. Special publication* 800-145. nvlpubs.nist.gov/nistpubs/Legacy/SP/nistspecialpublication800-145.pdf (accessed 26 Apr. 2019). Cloud computing aims to allow those who consume the services (whether individuals or organizations) to benefit from the available technologies without the need for deep knowledge about or expertise with each of them. Wikipedia, Cloud Computing, en.wikipedia.org/wiki/Cloud_computing (accessed 26 Apr. 2019). "Cloud computing metaphor: the group of networked elements providing services need not be individually addressed or managed by users; instead, the entire provider-managed suite of hardware and software can be thought of as an amorphous cloud." Id.

Cloud Service Accounts and Variability in Cloud Services. Cloud service providers such as Amazon, Microsoft, Google, etc. provide access to their particular cloud services via cloud service accounts, such as corporate accounts, departmental accounts, individual user accounts, etc. Each cloud service account typically has authentication features, e.g., passwords, certificates, etc., to restrict and control access to the cloud service. Each account also might have service level guarantees and/or other terms and conditions between the cloud service provider and the service subscriber, e.g., a company, a government agency, an individual user. A subscribing entity might have multiple accounts with a cloud service provider, such as an account for the Engineering department, an account for the Finance department, an account for the Human Resources department, other accounts for individual company users, etc., without limitation. Each cloud service account carries different authentication, even though the subscriber is the same entity. Different cloud service accounts might differ not just in service level guarantees, but might include different services.

Cloud Availability Zones. "Availability zones (AZs) are isolated locations within . . . regions from which public cloud services originate and operate. Regions are geographic locations in which public cloud service providers' data centers reside. Businesses choose one or multiple worldwide availability zones for their services depending on business needs. Businesses select availability zones for a variety of reasons, including compliance and proximity to end customers. Cloud administrators can also choose to replicate services across multiple availability zones to decrease latency or protect resources. Admins can move resources to another availability zone in the event of an outage. Certain cloud services may also be limited to particular regions or AZs." Source: Margaret Rouse, Definition of Availability Zones, TechTarget, searchaws.techtarget.com/definition/availability-zones (accessed 26 Apr. 2019).

Traditional Non-Cloud ("On-Premises") Data Centers are Distinguishable from Cloud Computing. Traditional data centers generally do not have cloud computing characteristics. For example, the user experience is generally different, for example in regard to the name space(s) used for the storage, computing, and network resources. Moreover, substantial increases in resources needed by a user are not provisioned on demand. A traditional data center is physically located within the enterprise/organization that owns it. A traditional non-cloud data center might comprise computing resources such as servers, mainframes, virtual servers/clusters, etc.; and/or data storage resources, such as network-attached storage, storage area networks, tape libraries, etc. The owner of the traditional data center procures hardware, software, and network infrastructure (including making the associated capital investments); and manages going-forward planning for the data center. A traditional data center is staffed by professional Information Technology (IT) personnel, who are responsible for the data center's configuration, operation, upgrades, and maintenance. Thus, a traditional non-cloud data center can be thought of as self-managed by its owner/operator for the benefit of in-house users, as compared to cloud computing, which is managed by the cloud service provider and supplied as a service to outside subscribers. Clearly, a cloud computing service also has hardware, software, and networking infrastructure and professionals staffing it, as well as having an owner responsible for housing and paying for the infrastructure. However, the cloud computing service is consumed differently, served differently, and deployed differently compared to non-cloud data centers. Traditional non-cloud data centers are sometimes referred to as "on-premises" data centers, because their facilities are literally within the bounds of the organization that owns the data center. Cloud service providers' data centers generally are not within the bounds of the subscriber organization and are consumed "at a distance" "in the cloud."

Kubernetes. Kubernetes is an example of an application orchestrator computing environment (a/k/a container-orchestration system). "Kubernetes is a portable, extensible, open-source platform for managing containerized workloads and services, that facilitates both declarative configuration and automation." Kubernetes Documentation|Concepts|Overview, kubernetes.io/docs/concepts/overview/what-is-kubernetes/ (accessed Jul. 20, 2021). "Kubernetes runs your workload by placing containers into Pods to run on Nodes. A node may be a virtual or physical machine, depending on the cluster. Each node is managed by the control plane and contains the services necessary to run Pods. Typically you have several nodes in a cluster. . . . The components on a node include the kubelet, a container runtime, and the kube-proxy." Kubernetes Documentation|Concepts|Cluster Architecture|Nodes, kubernetes.io/docs/concepts/architecture/nodes/ (accessed Jul. 20, 2021). "Filesystems in the Kubernetes container provide ephemeral storage, by default. This means that a restart of the pod will wipe out any data on such containers. . . . A Kubernetes Volume provides persistent storage that exists for the lifetime of the pod itself. This storage can also be used as shared disk space for containers within the pod." Wikipedia|Kubernetes|Volumes, en.wikipedia.org/wiki/Kubernetes #Volumes (accessed Jul. 21, 2021). "A Pod is a group of one or more application containers (such as Docker) and includes shared storage (volumes), IP address and information about how to run." Kubernetes Documentation|Tutorials|Learn Kubernetes Basics|Explore Your App|Viewing Pods and Nodes, kubernetes.io/docs/tutorials/kubernetes-basics/explore/explore-intro/ (accessed Jul. 20, 2021). "A Pod always runs on a Node. A Node is a worker machine in Kubernetes and may be either a virtual or a physical machine, depending on the cluster. Each Node is managed by the control plane. A Node can have multiple pods, and the Kubernetes control plane automatically handles scheduling the pods across the Nodes in the cluster. The control plane's automatic scheduling takes into account the available resources on each Node" Id.

"The kubelet is the primary 'node agent' that runs on each node. It can register the node with the apiserver using one of: the hostname; a flag to override the hostname; or specific logic for a cloud provider. . . . The kubelet takes a set of PodSpecs [object that describes a pod] that are provided through various mechanisms (primarily through the apiserver) and ensures that the containers described in those PodSpecs are running and healthy." Kubernetes Documentation|Reference|Component tools|kubelet, kubernetes.io/docs/reference/command-line-tools-reference/kubelet/ (accessed May 22, 2020).

A software container (a/k/a application container or container runtime) is an operating system-virtualization (OS-virtualization) service such as a Docker container. "Docker is a set of platform as a service (PaaS) products that use OS-level virtualization to deliver software in packages called containers. Containers are isolated from one another and bundle their own software, libraries and configuration files; they can communicate with each other through well-defined channels. Because all of the containers share the services of a single operating system kernel, they use fewer resources than virtual machines." Wikipedia|Docker (software), en.wikipedia.org/wiki/Docker (software) (accessed Jul. 21, 2021). Kubernetes may use Docker containers in its pods, but is not limited to Docker for OS-virtualization. Software that runs in a software container is said to be containerized. "Application containerization is an OS-level virtualization method used to deploy and run distributed applications without launching an entire virtual machine (VM) for each app [application]. Multiple isolated applications or services run on a single host and access the same OS kernel. Containers work on bare-metal systems, cloud instances and virtual machines, across Linux and select Windows and Mac OSes [operating systems] . . . . Application containers include the runtime components—such as files, environment variables and libraries—necessary to run the desired software. Application containers consume fewer resources than a comparable deployment on virtual machines because containers share resources without a full operating system to underpin each app. The complete set of information to execute in a container is the image. The container engine deploys these images on hosts. [A] common app containerization technology is Docker, specifically the open source Docker Engine and containers based on universal runtime runC." Application Containerization, searchitoperations.techtarget.com/definition/application-containerization-app-containerization (accessed Jul. 5, 2019).

The Kubernetes control plane is accessed via the API server deployed in each Kubernetes cluster. "The core of Kubernetes' control plane is the API server. The API server exposes an HTTP API that lets end users, different parts of your cluster, and external components communicate with one another. The Kubernetes API lets you query and manipulate the state of API objects in Kubernetes (for example: Pods, Namespaces, ConfigMaps, and Events)." Kubernetes Documentation|Concepts|Overview|The Kubernetes API, kubernetes.io/docs/concepts/overview/kubernetes-api/ (accessed Nov. 15, 2023). See also Kubernetes Documentation|Concepts|Cluster Architecture|Communication between Nodes and the Control Plane, kubernetes.io/docs/concepts/architecture/control-plane-node-communication/ (accessed Nov. 15, 2023).

Streamlined Data Backup from a Kubernetes Cluster

As noted in an earlier passage herein, a "job" is a logical grouping of information management operations such as storage operations scheduled for a certain data source or for a set of subclients, e.g., generating incremental block-level backup copies 116 at a certain time every day for database files in a certain geographical location, without limitation. Typically, each job has a unique job identifier in the illustrative system. The term "backup job" refers to one or more storage operations, which are performed and tracked as a group under the unique job identifier, and which are directed to backing up primary data from a data source(s). Thus, a backup job accesses primary data of a data source, converts the primary data into a backup format that is proprietary to the illustrative system, and stores one or more resultant backup copies, in the backup format, at a secondary storage resource that is typically distinct from data storage used for the primary data. Depending on preferences stored in the illustrative system, the backup job also performs other operations on the data being backed up, such as deduplication, compression, and/or encryption, without limitation.

The disclosed solution is not limited to any particular hardware configuration or compute platform. Thus, the disclosed compute resources may be configured on traditional computing devices, such as laptops or servers, and/or on virtual machines or application orchestrators, and/or on compute resources provided in a cloud computing environment, without limitation. All references herein to computing devices, servers, laptops, and the like may be implemented in some embodiments, in whole or in part, as compute resources provided by a cloud computing environment. Likewise, all references herein to data storage devices may be implemented in some embodiments, in whole or in part, as data storage resources supplied by a cloud computing or cloud storage environment. In a cloud computing environment, any computing device described herein is deployed as a compute resource of the cloud computing environment (e.g., a virtual machine instance, a pod in a Kubernetes cluster or in another application orchestrator, etc.). Although the compute resource is accessed as a service, it is provided by one or more hardware processors and associated computer memory. Likewise, in a cloud computing environment, any data storage described herein may be deployed as a cloud storage service of the cloud computing environment (e.g., "blob storage" on Microsoft Azure, etc.). Although the storage is accessed as a service, it is provided by one or more data storage devices.

The illustrative embodiments comprise one or more containerized applications configured in pod(s) of a Kubernetes cluster, and the containers are illustratively configured as Docker containers, but the invention is not limited to Docker. In some embodiments, so-called StatefulSets and/or DaemonSets may be deployed in place of or in addition to pods in a Kubernetes cluster according to principles of the present disclosure, without limitation. In alternative embodiments, any operating system-level virtualization platform other than Docker containers and any application orchestrator or container-orchestration system other than Kubernetes can be implemented according to principles of the present disclosure. Moreover, although Kubernetes may be referred to in the context of cloud computing environments, the invention is suitable for cloud and non-cloud and hybrid implementations alike, without limitation. Kubernetes and its constituent concepts and components are used herein as illustrative examples that may ease the reader's understanding of the disclosed technologies, but the invention is not limited to Kubernetes implementations or to the Kubernetes-specific lingo used herein.

In-Cluster Kubernetes File Client. In one embodiment, when a backup job is, or is about to be, initiated, the sponsor data agent deploys a lightweight Kubernetes File Client on an in-cluster pod. The Kubernetes File Client uses cloned security certificates of the sponsor data agent to establish a secure tunnel to the sponsor data agent and, within the tunnel, sets up pipelines for communications between the Kubernetes File Client and the sponsor data agent. Illustratively, the pipelines include a control pipeline and one or more payload pipelines, e.g., file backup pipeline(s). However, contrary to the prior art, neither the tunnel nor the pipelines connect through the cluster's API server. Using the control pipeline in a backup job, the illustrative sponsor data agent instructs the Kubernetes File Client about the pending job. Responsive to the instructions, the Kubernetes File Client scans the target file system, enumerates its contents, recognizes changed data/metadata since the reference time, and packs the changed data/metadata into the backup pipeline(s) to the sponsor data agent. The Kubernetes File Client is further configured to keep thorough logs of its activities and of any resultant errors or events, as well as to track job statistics. The Kubernetes File Client streams this information to the sponsor data agent during the course of performing the backup. Using this information, the sponsor data agent is able to monitor job progress and identify error conditions in realtime. Once received from the Kubernetes File Client, the data and metadata extracted from the Kubernetes cluster is backed up and stored safely outside the cluster by way of a media agent component of the illustrative data storage management system. The media agent interacts with data storage outside the Kubernetes cluster to store backup copies safely and securely. When the backup job is completed, the sponsor data agent frees in-cluster resources invoked for the backup job, which are no longer needed. They will be invoked and instantiated again in the next job. The present solution provides scalability, by instantiating, on demand, a distinct Kubernetes File Client for each persistent volume that is targeted for backup. Likewise, the number of pipelines also depends on the amount of data to be backed up in the pending job, thus customizing the use of in-cluster resources to each job. Advantageously, the Kubernetes File Client is designed not to interact or interoperate with the data storage management system other than communicating with the sponsor data agent. As a result, the ephemeral nature of the Kubernetes File Client and its host does not burden the infrastructure of the data storage management system, such as its storage manager and management database. Thus, the set-up, identity, and tear down of the Kubernetes File Client are not tracked by the storage manager and its management database. Rather, the illustrative sponsor data agent is enhanced to orchestrate each backup job of in-cluster data and to communicate securely with the Kubernetes File Client.

In-Cluster File System Data Agent. In a different embodiment, the sponsor data agent causes a containerized File System Data Agent to be deployed at the in-cluster pod. This approach further increases network optimization as compared to using the Kubernetes File Client. The File System Data Agent transfers in-cluster data targeted by the backup job to an off-cluster media agent that generates and safely stores backup copies off-cluster. Unlike the Kubernetes File Client, the File System Data Agent is equipped with features for communicating directly with the media agent. Consequently, the payload data and its associated metadata originating in-cluster are not routed via the sponsor data agent, and thus the data transfer skips a hop by traveling directly from the File System Data Agent to the off-cluster media agent. The sponsor data agent plays other key roles by orchestrating the backup job and collecting logs and error messages from the in-cluster worker pod. Although it receives no payload data to back up, the sponsor data agent receives configuration files and workload-related metadata from the File System Data Agent and backs them up by way of the media agent. Thus, in this embodiment, the sponsor data agent does not process payload data and payload-related metadata being backed up from the cluster. The in-cluster pod, the File System Data Agent, and all the other in-cluster resources deployed for the backup job are taken down after the data has been transferred off-cluster, thus freeing up cluster resources. The File System Data Agent uses cloned security certificates issued by the data storage management system for the Kubernetes cluster to communicate with the sponsor data agent, with the media agent, and with a storage manager component of the data storage management system. As above, the media agent interacts with data storage outside the Kubernetes cluster to store backup copies safely and securely. When the backup job is completed, the sponsor data agent frees in-cluster resources invoked for the backup job, which are no longer needed. They will be invoked and instantiated again in the next job. Thus, like the Kubernetes File Client embodiment, and contrary to the prior art, none of the data pathways originating at the File System Data Agent connect through the cluster's API server and thus are not subject to its drawbacks. Although the File System Data Agent communicates with components of the data storage management system other than the sponsor data agent, e.g., with the storage manager and with the media agent, the File System Data Agent does not register as a client.

Figure 3:
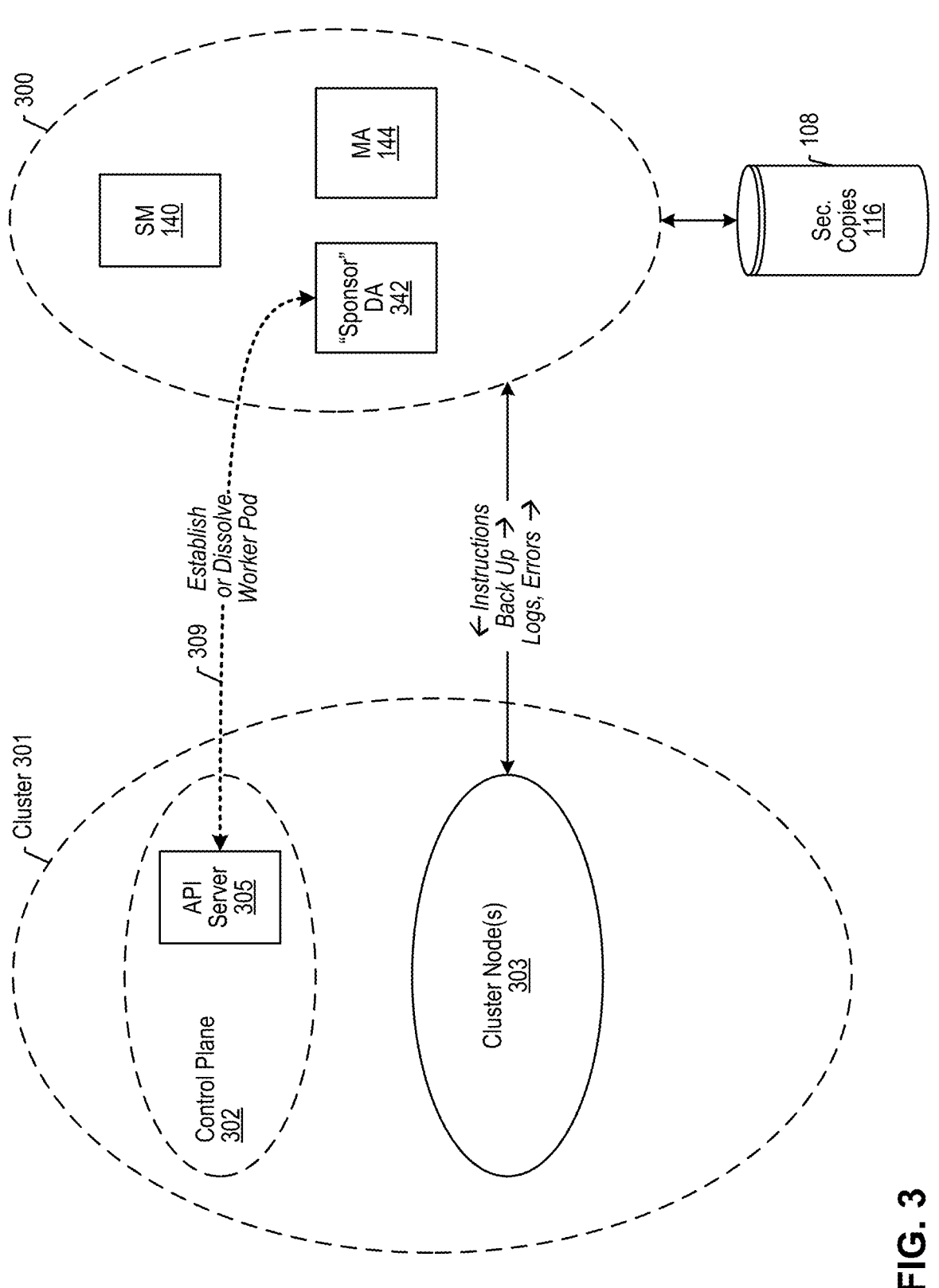
FIG. 3 is a block diagram illustrating a configuration for streamlined data backup from a Kubernetes cluster to a data storage management system according to an embodiment.

FIG. 3 is a block diagram illustrating a configuration for streamlined data backup from a Kubernetes cluster to a data storage management system according to an embodiment. The figure depicts: cluster 301 comprising control plane 302, which comprises API server 305, and further comprising one or more cluster nodes 303; and data storage management system 300, comprising storage manager 140, sponsor data agent 342, and media agent 144; and secondary storage device 108 comprising secondary copies 116. The dotted bidirectional arrow depicts electronic communications pathway 309 between system 300 and API server 305, which is used to establish and dissolve (tear down) resources within cluster 301 as described herein. The solid bidirectional arrow depicts electronic communications between system 300 and one or more cluster nodes 303 for conducting backup jobs of in-cluster data. In the course of a backup job, backup data travels over one or more communication pathways represented by the solid bidirectional arrow, and not over the communication pathway 309 represented by the dotted bidirectional arrow.

Secondary storage 108 and secondary copies 116 are described in more detail elsewhere herein. They are located outside cluster 301. System 300, which is also configured outside cluster 301, generates secondary copies 116 based on source data obtained from cluster 301 and stores the secondary copies at secondary storage 108. In some embodiments, system 300 comprises secondary storage devices 108 and/or secondary copies 116.

System 300 comprises a data storage management system, or information management system, that is analogous to system 100, and additionally comprises enhancements for streamlining data backups from a Kubernetes application orchestrator cluster, such as cluster 301. System 300 comprises a plurality of components, including storage manager 140, data agent 342, and media agent 144. In some embodiments, system 300 may comprise secondary copies 116, which are generated by system 300. System 300 may be configured in whole or in part in a cloud computing environment; off-cloud, in a traditional non-cloud ("on-premises") data center; or in a hybrid configuration, without limitation. The storage manager 140 and media agent 144 components are described in more detail elsewhere herein. System 300 may connect with any number of distinct clusters 301, and within any one cluster 301, it may activate any number of worker pods 330 among one or more cluster nodes 303, having corresponding KFC 333 (FIG. 3A) or FSDA 360 (FIG. 3B) executing thereon, in order to protect primary data in the cluster(s). Accordingly, system 300 is configured to automatically scale resources up and down within a cluster 301, as needed, on demand, in order to perform a backup job of in-cluster data.

Cluster 301 is illustratively embodied as Kubernetes cluster comprising a group of Kubernetes resources consistent with the Kubernetes cluster architecture. See, e.g., Kubernetes Documentation|Concepts|Cluster Architecture|Nodes, kubernetes.io/docs/concepts/architecture/nodes/ (accessed Nov. 15, 2023). In the present figure, cluster 301 comprises components that form control plane 302, which includes API server 305. Control plane 302 for a Kubernetes cluster is well known in the art. Cluster nodes 303 provide compute resources and data storage resources for cluster 301. Cluster nodes 303 are well known in the art.

API server 305 (or API endpoint 305) enables entities outside cluster 301 to communicate with the control plane 302 of cluster 301, consistent with the Kubernetes cluster architecture. API server 305 is deployed on or comprises a suitable computing device of cluster 301. Thus, the Kubernetes control plane is accessed via the Kubernetes API server deployed in each Kubernetes cluster. "The API server exposes an HTTP API that lets end users, different parts of your cluster, and external components communicate with one another. The Kubernetes API lets you query and manipulate the state of API objects in Kubernetes (for example: Pods, Namespaces, ConfigMaps, and Events)." Kubernetes Documentation|Concepts|Overview|The Kubernetes API, kubernetes.io/docs/concepts/overview/kubernetes-api/ (accessed Nov. 15, 2023). See also Kubernetes Documentation|Concepts|Cluster Architecture|Communication between Nodes and the Control Plane, kubernetes.io/docs/concepts/architecture/control-plane-node-communication/ (accessed Nov. 15, 2023). As described herein, a Kubernetes management interface enables interactions with cluster 301 via API server 305. API server 305 is hosted by or comprises, depending on the implementation, a computing device that is configured within cluster 301. Thus, cluster 301 is equipped with all the hardware resources necessary to establish and operate a working Kubernetes cluster.

Electronic communications pathway 309 enables a secure communications between data agent 342 and API server 305. Accordingly, data agent 342 uses electronic communications pathway 309 to instruct or interoperate with API server 305. For example, by way of one or more YAML ("Yet Another Markup Language") files, data agent 342 transmits configuration specifications to API server 305. YAML is well known in the art as a text format that is used to declaratively specify needed configurations for resources that are to be deployed in a Kubernetes cluster, such as cluster 301. Accordingly, data agent 342 transmits one or more YAML files to API server 305 via electronic communications pathway 309. According to the Kubernetes architecture, YAML files may also be used for causing certain operations to occur within cluster 301, such as causing snapshots to be taken, causing persistent volumes to be created and populated, causing pods to be activated or taken down, causing persistent volumes to be set up and torn down, causing other resources to be activated and taken down, etc.

For example (with reference to FIG. 3A and FIG. 3B), YAML file(s) specify that a snapshot of primary data 112 should be taken at persistent volume 312, resulting in snapshot 112S; and that the data captured in snapshot 112S should be stored as primary data 113 in a separate secondary persistent volume 313. The YAML file(s) may further specify that a worker pod 330 is to be activated, that the worker pod is to host a KFC 333 or FSDA 360 based on a suitable image in a repository, and that the worker pod is to be activated attached to secondary persistent volume 313, etc., without limitation. Moreover, by way of the YAML file(s), data agent 342 transmits appropriate security certificate(s) that are to be used by KFC 333 or FSDA 360 to communicate with data agent 342 and/or with other components of system 300, as appropriate. Electronic communications pathway 309 additionally enables data agent 342, after KFC 333 or FSDA 360 has finished its backup tasks, to communicate again with API server 305, e.g., using different YAML file(s), to cause worker pod 330, secondary persistent volume 313, and snapshot 112S to be dissolved or torn down within cluster 301.

Data agent 342 is analogous to data agent 142, and comprises new features for streamlining data backup from a Kubernetes application orchestrator cluster, such as cluster 301. Data agent 342 is a component of system 300. Illustratively, data agent 342 is an enhanced version of a Virtual Server Data Agent (VSA) from Commvault Systems, Inc., the present applicant, though the invention is not limited to VSA implementations and enhancements. Data agent 342 is referred to herein as a "sponsor", because of its role that causes KFC 333 or FSDA 360 to be instantiated in-cluster. Data agent 342 is configured to communicate electronically with API server 305 via electronic communications pathway 309; data agent 342 is further configured to communicate with KFC 333 via tunnel 350 or with FSDA 360 via communication pathway 361. Tunnel 350, and details on point-to-point communications via tunnel 350 are given in FIG. 4. An alternative tunneling configuration that uses an intermediary proxy node 506 is described in FIG. 5. More details on the role of data agent 342 are given in FIGS. 6-11.

Figure 3A:
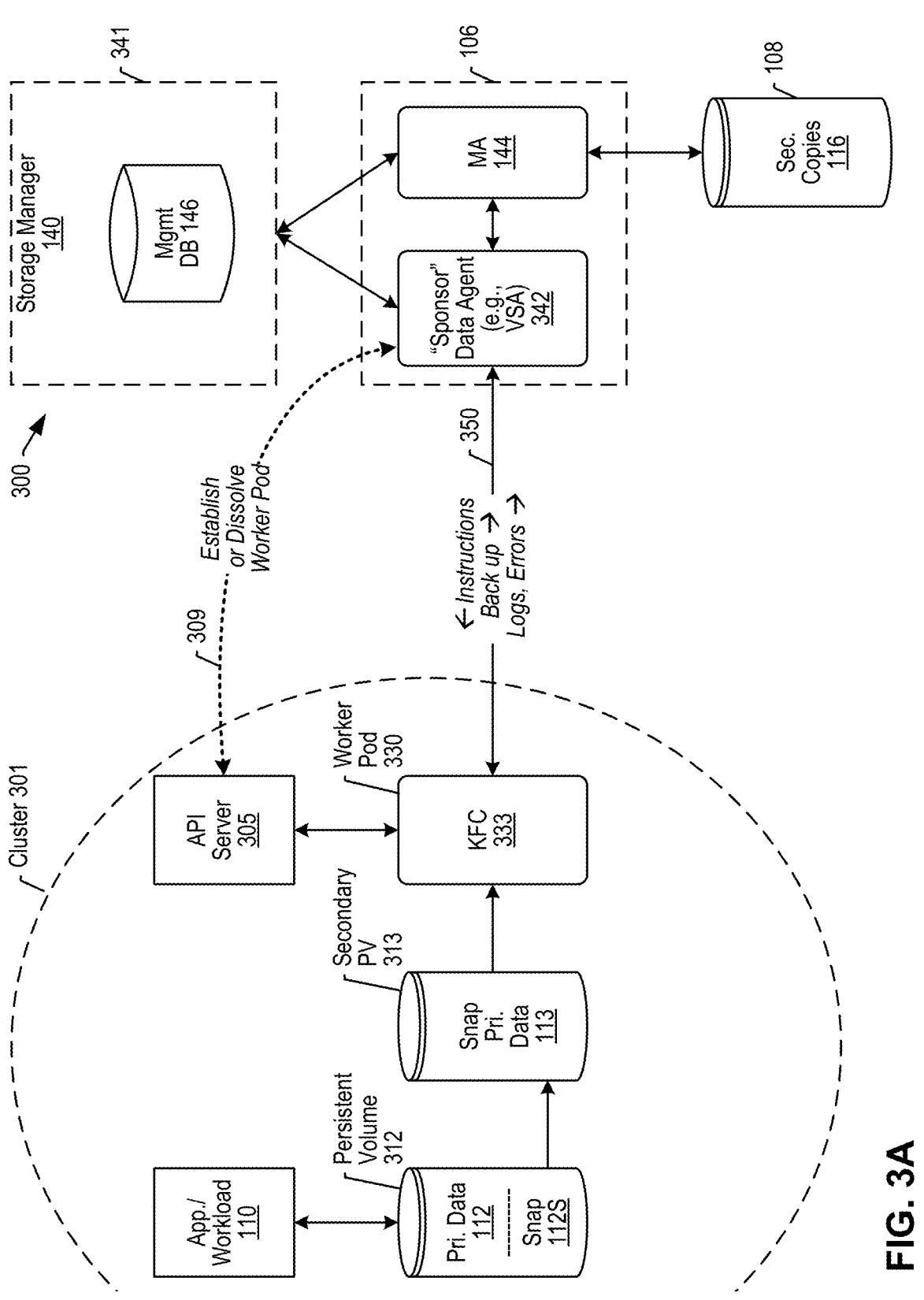
FIG. 3A is a block diagram illustrating an example configuration for backup from a Kubernetes cluster using system 300 and a lightweight on-demand in-cluster Kubernetes File Client, according to an example embodiment.

FIG. 3A is a block diagram illustrating an example configuration for data backup from a Kubernetes cluster using system 300 and a lightweight on-demand in-cluster Kubernetes File Client, according to an example embodiment. The figure depicts: cluster 301 comprising application 110, API server 305, persistent volume 312 comprising primary data 112 (generated by application 110) and snapshot 112S, secondary persistent volume 313 comprising primary data 113 (captured by snapshot 112S), and worker pod 330 hosting KFC 333 (Kubernetes File Client); system 300 comprising secondary storage computing device 106 hosting media agent 144 and data agent 342, and computing device 341 hosting storage manager 140 and management database 146; and secondary storage device(s) 108 which store one or more secondary copies 116. Communication pathway 309 is depicted by the dotted bidirectional arrow between data agent 342 and API server 305. Tunnel 350 is depicted by the solid bidirectional arrow between data agent 342 and KFC 333. Components 106, 108, 110, 112, 116, 140, 146, and 342 are described in more detail elsewhere herein.

Secondary storage computing device 106 may be alternatively referred to as a data access node. Application 110 may be alternatively referred to as a workload, whether operating as a cloud workload, or off-cloud in a traditional non-cloud ("on-premises") data center. Application 110 (or workload 110) is hosted by, or is said to execute on, a Kubernetes pod (analogous to worker pod 330, but not shown here), which executes on a Kubernetes node 303 (shown in FIG. 3) that is configured within cluster 301. In the depicted figure, data agent data agent 342 co-resides with media agent 144 on secondary storage computing device 106, but in alternative embodiments, they may reside on separate computing devices, without limitation.

In the present figure, cluster 301 comprises a number of resources, including the depicted application 110, API server 305, persistent volume 312, secondary persistent volume 313, and worker pod 330.

Persistent volume 312 is illustratively embodied as a Kubernetes persistent volume, such as the persistent volumes described in: Kubernetes Documentation|Concepts|Storage|Persistent Volumes, kubernetes.io/docs/concepts/storage/persistent-volumes/ (accessed Nov. 15, 2023). Kubernetes persistent volumes are well known in the art. Persistent volume 312 comprises primary data 112, which is generated within cluster 301 by an application or workload 110. Persistent volume 312 further comprises snapshot 112S, which is generated within cluster 301, based on instructions received by API server 305 from data agent 342 in view of a pending backup job. Kubernetes snapshots are well known in the art.

Secondary persistent volume 313 is illustratively embodied as a Kubernetes persistent volume. Secondary persistent volume 313 comprises primary data 113, which is primary data captured by snapshot 112S and stored in the form of primary data at secondary persistent volume 313. Thus, primary data 113 is primary data that represents primary data 112 captured at the point in time of snapshot 112S. Secondary persistent volume 313 is created and primary data 113 is stored thereon based on instructions received by API server 305 from data agent 342 in view of a pending backup job. Primary data 113 will be used as the data source for the backup job. This preferred configuration frees up persistent volume 312 to receive data updates from application 110 without interference from the backup job. In some alternative embodiments, primary data 112 on persistent volume 312 will be used as the data source for the backup job.

Worker pod 330 is illustratively embodied as a Kubernetes pod, which is a compute resource or application container(s) as described in: Kubernetes Documentation-|Concepts|Workloads|Pods, kubernetes.io/docs/concepts/workloads/pods/ (accessed Nov. 15, 2023). "Pods are the smallest deployable units of computing that you can create and manage in Kubernetes." Id. Worker pod 330 executes on a computing device, i.e., a Kubernetes cluster node 303 (shown in FIG. 3) that may be embodied as a physical computer or as a virtual machine, depending on how cluster 301 is implemented. Kubernetes Documentation|Tutorials|Learn Kubernetes Basics|Explore Your App|Viewing Pods and Nodes, kubernetes.io/docs/tutorials/kubernetes-basics/explore/explore-intro/ (accessed Nov. 17, 2023). Worker pod 330 acts as a host to an application instance, which, in the present figure, is represented by KFC 333. Preferably, to conserve resources and potential costs, worker pod 330 is invoked or activated on demand for a pending backup job and is dissolved or deactivated when the backup ends, based on instructions received by API server 305 from data agent 342, according to some embodiments. Illustratively, the instructions are included in a YAML file transmitted by data agent 342 to API server 305. The YAML file indicates what image worker pod 330 is to install when activated, e.g., KFC 333 or FSDA 360, as well what persistent volume to attach, e.g., secondary persistent volume 313. Security certificates for the present backup job also are included with the YAML file. See also FIG. 11.

Kubernetes file client 333 ("KFC 333") refers to one or more computer program executables (e.g., binaries) that execute on or are hosted by worker pod 330. KFC 333 is hosted by cluster 301 temporarily for the limited purpose of backing up data from secondary persistent volume 313. KFC 333 is configured to communicate securely with a sponsor data agent, such as data agent 342, which operates outside cluster 301. Data agent 342 "sponsors" KFC 333 by enabling KFC 333 to communicate securely with data agent 342 using clone(s) data agent 342's own security certificate (s). Advantageously, KFC 333 is designed not to interact or interoperate with system 300 (other than communicating with the sponsor data agent 342) and thus KFC 333 is not considered a full and proper client of system 300 and accordingly is not tracked as such in management database 146. Furthermore, KFC 333 lacks connectivity to storage manager 140, unlike full and proper clients 102. As a result, the ephemeral nature of KFC 333 and its host worker pod 330 does not burden the infrastructure of system 300, such as its storage manager 140 and management database 146. Thus, the set-up, identity, and tear down of KFC 333 are not tracked by storage manager 140 and its management database 146 according to this embodiment.

Illustratively, KFC 333 comprises functionality for scanning a file system at the target persistent volume, i.e., secondary persistent volume 313, reading files therein, and further comprises a proprietary Network Daemon Service, the latter configured to run in a separate thread of KFC 333. Data agent 342 "sponsors" KFC 333 by transmitting a clone(s) of its own security certificates. By using the security certificates of the sponsoring data agent 342, KFC 333 is permitted to communicate with system 300 for the limited purpose of taking part in backing up primary data 113 from secondary persistent volume 313. Preferably, worker pod 330 and its KFC 333 instance are uniquely associated with a particular persistent volume targeted by the pending backup operation, such as secondary persistent volume 313 depicted in the present figure. Should the primary data 112 occupy multiple persistent volumes, a separate worker pod 330 and corresponding KFC 333 executing thereon would be activated for the pending backup operation.

Computing device 341 comprises one or more hardware processors and non-transitory computer-readable memory, which carries computer programming instructions that configure computing device 341 to perform the operations of storage manager 140 within system 300. Storage manager 140 is described in more detail elsewhere herein. In some embodiments, storage manager 140 comprises additional features associated with some illustrative embodiments, such as configuring a custom Docker image, which comprises the executables (binaries) for KFC 333 or FSDA 360 (FIG. 3B) to execute on worker pod 330 (minus certain configuration files that are supplied by data agent 342 for each distinct job or operation). The custom Docker image (not shown) may be stored in a public or private repository (not shown) that is accessible to storage manager 140, to data agent 342, and/or to API server 305 as needed. In alternative embodiments, data agent 342 configures the custom image, and in yet other embodiments, the custom image is configured elsewhere.

Figure 3B:
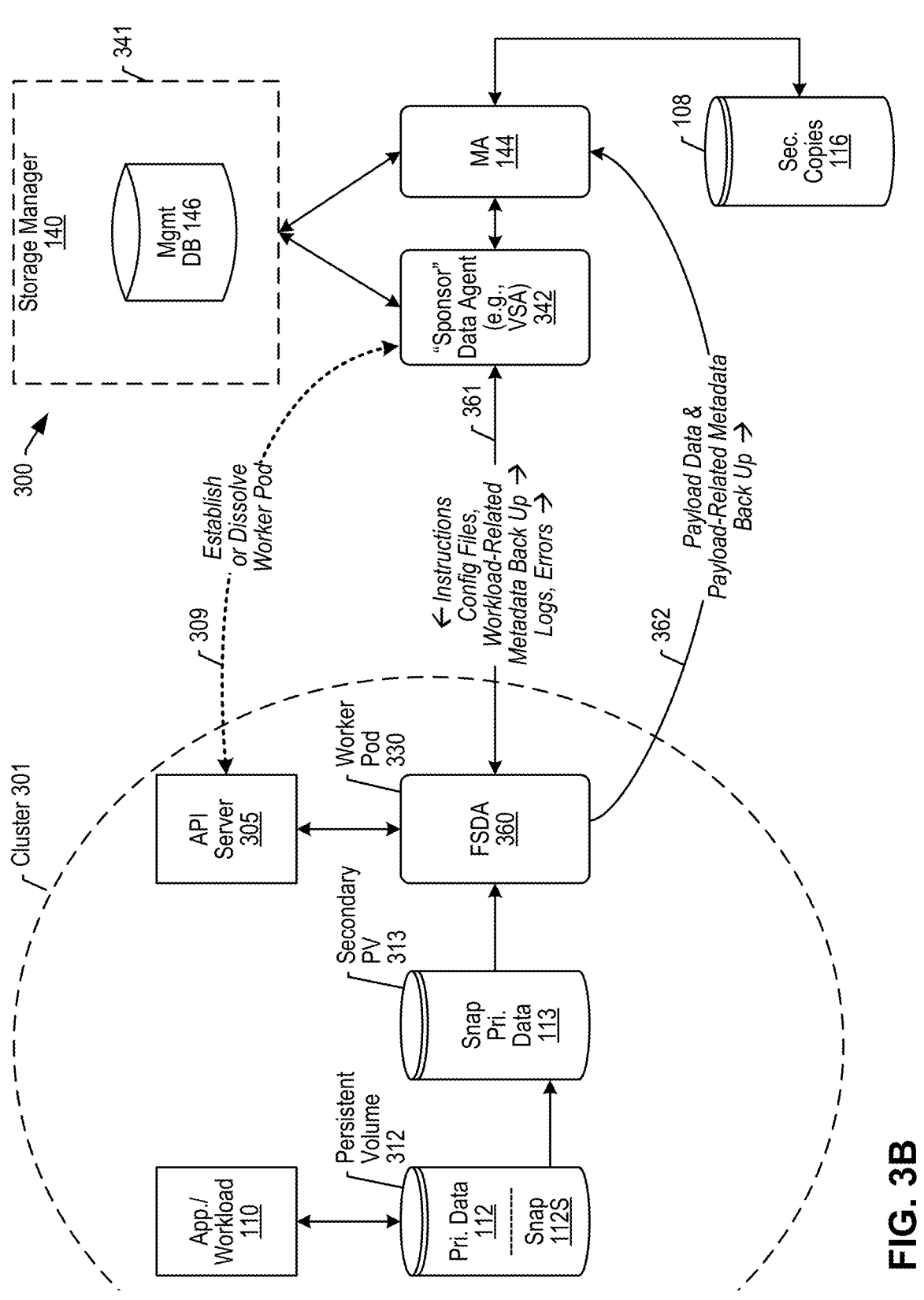
FIG. 3B is a block diagram illustrating an example configuration for backup from a Kubernetes cluster 301 using system 300 and an on-demand in-cluster File System Data Agent, according to an example embodiment.

FIG. 3B is a block diagram illustrating an example configuration for data backup from a Kubernetes cluster 301 using system 300 and an on-demand in-cluster File System Data Agent. This figure depicts many of the same components shown in FIG. 3A, except: KFC 333 is not used here, and instead, FSDA 360 is deployed on worker pod 330; communication pathway 361 and communication pathway 362 are used by FSDA 360 to communicate with system 300. Moreover, data agent 342 and media agent 144 may or may not co-reside on the same secondary storage computing device 106, depending on the implementation.

FSDA 360 (File System Data Agent or File System Intelligent Data Agent) is analogous to a file system data agent 142A (FIG. 1E), which is containerized for execution on worker pod 330 within cluster 301. FSDA 360 also includes enhancements for operating within cluster 301 and for interoperating with data agent 342. In some embodiments, FSDA 360 also includes the functionality of the "extension" program described at block 1050 (FIG. 10B). FSDA 360 operates in cluster 301 temporarily for the limited purpose of backing up data from persistent volume 312. FSDA 360 is configured to communicate securely with a sponsor data agent, such as data agent 342, and is further configured to communicate securely with media agent 144, and also with storage manager 140, all of which operate outside cluster 301 as shown here.

Unlike KFC 333, which is limited to communicating only with data agent 342 within system 300, FSDA 360 is equipped with features for additionally communicating directly with media agent 144 in system 300. Consequently, the payload data and its associated metadata originating in the source volume of the Kubernetes cluster is not routed via the sponsor data agent 342, and instead, the data transfer skips a hop by traveling directly from in-cluster FSDA 360 to off-cluster media agent 144. In this embodiment, data agent 342 orchestrates the backup job and collects logs and error messages from the in-cluster worker pod 330. Although it receives no payload data to back up in embodiments that employ FSDA 360, data agent 342 receives configuration files and workload-related metadata from FSDA 360 and backs them up by way of media agent 144. Thus, in this embodiment, data agent 342 does not process payload data and payload-related metadata being backed up from cluster 301. This distinction is reflected by the distinct communication pathways depicted in the present figure: communication pathway 361 directed to data agent 342 versus communication pathway 362 directed to media agent 144. FSDA 360 may also communicate with storage manager 140, but for simplicity, that communication pathway is not depicted here.

Data agent 342 "sponsors" FSDA 360 with security certificates that system 300 issues for cluster 301. To communicate securely with data agent 342, with media agent 144, and/or with storage manager 140, as needed, FSDA 360 uses cloned security certificate(s) that system 300 issued for cluster 301. These security certificates are sent to cluster 301 by way of the YAML files initially transmitted via electronic communications pathway 309. Thus, like KFC 333 embodiment, and contrary to the prior art, none of the data pathways connecting with FSDA 360 connect through the cluster's API server 305 and thus are not subject to its drawbacks. Although FSDA 360 communicates with components of the data storage management system in addition to the sponsor data agent 342, e.g., with storage manager 140 and with media agent 144, FSDA 360 does not register as a client.

Communication pathway 361, as depicted by the bidirectional arrow between FSDA 360 and data agent 342, is used by data agent 342 for transmitting instructions to FSDA 360; and is further used by FSDA 360 for transmitting configuration files and workload-related metadata for backup by data agent 342; and is further used by FSDA 360 for transmitting activity logs and error logs, if any, to data agent 342.

Communication pathway 362, as depicted by the unidirectional arrow between FSDA 360 and storage manager 140 is used by FSDA 360 for transmitting payload data and payload-related metadata that is obtained from secondary persistent volume 313 and payload-related metadata to data agent 342. Some of the payload-related metadata may have been included in primary data 113, e.g., file names, directory names, etc.; and some may have been created by packaging features added by FSDA 360 for the data stream(s) to media agent 144, e.g., headers, counters, etc. Although arrow 362 as depicted here is unidirectional, communication pathway

362 may include communications from media agent 144 to FSDA 360, such as flow control messages, requests, etc., without limitation.

Figure 4:
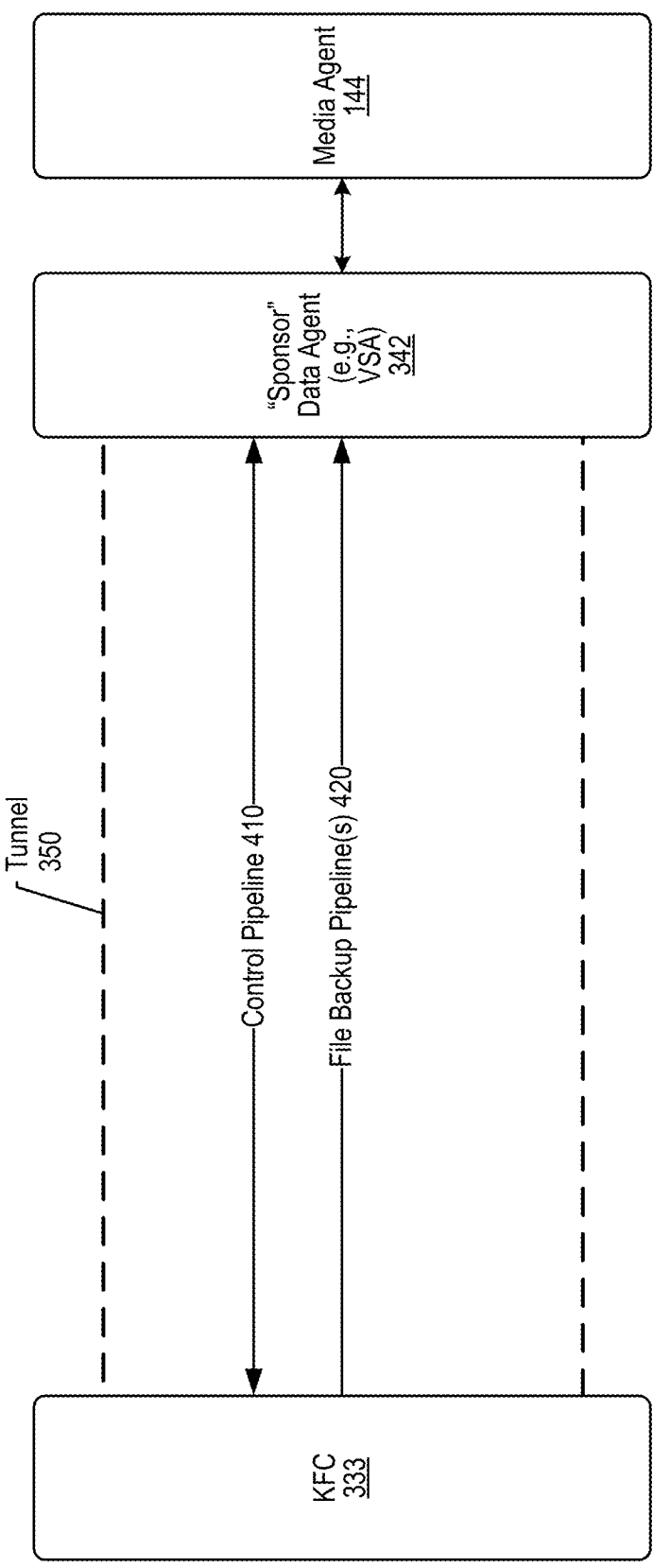
FIG. 4 is a block diagram illustrating a logical view of communication pipelines in a direct point-to-point configuration, within tunnel 350, between off-cluster data agent 342 and in-cluster KFC 333, according to an illustrative embodiment.

FIG. 4 is a block diagram illustrating a logical view of communication pipelines in a direct point-to-point configuration, within tunnel 350, between off-cluster data agent 342 and in-cluster KFC 333, according to an illustrative embodiment. The figure depicts: tunnel 350 configured between KFC 333 and data agent 342, which is communicatively coupled to media agent 144. Control pipeline 410 and one or more instances of file backup pipeline 420 are encapsulated within tunnel 350 and each operates point-to-point between KFC 333 and data agent 342. Distinct processes executing within KFC 333 and data agent 342 may anchor each pipeline. In some embodiments, tunnel 350 is established as between worker pod 330 and data agent 342, depending on the implementation.

Tunnel 350 enables a secure communicative coupling between KFC 333 and data agent 342. Tunnel 350 connects worker pod 330 and secondary storage computing device 106. The two endpoints use a communications protocol (a "tunnelling protocol") that enables private network communications to be sent across a public network (such as the Internet) through encapsulation. Tunneling protocols and tunneling technology are well known in the art, but as explained below, certain enhancements in certificate management are disclosed herein to enable the disclosed system architecture. Tunnel 350 enables data agent 342 to communicate directly and securely with KFC 333 on worker pod 330 within cluster 301. Tunnel 350 is established in order to enable information exchange during a backup job. Preferably, communications between data agent 342 and KFC 333 and/or worker pod 330 are conducted over Secure Sockets Layer (SSL) or an equivalent secure communications protocol. For convenience, SSL is referenced in the present disclosure, even though the invention is not so limited.

Management of Security Certificates. Typically, each data agent in system 300 has a security certificate that is properly generated, recorded, and rotated. The security certificate authenticates the respective data agent as a client of system 300. However, as noted earlier, KFC 333 is not considered a full and proper client of system 300 and accordingly is not tracked as such in management database 146, and furthermore, KFC 333 lacks connectivity to storage manager 140. Therefore, KFC 333 is configured to communicate with a sponsor data agent, such as data agent 342, and not with other components of system 300. Data agent 342 "sponsors" KFC 333 by transmitting one or more clones of its own security certificate(s) to KFC 333 by way of the configuration information transmitted initially via electronic communications pathway 309. By using the security certificates of the sponsoring data agent 342, KFC 333 is permitted to communicate with data agent 342 for the limited purpose of taking part in backing up secondary persistent volume 313, which is stored in secondary persistent volume 313.

Figure 5:
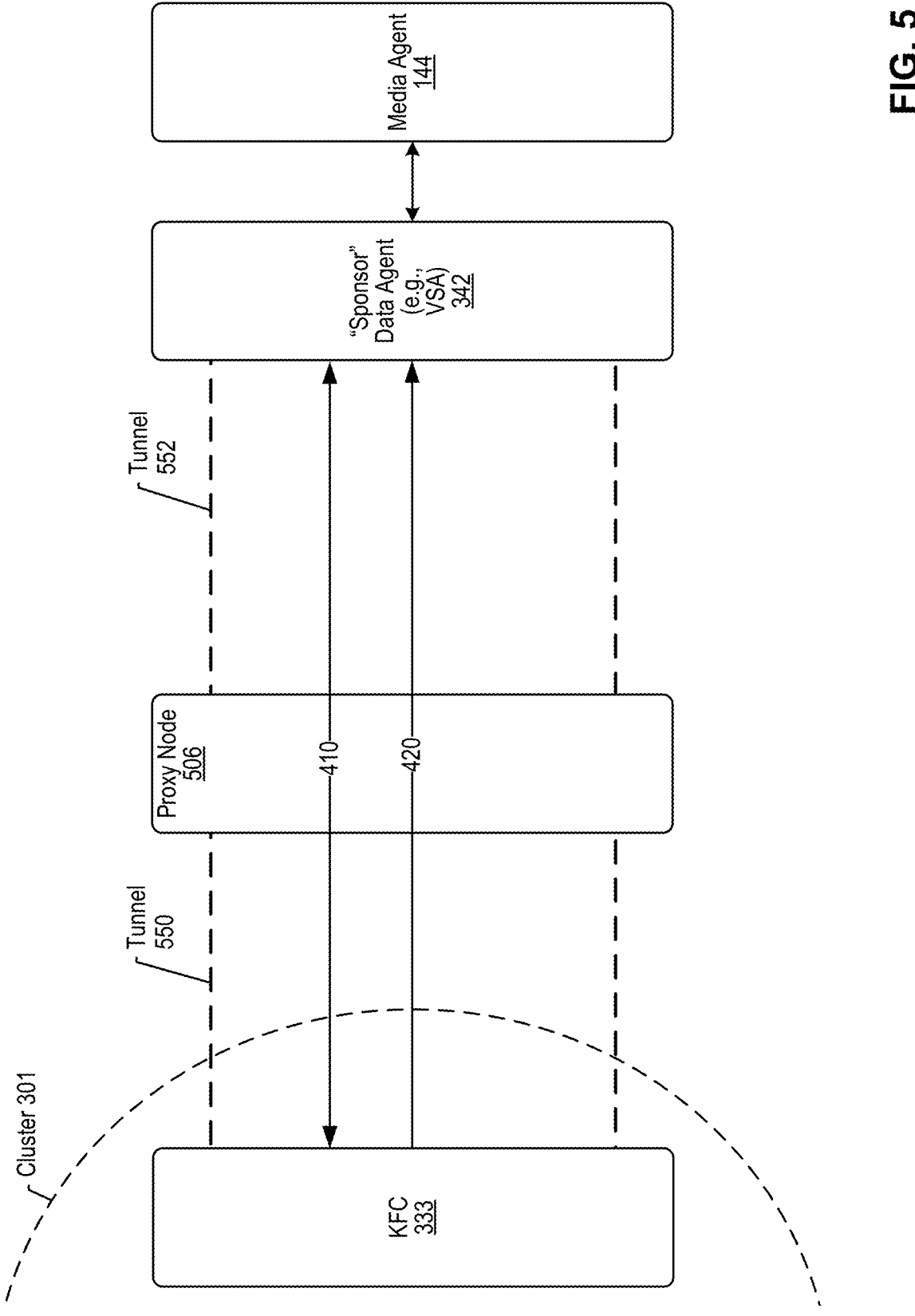
FIG. 5 is a block diagram illustrating a logical view of communication pipelines implemented between off-cluster data agent 342 and in-cluster Kubernetes file client 333 via an intermediary component, proxy node 506, according to an illustrative embodiment.

Therefore, the security certificate(s) (or SSL certificate(s)) of the sponsoring data agent 342 and its private key are used to establish an SSL tunnel between KFC 333 and proxy node 506 (see FIG. 5) or to data agent 342, and to establish the pipeline connections between KFC 333 and data agent 342 through these tunnels. Before spawning KFC 333, data agent 342 decrypts its latest private key, re-encrypts it back with a generic key, concatenates with the matching client and certificate-authority certificates and uploads the produced security certificates file to worker pod 330. Since the certificate/key of the data agent 342 are going to be used, no additional generation, management or rotational certificate efforts will be required for the pending job. An illustrative Network Daemon Service of KFC 333, also runs at proxy node 506 (FIG. 5). The Network Daemon Service is specially configured to account for multiple incoming tunnels authenticated with the same certificates. Prior art configurations treated such tunnels as duplicates and would have eliminate all tunnels but one. One of the enhancements in the present disclosure is that the Network Daemon Service of KFC 333 passes a special flag to the corresponding Network Daemon Service at proxy node 506 before starting an SSL exchange, the special flag being configured to announce that KFC 333 is going to use a cloned certificate. Proxy node 506 will then run SSL authentication, set up encryption, and assign a unique remote client name to the tunnel coming from KFC 333. This will override duplicate-elimination logic at proxy node 506, and thus enable KFC 333 to communicate with data agent 342 via proxy node 506. Of course, the invention is not limited to using the proprietary Network Daemon Service from the applicant Commvault Systems, Inc. to enable tunneling and pipelines between KFC 333 and data agent 342, and other implementations may achieve the same result.

Control pipeline 410 is a communications pathway, encapsulated within tunnel 350, that connects KFC 333 and data agent 342. According to some embodiments, KFC 333 opens control pipeline 410 towards data agent 342. Preferably, only one control pipeline 410 will operate per tunnel 350, and is to be established first by KFC 333 before file backup pipeline(s) 420. Control pipeline 410 is used for exchanging certain control messages and information, for example: (a) communicate additional configuration parameters are needed for the current job (e.g., backup reference time) from data agent 342 to KFC 333; (b) kick off the backup process(s) at KFC 333; (c) stream logs from KFC 333 to data agent 342; (d) stream scanning errors and/or any other errors from KFC 333 to data agent 342; (e) stream changed directory contents from KFC 333 to data agent 342 during backup; and (f) communicate backup completion and statistics to data agent 342; etc., without limitation. The log streaming, taking place over the course of the backup job, creates a copy of log(s) generated by KFC 333 on data agent 342 for easy and immediate access, without having to pull these log(s) from worker pod 330 at the end of each job. Data agent 342 will store the log(s) locally, which advantageously enables live progress monitoring of the backup from data agent 342.

File backup pipeline 420 is a communications pathway, encapsulated within tunnel 350, that connects KFC 333 and data agent 342. Any number of file backup pipelines 420 may be established for a given backup operation. According to some embodiments, KFC 333 opens file backup pipeline 420 towards data agent 342. Each file backup pipeline 420 will: (a) stream pay-load-related metadata (e.g., file headers, packet headers, etc.) and contents (payload data) from KFC 333 to data agent 342; and (b) stream relevant file read logs and errors from KFC 333 to data agent 342. Illustratively, each file backup pipeline 420 is maintained by a separate file reader process spawned by KFC 333.

In embodiments that use FSDA 360, a tunnel 350 may be used for communication pathway 361 and a separate tunnel 350 may be used for communication pathway 362, without limitation. And another tunnel 350 may be used for communicating with storage manager 140, e.g., using a control pipeline 410.

FIG. 5 is a block diagram illustrating a logical view of communication pipelines implemented between off-cluster data agent 342 and in-cluster Kubernetes file client 333 via an intermediary component, proxy node 506, according to an illustrative embodiment. The figure is similar to FIG. 4, but instead of the point-to-point tunnel 350, the present configuration interposes proxy node 506, which anchors separate tunnels to the endpoints, e.g., tunnel 550 to KFC 333 and tunnel 552 to data agent 342.

Proxy node 506 comprises a computing device, which may operate outside cluster 301 as shown here, and which acts as a gateway and firewall between the endpoints. For example, when cluster 301 is configured in a private data network, proxy node 506 is needed as an access entry point into the private data network. Proxy node 506 is well known in the art. A proxy configuration for proxy node 506 is included in an environment file that data agent 342 transmits to worker pod 330 by way of API server 305 using electronic communications pathway 309. As a result, KFC 333 will use this proxy configuration to populate a file that it transmits to proxy node 506 to establish tunnel 550. KFC 333 may open tunnel 550 to proxy node 506. Illustratively, proxy node 506 then opens tunnel 552 towards data agent 342. Once tunnels 552 and 550 have been opened, KFC 333 can establish control pipeline 410 to data agent 342 as explained in FIG. 4. Tunnels 550 and 552 are similar to tunnel 350, but as explained, they converge at and are anchored by intermediary proxy node 506, rather than being anchored point-to-point as shown in FIG. 4.

In embodiments that use FSDA 360, a proxy node 506 may operate in communication pathway 361 and a proxy node 506 may operate in communication pathway 362, and correspondingly, tunnels 550 and 552 may be implemented accordingly.

FIG. 6 depicts some salient operations of a method 600 according to some illustrative embodiments. At block 602, system 300 performs pre-job preparation and initiates a backup job of primary data 112 stored at persistent volume 312. More details are given in FIG. 7. At block 604, system 300 (e.g., using data agent 342) communicates with control plane 302, via API server 305, to: snapshot the source persistent volume 312, create secondary persistent volume 313 and populate secondary persistent volume 313 with the primary data captured by snapshot 112S, and establish a configured worker pod 330 for the backup job. When the pending backup job targets multiple source volumes, a distinct worker pod 330 is established for each such source volume. More details are given in FIG. 8. At block 606A, communications are established between data agent 342 and KFC 333 direct or via Proxy node, but not via API server; more details are given in FIG. 9A. Correspondingly, at block 606B, communications are established between data agent 342 and FSDA 360 direct or via Proxy node, but not via API server; more details are given in FIG. 9B.

Figure 10A:
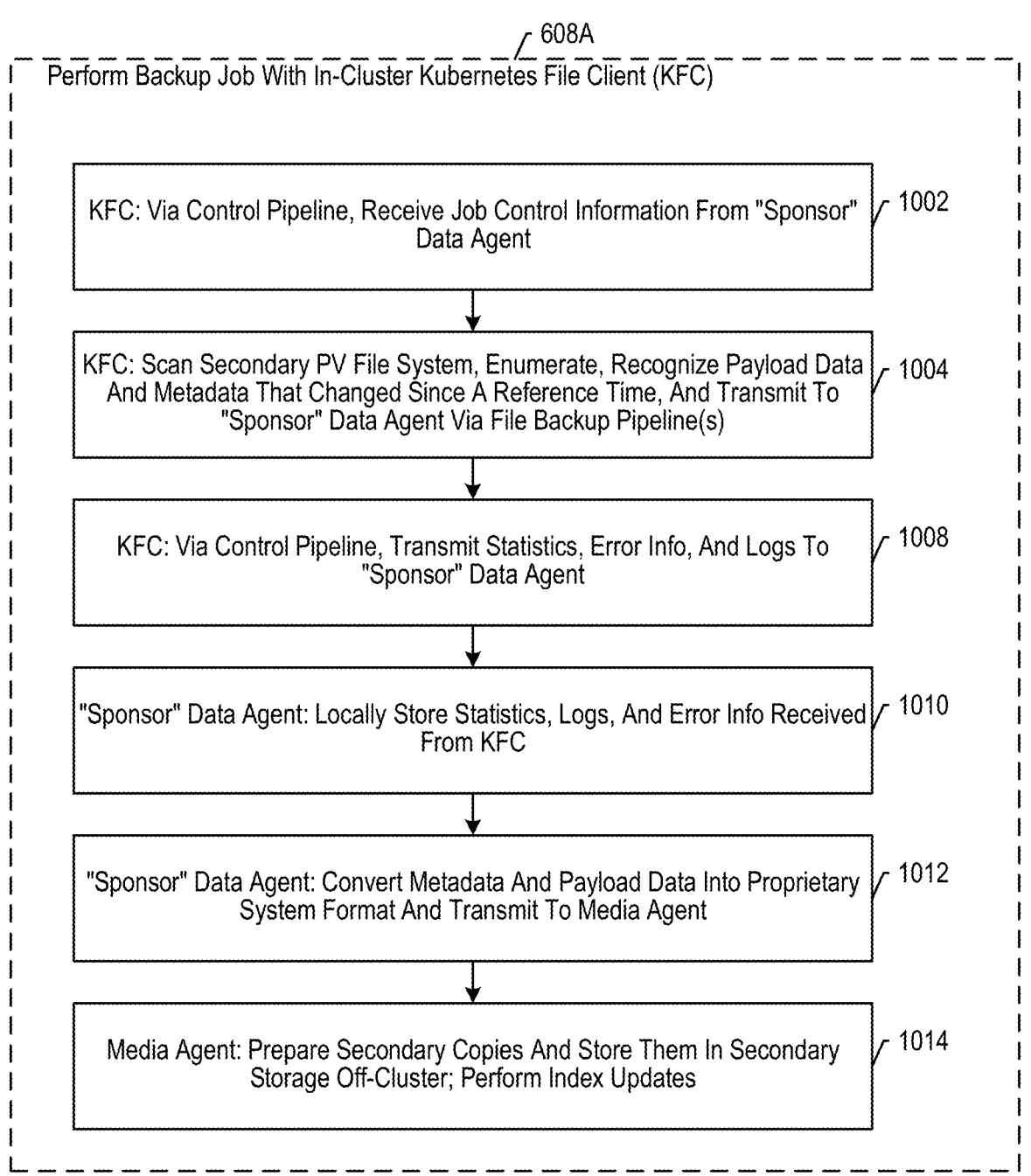
FIG. 10A depicts some salient operations of block 608A of method 600 according to an illustrative embodiment.
Figure 10B:
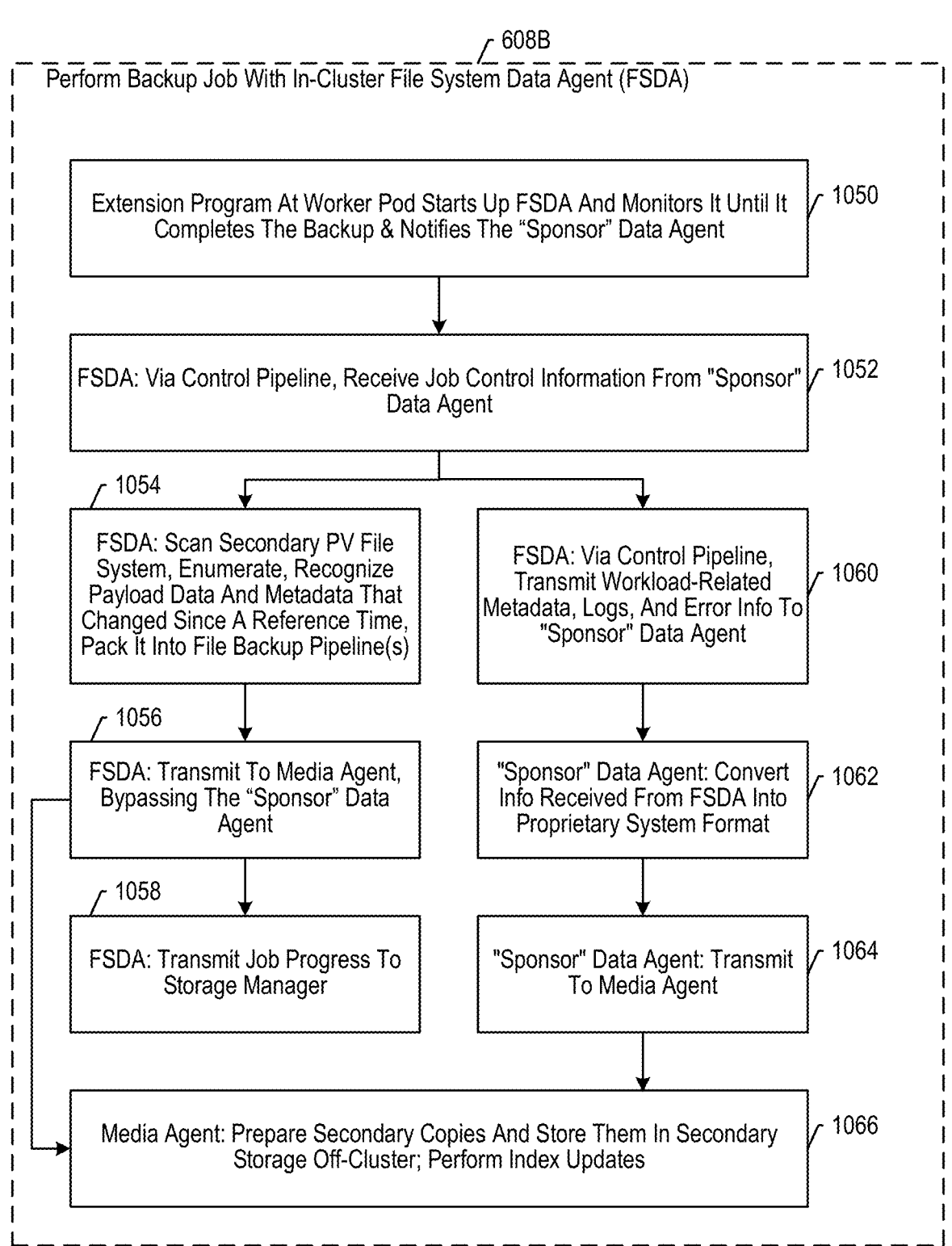
FIG. 10B depicts some salient operations of block 608B of method 600, according to an illustrative embodiment.

At block 608A, a backup job is performed using KFC 333 and details are given in FIG. 10A. At block 608B, a backup job is performed using FSDA 360 and details are given in FIG. 10B. At block 610, system 300 (e.g., using data agent 342), based on the backup data transfers ending within cluster 301, communicates with control plane 302, via API server 305, to: tear down worker pod 330, secondary persistent volume 313, and snapshot 112S. More details are given in FIG. 11. Method 600 ends here.

Figure 7:
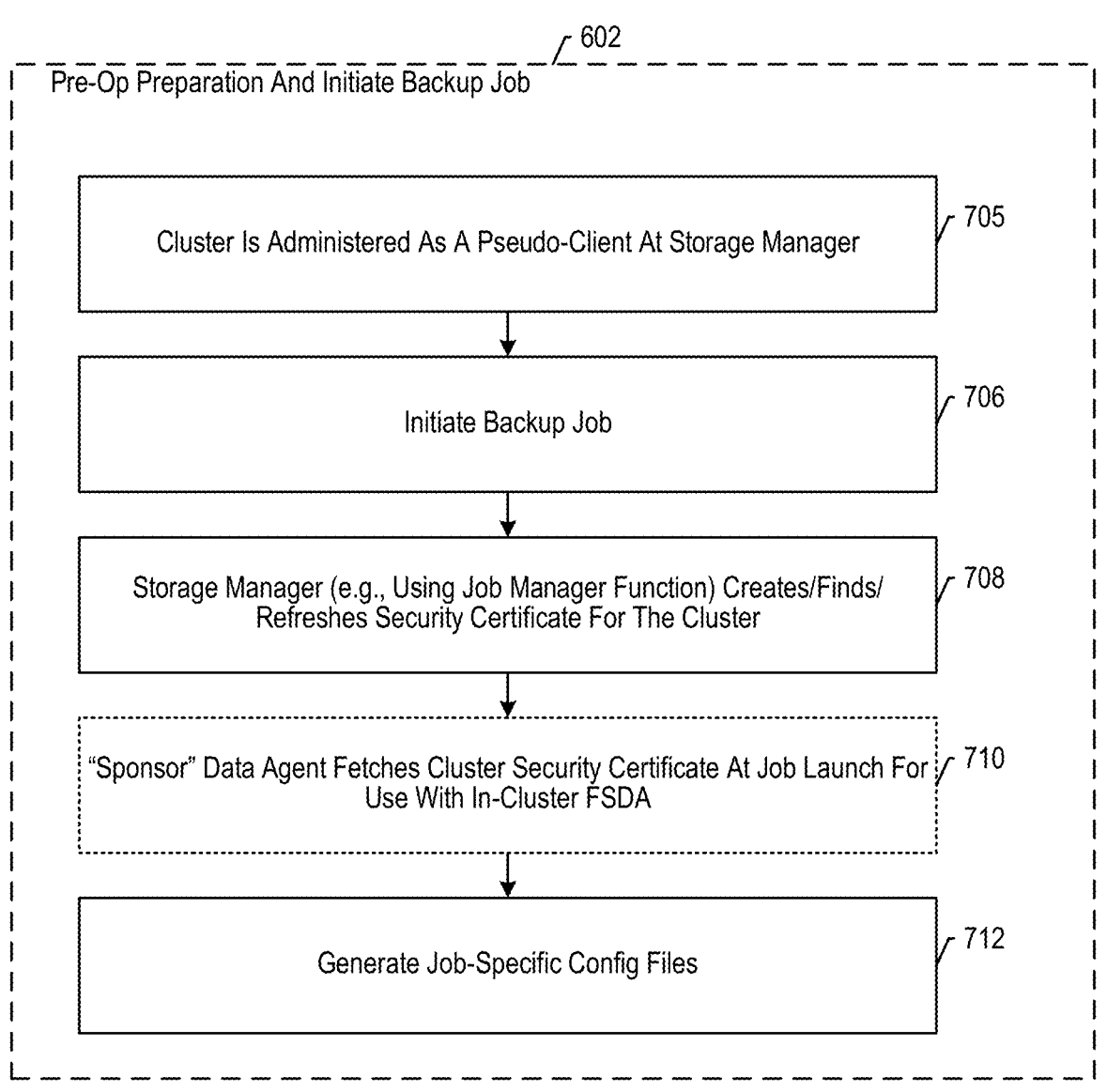
FIG. 7 depicts some salient operations of block 602 of method 600 according to an illustrative embodiment.

FIG. 7 depicts some salient operations of block 602 of method 600 according to an illustrative embodiment. At block 602, system 300 performs pre-job preparation and initiates a backup job of primary data 112 stored at persistent volume 312. Because, one or more components of system 300 are involved in performing block 602, system 300 is said to perform block 602.

At any time prior to the backup job, system 300 (e.g., using storage manager 140, data agent 342, and/or another component not shown herein, without limitation) prepares a custom image to be deployed in worker pod 330. The custom image may be a Docker image, though the invention is not limited to Docker implementations, as noted elsewhere. Illustratively, a custom image comprises certain executables (e.g., binaries) and directories that collectively enable KFC 333 to be instantiated at worker pod 330. A different custom image is created for FSDA 360. Each custom image may comprise a wrapper script that will source configuration parameters and set the environment for KFC 333, or correspondingly, for FSDA 360. The custom images so created may be stored at and obtained from any public or private repository. The repository is chosen to be suitable to system 300 and different repositories may be used, depending on the implementation of system 300 and cluster 301. In some embodiments, the custom image is prepared and stored in the repository by components outside system 300.

At block 705, cluster 301 is administered as a pseudo-client at system 300. Like other administrative information in system 300, the pseudo-client information is stored at management database 146 of storage manager 140. Typically, a security certificate is generated for the pseudo-client, which will enable secure communications between system 300 and cluster 301.

At block 706, a backup job is initiated at system 300 for protecting primary data 112 stored in cluster 301. The backup job may be initiated on demand, e.g., via Command Center connected to storage manager 140, or, alternatively, according to an administered schedule policy or data protection plan or other preference(s) in management database 146. This triggers the subsequent operations of block 602. The backup job may be a full backup, an incremental backup, a differential backup, etc. Accordingly, storage manager 140 instructs or informs data agent 342 that the job is pending. Illustratively, data agent 342 may establish a listening socket that enables data agent 342 to accept an initial control pipeline 410 connection from KFC 333 or FSDA 360.

At block 708, storage manager 140 (e.g., using a job manager function) creates, finds, and/or refreshes a security certificate (the "cluster-specific security certificate") for the administrative sub-client that corresponds to cluster 301. The cluster-specific security certificate(s) may be stored at management database 146.

At block 710, data agent 342 fetches the cluster-specific security certificate for cluster 301, which is to be used by FSDA 360 in the pending job. This operation is not needed for implementations that use KFC 333, because those implementations use clones of the data agent 342's own security certificate(s), not the cluster-specific security certificate(s).

At block 712, system 300 (e.g., using data agent 342) generates a set of configuration files, which are specific to the pending backup job, including specifically referencing data agent 342 selected for the job, as well as being tailored to whether KFC 333 or FSDA 360 is to be used in the backup job, e.g., the image to be retrieved from a repository, etc. The illustrative set of configuration files comprises an environment file for the containers that run in the pod, i.e., for KFC 333 or FSDA 360, which may include "secrets," config-maps, etc., appropriate to the Kubernetes architecture. Settings needed for KFC 333 or FSDA 360 to initialize and connect back to data agent 342 agent may be passed via the environment file (sourced by the wrapper in the custom image). For backup jobs that use KFC 333, the set of configuration files further include clones of data agent 342's security certificate(s), which will authorize KFC 333 to communicate with data agent 342. For backup jobs that use FSDA 360, the set of configuration files further comprises clones of the cluster-specific security certificate(s) for cluster 301, which will authorize FSDA 360 to communicate with data agent 342, with media agent 144, and/or with storage manager 140, as needed. The set of configuration files may further include configuration information for setting up proxy node 506 (FIG. 5). More than one proxy node 506 may be configured, thereby making it possible to round-robin connections and spread network load across multiple proxies. Examples of environment variables that are specified and included in the environment file include: the installation directory; a full data path to a certificates file comprising the security certificates to be used by KFC 333/worker pod 330; a flag indicating whether compression is to be used in control pipeline 410; a debugging log level; the client name associated with data agent 342; a service name of data agent 342 for KFC 333 to open control pipeline 410 to; one or more proxy client names; one or more proxy node host names; one or more proxy ports; etc., without limitation. Once control pipeline 410 has been established, data agent 342 will use it to send additional configuration details to KFC 333 or FSDA 360, and instructions to initiate backup. Block 602 ends here.

FIG. 8 depicts some salient operations of block 604 of method 600 according to an illustrative embodiment. At block 604, system 300 (e.g., using data agent 342) communicates with control plane 302, via API server 305, to: snapshot the source persistent volume 312 resulting in snapshot 112S, create secondary persistent volume 313 and populate secondary persistent volume 313 with the primary data captured by snapshot 112S, and establish a configured worker pod 330 for the backup job. When the pending backup job targets multiple source volumes 312, a distinct worker pod 330 is established for each such source volume. In accordance with Kubernetes architecture, communications from data agent 342 to control plane 302 are made by way of issuing YAML file(s) that control plane 302 can interpret and act upon, and therefore, system 300 and/or data agent 342 are said to cause the various in-cluster operations to occur, which are implemented by control plane 302.

At block 802, system 300 (e.g., using data agent 342), based on the pending backup job having been initiated, uses a Kubernetes management interface to establish a connection with the cluster control plane 302, e.g., via API server 305. See also FIG. 3. The Kubernetes management interface, which is well known in the art, enables data agent 342 to interact with cluster 301.

At block 804, system 300 (e.g., using data agent 342 in communication with control plane 302 by way of API server 305) discovers configuration files, auxiliary data, configuration map, etc. that are associated with the target workload/application 110 and its associated persistent volume 312 that stores the application's primary data 112. By obtaining this information from cluster 301, data agent 342 is able to proceed to the snapshotting step at block 806.

At block 806, system 300 (e.g., using data agent 342 in communication with control plane 302 by way of API server 305) causes cluster 301 to take a snapshot of the primary data 112 that resides in the target persistent volume 312; primary data 112 is to be backed up in the pending backup job. Accordingly, cluster 301 generates snapshot 112S which also resides in persistent volume 312. Snapshot 112S is said to be a snapshot of primary data 112 the point in time that snapshot 112S is created.

At block 808, system 300 (e.g., using data agent 342 in communication with control plane 302 by way of API server 305) causes cluster 301 to create another persistent volume within cluster 301, e.g., secondary persistent volume 313, which is populated with primary data 113 that was captured in snapshot 112S. Thus, primary data 113 is now populated in secondary persistent volume 313 and is available as a data source for the pending backup job. In some embodiments, blocks 806 and 808 may be skipped if the backup job will directly access persistent volume 312.

At block 810, system 300 (e.g., using data agent 342 in communication with control plane 302 by way of API server 305) causes cluster 301 to instantiate a pod, e.g., worker pod 330 operating on a cluster node 303, such that worker pod 330 is attached to secondary persistent volume 313. Here, an illustrative YAML file(s) specifies a KFC 333 of FSDA 360 image to be obtained from a repository, includes appropriate security certificate(s), identifies secondary persistent volume 313 to attach to, etc. Accordingly, cluster 301 activates worker pod 330 properly attached to secondary persistent volume 313 and configured with KFC 333/FSDA 360 as specified by data agent 342.

At block 812, system 300 (e.g., using data agent 342 in communication with control plane 302 by way of API server 305) transfers other job-specific configuration files, e.g., by way of YAML file(s), to worker pod 330 via API server 305 and the Kubernetes management interface. For example, the job-specific configuration may identify data agent 342 as an entity that KFC 333/FSDA 360 is to communicate with when activated. Other job-specific files may comprise security certificates, the environment file, and the proprietary Network Daemon Service. At this point, all the executable code and configuration parameters needed for KFC 333 or FSDA 360 to begin operating in cluster 301 are in place.

At block 814, which is reached after all preparatory operations have been successfully completed within cluster 301, system 300 (e.g., using data agent 342 in communication with control plane 302 by way of API server 305) causes worker pod 330 to execute or activate KFC 333 or FSDA 360 as configured at worker pod 330.

At block 816, having activated KFC 333/FSDA 360 within cluster 301, data agent 342 no longer needs API server 305 or the Kubernetes management interface to proceed with the pending backup job. Consequently, at this point, data agent 342 stops using API server 305 for the pending backup job. This approach is distinguishable from prior art systems that use the API server of a Kubernetes cluster to transfer payload data and associated metadata off-cluster during backup jobs. See, e.g., U.S. patent application Ser. No. 17/745,731 filed on May 16, 2022 (now U.S. Pat. No. 12,032,855). In contrast, the approach disclosed in the present application uses API server 305 sparingly for initial set-up, and after the targeted data has been backed up, for tear-down of the in-cluster backup resources. This approach advantageously frees up API server 305 from becoming a bottleneck. Block 604 ends here.

Figure 9A:
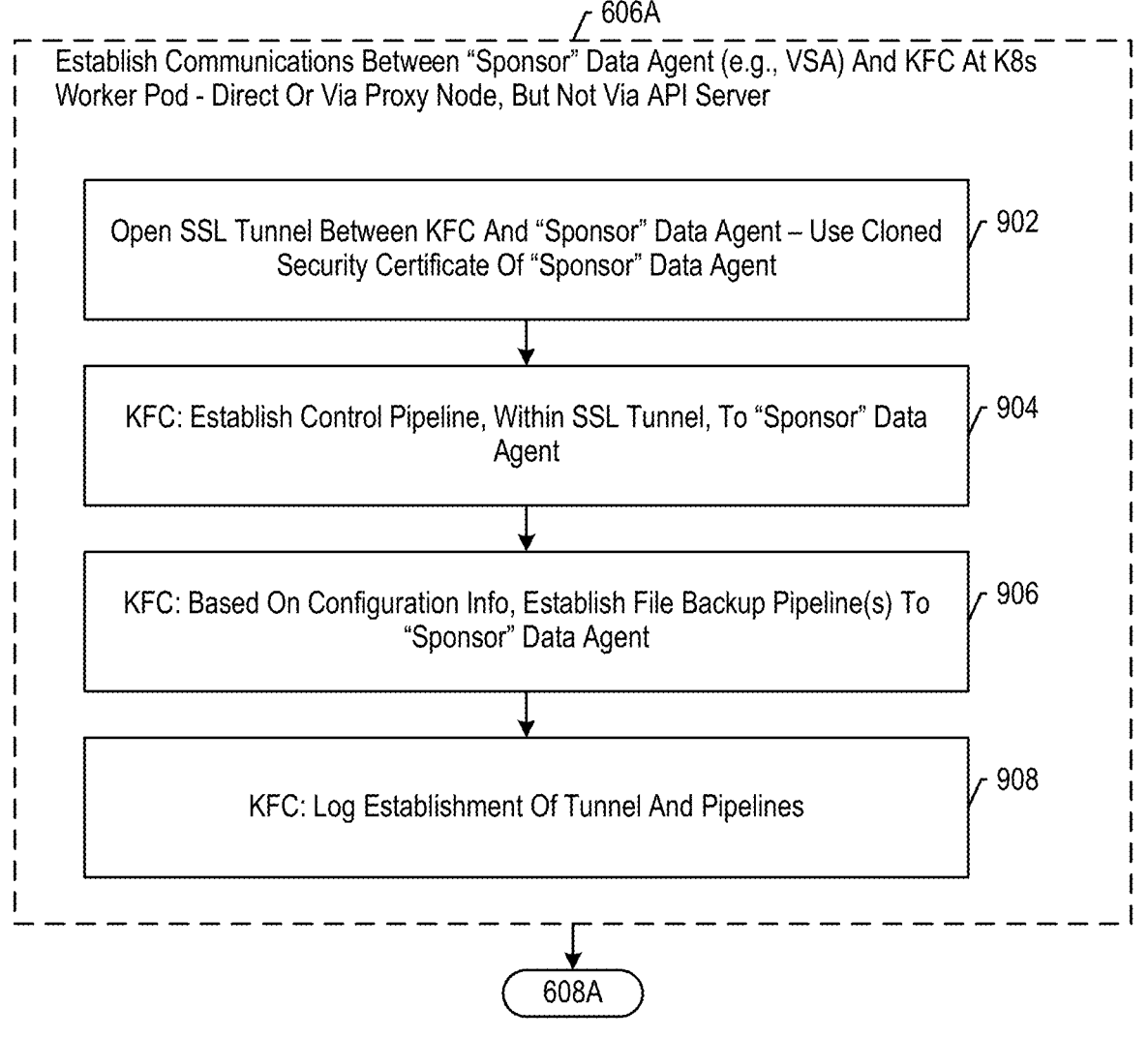
FIG. 9A depicts some salient operations of block 606A of method 600 according to an illustrative embodiment.

FIG. 9A depicts some salient operations of block 606A of method 600 according to an illustrative embodiment that uses KFC 333. At block 606A, communications are established between data agent 342 and KFC 333 direct or via proxy node 506, but not via API server 305. At block 902, an SSL tunnel is opened between KFC 333 and sponsor data agent 342 using the cloned security certificate(s) of data agent 342 to authenticate and authorize communications therebetween. Depending in implementation, the SSL tunnel may be opened by either KFC 333 or data agent 342, whether via a direct connection as depicted in FIG. 4 or via an indirect one with intermediary proxy node 506 as depicted in FIG. 5. API server 305 is not used for this purpose.

At block 904, KFC 333 establishes control pipeline 410, within the opened SSL tunnel, to data agent 342. Illustratively, a pod backup feature of KFC 333 starts the control pipeline 410, and, based on configuration information received from data agent 342, will open one or more file backup pipelines 420 at block 906. At block 906, based on configuration information in the custom image and/or in the set of configuration files supplied by data agent 342, KFC 333 establishes one or more file backup pipelines 420. At block 908, KFC 333 logs information about its establishment of tunnel and pipeline(s) in the preceding blocks of the present figure. KFC 333 transmits its logs to data agent 342. See also block 1008 in FIG. 10A. At this point, the actual data transfer of the pending job may begin. Block 606A ends here and control passes to block 608A.

Figure 9B:
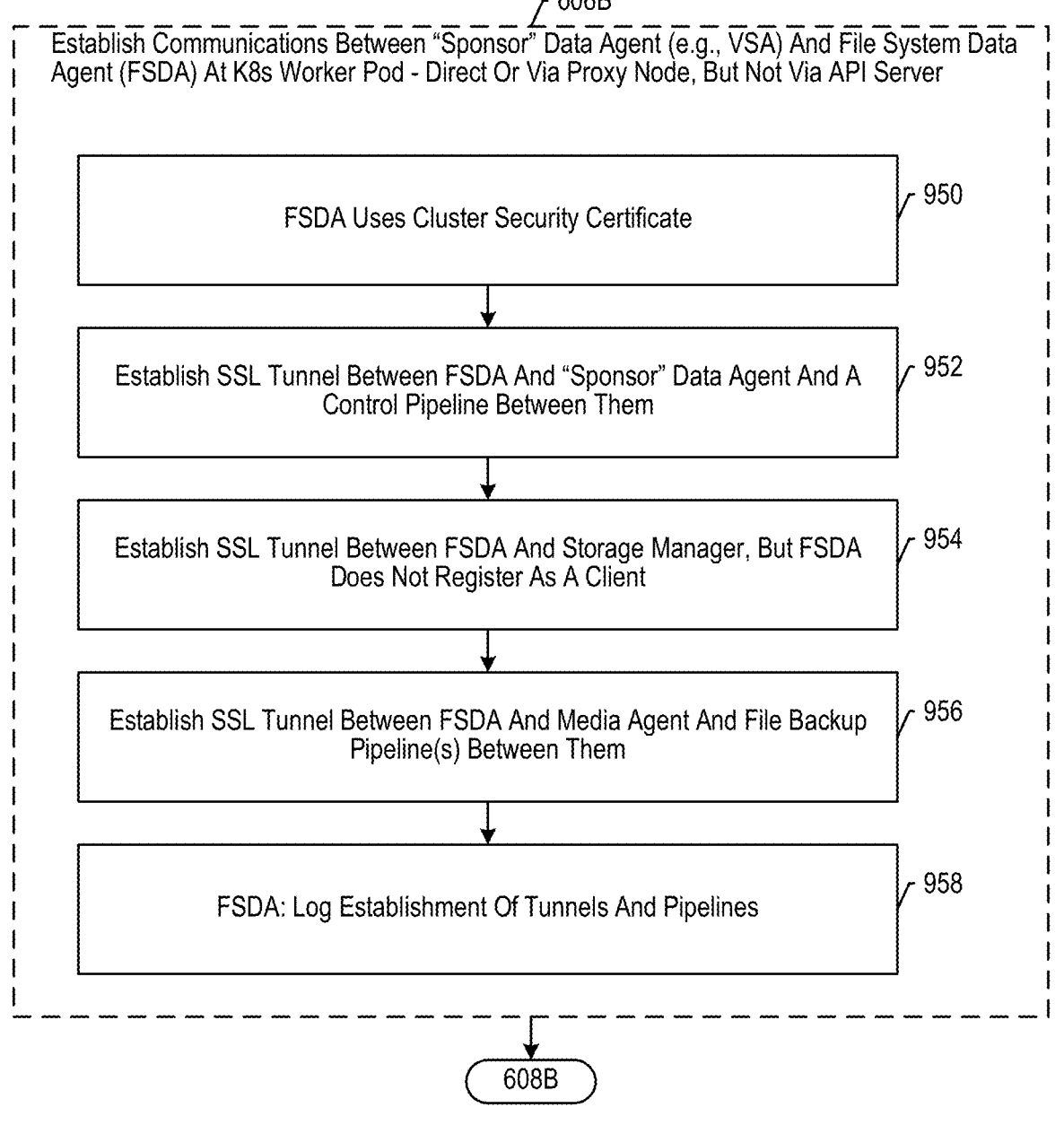
FIG. 9B depicts some salient operations of block 606B of method 600 according to an illustrative embodiment.

FIG. 9B depicts some salient operations of block 606B of method 600 according to an illustrative embodiment that uses FSDA 360. At block 606B, communications are established between data agent 342 and FSDA 360 direct or via Proxy node, but not via API server 305. At block 950, FSDA 360 uses a clone of the security certificate(s) issued by system 300 for cluster 301, i.e., the cluster-specific security certificate(s), which will authorize communications between data agent 342 and FSDA 360.

At block 952, an SSL tunnel is established between FSDA 360 and sponsor data agent 342 and a control pipeline 410 between them, thus implementing communication pathway 361. Depending on implementation, the SSL tunnel may be opened by either FSDA 360 or data agent 342, whether via a direct connection as depicted in FIG. 4 or via an indirect one with intermediary proxy node 506 as depicted in FIG. 5. API server 305 is not used for this purpose. At block 954, an SSL tunnel is established between FSDA 360 and storage manager 140. A control pipeline analogous to control pipeline 410 is opened between them. Notably, FSDA 360 does not register as client of system 300, even though it is able to communicate with storage manager 140 for a limited purpose during the present backup job. Depending in implementation, the SSL tunnel may be opened by either FSDA 360 or storage manager 140, whether via a direct connection as depicted in FIG. 4 or via an indirect one with intermediary proxy node 506 as depicted in FIG. 5. API server 305 is not used for this purpose.

At block 956, an SSL tunnel is established between FSDA 360 and media agent 144, thus implementing communication pathway 362. One or more file backup pipelines 420 are opened between them, and a control pipeline 410 that may be used for purposes such as flow control, instructions, etc. The file backup pipeline(s) 420 will carry payload data from secondary persistent volume 313 and payload-related metadata. Depending on implementation, the SSL tunnel may be opened by either FSDA 360 or media agent 144, whether via a direct connection as depicted in FIG. 4 or via an indirect one with intermediary proxy node 506 as depicted in FIG. 5. API server 305 is not used for this purpose. At block 958, FSDA 360 logs information about its establishment of tunnel and pipeline(s) in the preceding blocks of the present figure. FSDA 360 transmits its logs to data agent 342. See also block 1060 in FIG. 10B. At this point, the actual data transfer of the pending job may begin. Block 606B ends here and control passes to block 608B.

FIG. 10A depicts some salient operations of block 608A of method 600 according to an illustrative embodiment. At block 608A, a backup job is performed using KFC 333, wherein system 300 backs up data from secondary persistent volume 313 in cluster 301 by way of KFC 333 and data agent 342. See also FIG. 3A. At block 1002, system 300 (e.g., using data agent 342) transmits job control information to KFC 333 via control pipeline 410, and accordingly, KFC 333 receives the job control information from data agent 342. For example, the job control information may include a type of backup to be performed, e.g., full backup, incremental backup, etc., and a reference time of a preceding backup operation. The reference time will be used by KFC 333 to identify data that changed since the reference time and select only changed data for an incremental backup operation. For example, the job control information may include a data path to a directory or subdirectory in secondary persistent volume 313 that houses the target primary data 113 to be backed up in the pending backup job. For example, the job control information may indicate that primary data 113 in secondary persistent volume 313 is to be transmitted to data agent 342, etc.

At block 1004, KFC 333 scans a file system at secondary persistent volume 313, enumerates its contents, and recognizes payload data and payload-related metadata to be backed up, i.e., primary data 113. For an incremental backup, KFC 333 may recognize what changed since the above-mentioned reference time, and packs the changed payload data and payload-related metadata into one or more file backup pipeline(s) 420.

Illustratively, in some embodiments, KFC 333 executes a multi-threaded scanner that recursively traverses the directory structure of secondary persistent volume 313 breadth-first using a shared directory Scan Queue and the above-mentioned reference time. All scanning threads will use control pipeline 410 to communicate with data agent 342 and will use a single File Queue to pass the names of files to upload to one or more File Readers. Each newly discovered subdirectory will be added to the tail of the Scan Queue to be picked up later by the same or another scan thread. Directory information about each directory with a modify or change time equal to or later than the reference time will be sent through control pipeline 410 to data agent 342, so that data agent 342 may compute a new Directory-Change file and record file additions or removals. All files with a modify or change time equal to or greater than the reference time will be added to the File Queue for further and/or concurrent processing by one of the File Readers. All scan-related error and log messages will be forwarded via control pipeline 410 to data agent 342.

Illustratively, in some embodiments, KFC 333 also executes one or more file readers. File Readers will each have a dedicated file backup pipeline 420 going to data agent 342 and will be drawing names of files to transfer from the File Queue, which is populated by the Scanner. For each file, a File Reader sends the file's metadata (payload-related metadata) followed by the file's payload contents (preferably with basic hole optimization) through the dedicated file backup pipeline 420. Data agent 342 is then responsible for translating and forwarding the file's metadata and payload data to media agent 144 through a separate dedicated pipeline thereto. Individual file open/read errors will be reported via file backup pipeline 420 to data agent 342, and preferably ignored locally at KFC 333, so that the File Reader may continue with processing the next file in the File Queue.

At block 1008, KFC 333 uses control pipeline 410 to transmit job statistics, error information, and activity logs to data agent 342. Preferably, these are streamed concurrently with performing block 1004, as they are generated at KFC 333, rather than waiting for data backup to complete. At block 1010, system 300 (e.g., using data agent 342) locally stores job statistics, logs, and error information received from KFC 333. Preferably data agent 342 stores the logs/error locally at secondary storage computing device 106, but in alternative embodiments they are stored elsewhere within system 300 and outside of cluster 301. This approach advantageously enables live progress monitoring from data agent 342 as KFC 333 is performing its duties. In some embodiments, these job statistics, logs, and error information are later backed up to secondary storage for further protection.

At block 1012, system 300 (e.g., using data agent 342) converts payload data and payload-related metadata received from KFC 333 (obtained from secondary persistent volume 313) into a proprietary system format, and transmits the resulting data to media agent 144 using a dedicated pipeline. At block 1014, system 300 (e.g., using media agent 144) prepares secondary copies 116 and stores them in secondary storage off-cluster, e.g., in secondary storage devices 108. Accordingly, secondary copies 116 are based on primary data 113, which originated at primary data 112. Additionally, media agent 144 performs index updates, as described elsewhere in regard to index 153 and may report job information to storage manager 140. Block 608A ends here and control passes to block 610.

FIG. 10B depicts some salient operations of block 608B of method 600, according to an illustrative embodiment. At block 608B, a backup job is performed using FSDA 360, wherein system 300 backs up data from secondary persistent volume 313 in cluster 301 by way of FSDA 360 and media agent 144. See also FIG. 3B. At block 1050, a so-called "extension" program executing at worker pod 330 starts up FSDA 360 and monitors FSDA 360 until it has transmitted all of the targeted primary data 113 to media agent 144, or, alternatively, has encountered a fatal error and is no longer transmitting. The "extension" program was previously populated at worker pod 330 using a similar mechanism and pathway as FSDA 360. When all targeted data at secondary persistent volume 313 has been transmitted to media agent 144, the "extension" program notifies data agent 342 of backup completion. This does not mean that the backup job is complete, only that FSDA 360 has completed transferring data from primary data 113 to media agent 144 and has no more primary data 113 to transfer. Thus, block 1050 extends for the entirely of block 608B, even if not so depicted in the present figure. In some embodiments, the functionality of the illustrative "extension" program are included in FSDA 360, without limitation. At block 1052, FSDA 360 receives job control information from data agent 342. This block is analogous to block 1002 in FIG. 10A. However, at block 1052, the job control information indicates that the transfer of payload data and payload-related metadata that FSDA 360 obtains at secondary persistent volume 313 is to be transferred to media agent 144 by way of communication pathway 362. Control may pass concurrently to block 1054 and 1060.

At block 1054, FSDA 360 scans a file system at secondary persistent volume 313, enumerates its contents, and recognizes payload data and payload-related metadata to be backed up. For an incremental backup, FSDA 360 may recognize what changed since the above-mentioned reference time, and packs the changed payload data and payload-related metadata into one or more file backup pipeline(s) 420 connecting to media agent 144 over communication pathway 362. Block 1054 is otherwise analogous to block 1004 in FIG. 10A. At block 1056, FSDA 360 transmits payload data and payload-related metadata obtained from secondary persistent volume 313 to media agent 144 via communication pathway 362, thereby bypassing data agent 342. At block 1058, FSDA 360 transmits job progress information to storage manager 140, which may occur concurrently with performing blocks 1054 and 1056.

At block 1060, which follows block 1052, FSDA 360 transmits workload-related metadata, activity logs, and error information to data agent 342 via control pipeline 410 over communication pathway 361. Workload-related metadata or application-related metadata is distinguishable from payload-related metadata, which is transmitted to media agent 144. Workload-related metadata, as the name suggests, includes information about the application 110, or workload, that generated primary data 112. Workload-related metadata may include information about application 110, such as name, version, vendor, structural details, application status files, application logs, etc., without limitation. Workload-related information is useful for rebuilding or reconstructing the compute environment that originally generated primary data 112.

At block 1062, data agent 342 converts information received from FSDA 360 into a proprietary system format that is specific to system 300, which it then transmits to media agent 144 at block 1064. A communication pathway 114 (FIG. 1C) is used illustratively between data agent 342 and media agent 144. At block 1066, media agent 144 is in possession of payload and payload-related metadata received from FSDA 360 at block 1056, and additionally possesses workload-related metadata and other information received from data agent 342 at block 1064. Accordingly, media agent 144 prepares one or more secondary copies 116 and stores them in secondary storage 108 off-cluster. Furthermore, media agent 144 also performs index updates, such as updating index 153 and/or reporting to storage manager 140. Block 608B ends here and control passes to block 610.

FIG. 11 depicts some salient operations of block 610 of method 600 according to an illustrative embodiment. At block 610, system 300 (e.g., using data agent 342), based on the backup data transfers ending within cluster 301, communicates with control plane 302, via API server 305, to: tear down worker pod 330, secondary persistent volume 313, and snapshot 112S. As noted, this approach improves backup performance and conserves resources within cluster 301.

At block 1101, data agent 342 determines that no more data transfers are pending from worker pod 330. The determination may be made based on KFC 333 reporting that it has transmitted all data to data agent 342 or that it has permanently stopped due to a fatal error. As noted at block 1050 (FIG. 10B) a so-called "extension" program executing at worker pod 330 starts up FSDA 360 and monitors FSDA 360 until it has transmitted all of the targeted primary data 113 to media agent 144, or, alternatively, has encountered a fatal error and is no longer transmitting; accordingly, when all targeted data at secondary persistent volume 313 has been transmitted to media agent 144, the "extension" program notifies data agent 342 of backup completion, which does not mean that the backup job is complete, only that FSDA 360 has completed transferring data from primary data 113 to media agent 144 and has no more primary data 113 to transfer. Thus, at block 1101, data agent 342 determines that no more data transfers are pending from worker pod 330. Before proceeding to block 1103, data agent 342 confirms that job statistics, logs, and errors have been received from worker pod 330 (e.g., from KFC 333, FSDA 360, and/or the "extension" program). This may be determined by querying from KFC 333, FSDA 360, and/or the "extension" program to confirm that its information has been fully reported to data agent 342.

At block 1103, data agent 342 uses the Kubernetes management interface to establish electronic communications pathway 309 with control plane 302, e.g., via API server 305. This operation is analogous to block 802, except that here it is triggered after the backup data transfer has concluded within cluster 301. At block 1105, data agent 342 uses the Kubernetes management interface, via API server 305, to dissolve or tear down worker pod 330. Causing the tear-down of a worker pod in a Kubernetes cluster such as cluster 301 is well known in the art. The effect of tearing down worker pod 330 is that any software executing thereupon, such as KFC 333 or FSDA 360, also is disabled and deactivated. Thus, block 1105 frees up compute resources within cluster 301.

At block 1107, data agent 342 uses the Kubernetes management interface, via API server 305, to tear down secondary persistent volume 313. Causing the tear-down of a persistent volume in a Kubernetes cluster such as cluster 301 is well known in the art. The effect of tearing down secondary persistent volume 313 is that any data residing therein, such as secondary persistent volume 313, also is destroyed. Thus, block 1107 frees up storage resources within cluster 301. At block 1109, data agent 342 uses the Kubernetes management interface, via API server 305, to remove or tear down snapshot 112S at persistent volume 312. Causing the tear-down of snapshot in a Kubernetes cluster such as cluster 301 is well known in the art. The effect of tearing down snapshot 112S is that it frees up storage space and snapshot maintenance resources at persistent volume 312. Thus, block 1107 frees up resources within cluster 301. Block 610 ends here. At this point, all the information extracted from cluster 301 in the just-ended backup job has been safely protected within system 300, by way of secondary copies 116, index 153, management database 146, and any other suitable resources configured outside cluster 301. All the resources activated on demand within cluster 301 to enable the backup job have been torn down. Resources will be brought online again within cluster 301 when a new backup job is initiated, e.g., block 706 (FIG. 7).

In regard to the figures described herein, other embodiments are possible within the scope of the present invention, such that the above-recited scaling factors, computing environments, components, steps, blocks, operations, messages, requests, queries, and/or instructions are differently arranged, sequenced, sub-divided, organized, and/or combined. In some embodiments, a different component may initiate or execute a given operation. As noted, some of the enumerated operations of method 600 may occur substantially concurrently or in a different order. As noted, some of the communications infrastructure described in reference to KFC 333 in FIG. 4 and FIG. 5 may be implemented correspondingly in reference to FSDA 360, without limitation.

Example Embodiments

Some example enumerated embodiments of the present invention take the form of methods, systems, and non-transitory computer-readable media, without limitation.

In other embodiments according to the present invention, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. section 112(f) (AIA), other aspects may likewise be embodied as a means-plus-function claim, or in other forms, such as being embodied in a computer-readable medium. Any claims intended to be treated under 35 U.S.C. section 112(f) will begin with the words "means for," but use of the term "for" in any other context is not intended to invoke treatment under 35 U.S.C. section 112(f). Accordingly, the applicant reserves the right to pursue additional claims after filing this application, in either this application or in a continuing application.

What is claimed is:

1. A computer-implemented method comprising:

by a first computing device that executes a sponsor data agent, wherein the first computing device comprises one or more hardware processors, and wherein the first computing device operates outside a Kubernetes cluster:

responsive to a notice of a backup job of primary data that is stored in a first persistent volume of the Kubernetes cluster, using a first communicative connection with an Application Programming Interface server (API server) of a cluster control plane of the Kubernetes cluster to: (a) cause the Kubernetes cluster to create a secondary persistent volume that comprises primary data captured in a snapshot of the first persistent volume, (b) cause the Kubernetes cluster to instantiate a worker pod, which is attached to the secondary persistent volume and is configured with computer-executable instructions for a file system data agent and with a cloned security certificate corresponding to the Kubernetes cluster, and (c) cause the worker pod to execute the file system data agent, and terminating the first communicative connection to the API server, based on determining that the worker pod is executing the file system data agent;

by the file system data agent executing at the worker pod in the Kubernetes cluster, wherein the worker pod executes on a second computing device that comprises one or more hardware processors:

identifying, among the primary data in the secondary persistent volume, payload data and payload-related metadata that changed since a reference time, and using the cloned security certificate for securely communicating with a media agent that executes on a third computing device that comprises one or more hardware processors, wherein the third computing device operates outside the Kubernetes cluster, transmitting the payload data and the payload-related metadata that changed to the media agent;

by the media agent:

generating one or more backup copies based on the payload data and the payload-related metadata received from the file system data agent, and storing the one or more backup copies at a secondary storage that is configured outside the Kubernetes cluster; and by the sponsor data agent, based on determining that all of the payload data and the payload-related metadata have been transmitted by the file system data agent, using a second communicative connection with the API server to: cause the Kubernetes cluster to tear down one or more of: the worker pod, the secondary persistent volume, and the snapshot.

2. The computer-implemented method of claim 1, wherein the backup job is an incremental backup job, and wherein the notice of the backup job includes the reference time.

3. The computer-implemented method of claim 1, wherein a communication tunnel is established between the worker pod and the first computing device using the cloned security certificate for secure communications therebetween, and wherein establishing the communication tunnel is initiated at the worker pod.

4. The computer-implemented method of claim 1, wherein a communication tunnel is established between the worker pod and the first computing device using the cloned security certificate for secure communications therebetween, and wherein establishing the communication tunnel is initiated at the first computing device.

5. The computer-implemented method of claim 1, further comprising: by the file system data agent executing at the worker pod in the Kubernetes cluster, transmitting workload-related metadata to the sponsor data agent, wherein a workload of the Kubernetes cluster generated the primary data that is stored in the first persistent volume of the Kubernetes cluster.

6. The computer-implemented method of claim 1 further comprising: by the file system data agent executing at the worker pod in the Kubernetes cluster: transmitting error information corresponding to activities performed by the file system data agent to the sponsor data agent; and by the sponsor data agent, storing the error information at one or more of: the first computing device and the secondary storage.

7. The computer-implemented method of claim 1 further comprising: by the sponsor data agent, before causing the Kubernetes cluster to create the secondary persistent volume, using the first communicative connection with the API server to: (i) discover a configuration file associated with a workload in the Kubernetes cluster, wherein the workload generated the primary data that is stored in the first persistent volume of the Kubernetes cluster, and (ii) cause the Kubernetes cluster to take the snapshot of the first persistent volume.

8. The computer-implemented method of claim 1 further comprising: by the sponsor data agent, before causing the Kubernetes cluster to create the secondary persistent volume, using the first communicative connection with the API server to transfer, to the worker pod, one or more configuration files that are specific to the backup job, wherein the one or more configuration files include an identification of the sponsor data agent.

9. The computer-implemented method of claim 1 further comprising: by the sponsor data agent, before causing the Kubernetes cluster to create the secondary persistent volume, using the first communicative connection with the API server to transfer, to the worker pod, one or more configuration files that are specific to the backup job, wherein the one or more configuration files include the cloned security certificate.

10. The computer-implemented method of claim 1, wherein a system that comprises the sponsor data agent and the media agent further comprises a fourth computing device that executes a storage manager, and wherein the fourth computing device comprises one or more hardware processors and operates outside the Kubernetes cluster;

wherein the backup job is initiated by the storage manager, and wherein a first security certificate for the Kubernetes cluster is issued by the storage manager; and wherein the cloned security certificate, which is a clone of the first security certificate, is generated by the sponsor data agent for use by the file system data agent in the backup job.

11. The computer-implemented method of claim 1, wherein the file system data agent is configured to communicate with the media agent and with the sponsor data agent but the file system data agent is not registered as a client of a system that comprises the sponsor data agent and the media agent.

12. The computer-implemented method of claim 1 further comprising:

by the first computing device that executes the sponsor data agent:

receiving a notice of a second backup job of primary data that is stored in the first persistent volume of the Kubernetes cluster, using a third communicative connection with the API server to: (a) cause the Kubernetes cluster to create a secondary persistent volume that comprises primary data captured in a snapshot of the first persistent volume, (b) cause the Kubernetes cluster to instantiate a worker pod, which is attached to the secondary persistent volume and is configured with computer-executable instructions for a file client and with a cloned security certificate of the sponsor data agent, and (c) cause the worker pod to execute the file client, and terminating the third communicative connection to the API server, based on determining that the worker pod is executing the file client for the second backup job.

13. A system comprising:

a first computing device that operates outside a Kubernetes cluster, wherein the first computing device comprises one or more first hardware processors and non-transitory computer-readable media comprising computer-executable instructions, which, when executed by the one or more first hardware processors, cause the first computing device to:

receive a notice of a backup job of primary data that is stored in a first persistent volume of the Kubernetes cluster, use a first communicative connection with an Application Programming Interface server (API server) of the Kubernetes cluster to: (a) cause the Kubernetes cluster to create a secondary persistent volume that comprises primary data captured in a snapshot of the first persistent volume, (b) cause the Kubernetes cluster to instantiate a worker pod, which is attached to the secondary persistent volume and is configured with computer-executable instructions for a file system data agent and with a cloned security certificate corresponding to the Kubernetes cluster, and (c) cause the worker pod to execute the file system data agent, and terminate the first communicative connection to the API server, based on determining that the worker pod is executing the file system data agent;

wherein the worker pod executes on a second computing device that comprises one or more hardware processors, and wherein the file system data agent executing at the worker pod is configured to:

identify, among the primary data in the secondary persistent volume, payload data and payload-related metadata that changed since a reference time, and use the cloned security certificate to securely communicate with a third computing device of the system, wherein the third computing device comprises one or more hardware processors and operates outside the Kubernetes cluster, and transmit the payload data and the payload-related metadata that changed to the third computing device, which is configured to generate one or more backup copies based thereon, and to store the one or more backup copies at a secondary storage that is configured outside the Kubernetes cluster; and wherein the computer-executable instructions further cause the first computing device to: based on determining that all of the payload data and the payload-related metadata have been transmitted by the file system data agent, use a second communicative connection with the API server to cause the Kubernetes cluster to tear down one or more of: the worker pod, the secondary persistent volume, and the snapshot.

14. The system of claim 13, wherein the file system data agent is not registered as a client of the system.

15. The system of claim 13, wherein the backup job is an incremental backup job, and wherein the notice of the backup job includes the reference time.

16. The system of claim 13, wherein the computer-executable instructions further cause the first computing device to, before causing the Kubernetes cluster to create the secondary persistent volume, use the first communicative connection with the API server to: (i) discover a configuration file associated with a workload in the Kubernetes cluster, wherein the workload generated the primary data that is stored in the first persistent volume of the Kubernetes cluster, and (ii) cause the Kubernetes cluster to take the snapshot of the first persistent volume.

17. The system of claim 13, wherein the computer-executable instructions further cause the first computing device to, before causing the Kubernetes cluster to create the secondary persistent volume, use the first communicative connection with the API server to transfer, to the worker pod, one or more configuration files that are specific to the backup job, wherein the one or more configuration files include an identification of one or more of: the first computing device and the third computing device.

18. The system of claim 13 further comprising: by the first computing device, before causing the Kubernetes cluster to create the secondary persistent volume, using the first communicative connection with the API server to transfer, to the worker pod, one or more configuration files that are specific to the backup job, wherein the one or more configuration files include the cloned security certificate of the Kubernetes cluster.

19. The system of claim 13, further comprising: a fourth computing device that comprises one or more hardware processors and operates outside the Kubernetes cluster;

wherein the backup job is initiated by the fourth computing device;

wherein a first security certificate for the Kubernetes cluster is issued by the fourth computing device; and wherein the cloned security certificate, which is a clone of the first security certificate, is generated by the first computing device for use by the file system data agent in the backup job.

20. The system of claim 13, wherein the backup job uses a communication tunnel, and not the first communicative connection with the API server, to transmit to the third computing device the payload data and the payload-related metadata that changed.

* * * * *